(12) United States Patent
Miyake et al.

(10) Patent No.: US 8,362,974 B2
(45) Date of Patent: Jan. 29, 2013

(54) WEARABLE DISPLAY UNIT, HEADPHONES AND SYSTEM PROVIDED WITH THESE

(75) Inventors: Nobuyuki Miyake, Hiratsuka (JP); Shigeru Kato, Kawasaki (JP); Masaki Ootsuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 196 days.

(21) Appl. No.: 12/753,797

(22) Filed: Apr. 2, 2010

(65) Prior Publication Data

US 2010/0188314 A1      Jul. 29, 2010

Related U.S. Application Data

(63) Continuation of application No. 11/473,559, filed on Jun. 23, 2006, now abandoned, which is a continuation of application No. PCT/JP2004/019352, filed on Dec. 24, 2004.

(30) Foreign Application Priority Data

| Dec. 26, 2003 | (JP) | 2003-434294 |
| Jan. 8, 2004 | (JP) | 2004-2834 |
| Jan. 19, 2004 | (JP) | 2004-10781 |
| Mar. 31, 2004 | (JP) | 2004-103723 |
| Mar. 31, 2004 | (JP) | 2004-103724 |

(51) Int. Cl.
*G09G 5/00* (2006.01)
*G02B 27/14* (2006.01)
*G02B 7/02* (2006.01)
*G02F 1/1335* (2006.01)

(52) U.S. Cl. ............... 345/8; 345/7; 359/630; 359/811; 359/822; 349/13

(58) Field of Classification Search .................. 345/7–8; 359/630–632, 811, 813, 819, 821–822; 349/13
See application file for complete search history.

(56) References Cited

U.S. PATENT DOCUMENTS

| 5,003,300 A | 3/1991 | Wells |
| 5,815,126 A | 9/1998 | Fan et al. |
| 6,680,802 B1 * | 1/2004 | Ichikawa et al. .............. 359/630 |

(Continued)

FOREIGN PATENT DOCUMENTS

| EP | 1 363 450 A1 | 11/2003 |
| JP | 62-058966 | 3/1987 |

(Continued)

OTHER PUBLICATIONS

Office action, dated Jun. 22, 2010, issued in counterpart Japan Patent Application No. 2005-002742.

(Continued)

*Primary Examiner* — Lun-Yi Lao
*Assistant Examiner* — Jarurat Suteerawongsa
(74) *Attorney, Agent, or Firm* — Klarquist Sparkman, LLP

(57) ABSTRACT

Inclination of an image display unit is prevented at the time of using a wearable display unit in which the image display unit can move between a projection position where the image display unit comes in front of a user's eye and a retracted position where the image display unit has been retracted from the front of the user's eye. A display support member 27 is prevented from rotating in relation to a display support member housing part 31 in a direction included in a plane perpendicular to the longitudinal direction of the display support member 27, even in a state that the display support member can move. To that end, grooves 28a, 28b extending in the longitudinal direction are formed in the display support member 27, while guide rollers 34a, 34a in contact with these grooves are provided within the display support member housing part 31.

5 Claims, 50 Drawing Sheets

U.S. PATENT DOCUMENTS

| | | | |
|---|---|---|---|
| 6,683,584 | B2 | 1/2004 | Ronzani et al. |
| 6,747,611 | B1 * | 6/2004 | Budd et al. .................. 345/7 |
| 2004/0145699 | A1 * | 7/2004 | Wu .............................. 351/120 |

FOREIGN PATENT DOCUMENTS

| | | |
|---|---|---|
| JP | 62-203796 | 9/1987 |
| JP | 02-063379 | 3/1990 |
| JP | 09-184098 | 7/1997 |
| JP | 09-261556 | 10/1997 |
| JP | 10-074051 | 3/1998 |
| JP | 2000-003143 | 1/2000 |
| JP | 2000-066618 | 3/2000 |
| JP | 2000-111828 | 4/2000 |
| JP | 2000-172370 | 6/2000 |
| JP | 2000-330070 | 11/2000 |
| JP | 2002-041188 | 2/2002 |
| JP | 2002-152626 | 5/2002 |
| JP | 2002-165156 | 6/2002 |
| JP | 2002-232810 | 8/2002 |
| JP | 2002-247483 | 8/2002 |
| JP | 2002-258209 | 9/2002 |
| JP | 2002-350771 | 12/2002 |
| JP | 2004-078057 | 3/2004 |
| JP | 2004-080679 | 3/2004 |
| JP | 2004-233779 | 8/2004 |
| JP | 2004-233780 | 8/2004 |
| JP | 2004-233948 | 8/2004 |
| JP | 2004-282194 | 10/2004 |
| WO | WO 95/11473 | 1/1995 |

OTHER PUBLICATIONS

Japanese Office Action dated Jun. 23, 2009 issued against JP2004-103724.

Japanese Office Action dated Jun. 23, 2009 issued against JP2004-103723.

Interactive Imaging Systems Second Sight, ½ page, retrieved on Dec. 9, 2004, Internet <URL:http://www.iisvr.com/products_mobility_Main.html>.

* cited by examiner

WEARABLE DISPLAY UNIT, HEADPHONES AND SYSTEM PROVIDED WITH THESE

CROSS REFERENCE TO RELATED APPLICATION

This is a continuation application of, and claims benefit from, U.S. patent application Ser. No. 11/473,559, now abandoned filed on Jun. 23, 2006, which is a continuation application of, and claims benefit from, corresponding international application PCT/JP2004/19352, filed Dec. 24, 2004, which claims priority from Japan Patent Application No. 2003-434294, filed Dec. 26, 2003, Japan Patent Application No. 2004-002834, filed Jan. 8, 2004, Japan Patent Application No. 2004-010781, filed Jan. 19, 2004, Japan Patent Application No. 2004-103723, filed Mar. 31, 2004, and Japan Patent Application No. 2004-103724, filed Mar. 31, 2004, all of which applications are incorporated herein by reference.

BACKGROUND

The present disclosure relates to a wearable display unit provided with an image display unit for displaying an image in front of an eye of a user and the image display unit can be arranged near a user's eye, headphones attached to the wearable display unit, and a system provided with these components.

As a device for displaying an image in front of an eye of a user, there is a device called a wearable display unit or a head-mounted display.

For example, the below-mentioned Non-patent Document 1 shows a conventional device of such a type.

A wearable display unit described in Non-patent Document 1 comprises: an image display unit; a round-bar-shaped display support member whose end fixes the image display unit; a display support member holding part that supports the display support member slidably; and a head mounting belt to which the display support member holding part is attached. The display support member holding part comprises: a display support member housing that houses the display support member; and a restricting screw for restricting the display support member such that the display support member can not move relatively to the display support member housing. The display support member housing is formed with a display support member through hole for inserting the display support member and a threaded hole extending in the direction intersecting the display support member through hole. The restricting screw is screwed into the threaded hole and presses the display support member in the display support member housing to restrict the display support member such that the display support member can not move.

To use this wearable display unit, first the head mounting belt is put on the head of a user. Then, the restricting screw is loosened to pull out the display support member from the display support member housing such that the image display unit is led to the front of a user's eye. Then, the display support member is rotated slightly in relation to the display support member housing around the longitudinal axis of the display support member, to adjust the inclination of the image display unit. Thereafter, the restricting screw is screwed into the display support member housing to restrict the display support member such that the display support member can neither move nor rotate.

Other related techniques are displayed in the below-mentioned Patent Documents 1, 2 and 3.

A wearable display unit described in Patent Document 1 has a head mounting belt and a display device. Mechanical structures for fixing the display device unit are provided to the head mounting belt in the neighborhoods of the right and left eyes, respectively. Thus, since this wearable display unit is provided with the mechanical structures for fixing the display device unit at the portions of the head mounting belt in the neighborhoods of the right and left eyes respectively, it is possible to place the display device unit both in the neighborhood of the right eye and in the neighborhood of the left eye.

Patent Document 2 describes a wearable display unit whose image display unit is provided with an anti-swing member that can be in contact with a nose of a user to avoid effect of unintended movement of the image display unit owing to a motion of the user.

A wearable display unit described in Patent Document 3 comprises: an image display unit for displaying an image in front of a user's eye; a head mounting member to be mounted on the head of the user; a display support member that supports the image display unit; and a coupling member for coupling the display support member to the head mounting member. This wearable display unit has a spherical seat at a portion of connection between the display support member and the coupling member so that the image display unit fixed to the end of the display support member can swing in various directions together with the display support member.

Non-patent Document 1: Interactive Imaging Systems Second Sight, ½ page, retrieved on Dec. 9, 2004, Internet <URL:http://www.iisvr.com/products_mobility_Main.html>

Patent Document 1: Japanese Non-examined Patent Laid-Open No. 10-74051, FIG. 2

Patent Document 2: Japanese Non-examined Patent Laid-Open No. 2000-3143, FIG. 1

Patent Document 3: Japanese Non-examined Patent Laid-Open No. 2000-3143, FIGS. 2 and 6

SUMMARY

According to the technique described in Non-patent Document 1, the center of gravity of the image display unit does not exist on the axis of the display support member. Thus, when the wearable display unit is used in a state that the image display unit is positioned in front of a user, sometimes the weight of the image display unit generates force causing the display support member to rotate on its longitudinal axis and, as a result, the image display unit to incline. In particular, when the head of the user using the wearable display unit moves rapidly, the image display unit frequently inclines downward even if the restricting screw has been screwed tightly to some degree.

The present invention has been made considering these conventional problems. An object of the present invention is to provide a wearable display unit that can prevent downward inclination of an image display unit at the time of using, headphones that can be fixed to this wearable display unit, and a system provided with these.

To solve the above problems, one aspect of the invention provides a wearable display unit having an image display unit for displaying an image in front of an eye of a user and the image display unit of which can be arranged near a user's eye. An embodiment of the unit comprises a display support member that has a bar shape and is fixed to the image display unit. The unit also comprises a display support member holding part that holds the display support member movably between a projecting position where the image display unit can be positioned in front of the eye of the user and a retracted position where the image display unit has been retracted from the front of the eye of the user. The unit also comprises an anti-rotation means that prevents rotation of the display support member in relation to the display support member holding part in a neighborhood of, and including at least, the projecting position between the projecting position and the retracted position, with respect to rotation in a direction within a plane nearly perpendicular to a longitudinal direction of the display support member, even when the display support member is in a movable state.

In the wearable display unit, the anti-rotation means can comprise an anti-rotation-shape part formed, at least in a part of the display support member, to have an outer peripheral shape of a cross section having parts whose distances from a center of gravity in the cross section are different from each other. The cross section can be perpendicular to the longitudinal direction of the display support member. The anti-rotation means also can include an abutting part that is a part of the display support member holding part and cannot be rotated in a sense of the rotation, with the abutting part abutting on the anti-rotation-shape part of the display support member at least in the neighborhood of the projecting position.

In another embodiment the anti-rotation means comprises an anti-rotation-shape part formed, at least in a part of the display support member, to have an outer peripheral shape of a cross section different from a circle, with the cross section being perpendicular to the longitudinal direction of the display support member. The anti-rotation means also comprises an abutting part that is a part of the display support member holding part and cannot be rotated in a sense of the rotation, with the abutting part abutting on the anti-rotation-shape part of the display support member at least in the neighborhood of the projecting position.

The outer peripheral shape of the cross section of the display support member can be different between on a tip end side to which the image display unit is fixed and on a base end side opposite to the tip end side. The base end portion of the display support member can form the anti-rotation-shape part.

The outer peripheral shape of the cross section on the tip end side of the display support member can be a circle.

The display support member can be formed with a groove extending in the longitudinal direction. In this embodiment the display support member holding part can have a guide roller that is in contact with a surface of the display support member, with the surface being formed with the groove. A part of the display support member, the part having the groove, can be the anti-rotation-shape part, wherein the guide roller is the abutting part.

The display support member holding part can have a driving source that moves the display support member. In this configuration a drive transmission part of the driving source is in contact with the display support member.

The holding means can be configured to hold the drive transmission part toward the display support member.

The display support member can have a shape curved in the longitudinal direction so that the shape extends along a head of the user. In this configuration the image display unit can be moved in a locus corresponding to the curved shape, between the projecting position and the retracted position.

The display support member holding part can comprise a display support member housing that houses the display support member at the retracted position.

Another aspect of the invention is directed to wearable display systems. An embodiment of such a system comprises a wearable display unit such as any of the configurations summarized above. The system also includes a head mounting member that is mounted on a head of a user for holding the head inside of the head mounting member by an elastic force of the head mounting member. The wearable display unit can have an attachment that is fixed to the display support member holding part and that can be coupled to and removed from a part of the head mounting member.

Another aspect of the invention is directed to wearable display units having an image display unit for displaying an image in front of a user's eye and the image display unit that can be arranged near the user's eye. An embodiment of such a unit comprises a display support member that is curved in a shape extending along a shape of a head and is fixed to the image display unit. The unit also includes a display support member holding part that slidably holds the display support member such that the display support member can move along a locus corresponding to its curved shape, between a projecting position where the image display unit can be positioned in front of the eye of the user and a retracted position where the image display unit has been retracted from the front of the eye of the user.

In a wearable display unit according to any of the configurations summarized above, the image display unit can be fixed to the display support member such that a visual surface of the image display unit can swing between a displayable position where the display screen of the image display unit faces the eye of the user and a non-displayable position where the display screen is inclined at an angle larger than or equal to a certain angle with a line of sight of the user's eye. The wearable display unit can further comprise a detection means that detects whether the image display unit is in the displayable position or in the non-displayable position. The wearable display unit also can include a driving means that makes the display support member slide, and a control means that makes the driving means drive the display support member such that the display support member moves from the projecting position to the retracted position, when the detection means detects that the image display unit moves from the displayable position to the non-displayable position in a state that the display support member is in the projecting position.

In another embodiment the wearable display system comprises a wearable display unit according to any of the configurations summarized above, and a headphone having a speaker and a headphone arm connected to the speaker, and that can be mounted on a head. The wearable display unit can have an attachment that can be coupled to and removed from the headphone. The wearable display unit and the headphone can have respective electric connection parts that can be electrically connected and disconnected from each other.

The wearable display unit can have an outside connection part for receiving at least electric power, an image signal and an audio signal from the outside. The wearable display unit can be configured to send at least the audio signal out of the electric power, the image signal, the audio signal and the like received through the outside connection part, to the electric connection part (hereinafter, referred to as a "headphone-side electric connection part") of the headphone through the electric connection part (hereinafter, referred to as a "display-side electric connection part") of the wearable display unit. In that case, the headphone-side electric connection part may be a headphone cable having electric contacts at its end.

The headphone can have an outside connection part for receiving at least electric power, an image signal and an audio signal from the outside. The headphone can be configured to send at least the electric power and the image signal out of the electric power, the image signal, the audio signal and the like received through the outside connection part to the electric connection part (hereinafter, referred to as a "display-side electric connection part") of the wearable display unit through the electric connection part (hereinafter, referred to as a "headphone-side electric connection part") of the headphone. In that case, the display-side electric connection part may be a display cable having electric contacts at its end.

Further, the display-side electric connection part may be provided in the attachment such that the display-side electric connection part is connected to the headphone-side electric connection part when the attachment is coupled to the headphone.

In yet another embodiment each of left and right parts of the headphone can be provided with the headphone-side electric connection part. The headphone-side electric connection part can have a plurality of electric contacts arranged in a predetermined direction. The order of arrangement of the plurality of electric contacts in the headphone-side electric connection part provided in one of the left and right parts can be reversed in a vertical direction from an order of arrangement of the plurality of electric contacts in the headphone-side electric connection part provided in the other of the left and right parts, in a state that the headphone is mounted on the head.

In yet another embodiment each of left and right parts of the headphone can be provided with the headphone-side electric connection part. The headphone-side electric connection part can have a plurality of electric contacts arranged in a predetermined direction. The order of arrangement of the plurality of electric contacts in the headphone-side electric connection part provided in one of the left and right parts can be reversed in a horizontal direction from an order of arrangement of the plurality of electric contacts in the headphone-side electric connection part provided in the other of the left and right parts, in a state that the headphone is mounted on the head and surfaces in which the electric contacts are arranged are seen from fronts of the surfaces.

The attachment can relatively move within a certain width in a certain direction with respect to the headphone to which the attachment is coupled. At least either the plurality of the electric contacts in the headphone-side electric connection part or the plurality of the electric contacts in the display-side connection part can have a certain width in the certain direction.

The attachment of the wearable display unit can have a coupling means that is deformed to be coupled with a part of the headphone. In this configuration or in other configurations, the attachment of the wearable display unit can be coupled to and removed from a part of the speaker on a side opposite to a side contacting with the head. The part of the speaker can be provided with the electric contacts of the headphone-side electric connection part, and the attachment can be provided with the electric contacts of the display-side electric connection part. The electric contacts can be connected to the electric contacts of the headphone-side electric connection part when the attachment is coupled to the part. The attachment can be provided with a circuit that processes the image signal and sends the processed image signal to the image display unit.

In another embodiment the headphone has a pair of speakers as the speaker, and the headphone arm connects the pair of speaker with each other. Each of the pair of speakers can be formed with a coupling portion to which the attachment can be coupled. The wearable display system further can comprise an external member that is coupled to the coupling portion of one speaker of the pair of speakers to cover the coupling portion, when the other speaker is coupled with the attachment at the coupling portion of that speaker. In this and other configurations the attachment can be formed with a hollow portion on a side of a speaker when the attachment is coupled to the speaker. The external member can be formed with a hollow portion at a position corresponding to the hollow portion of the attachment, with the hollow portion formed in the external member having the same shape and size as ones of the hollow portion of the attachment.

In yet another embodiment the display support member holding part is coupled to the attachment in a relatively rotatable manner.

At least a part of the coupling means may be made of an elastic material so that the coupling means is elastically deformed to grasp the headphone arm of the headphone or to be coupled into the speaker of the headphone. Further, the coupling means may comprise first and second grasping members for sandwiching a part of the headphone arm from both sides, and a pressing member that presses the second grasping member toward the first member. When the coupling means is deformed as a result of movement of the second grasping member, a part of the headphone arm is grasped between the first grasping member and the second grasping member. In this configuration the coupling means may have a groove member having a pair of side walls that are opposed to each other. One of the side walls of the groove member becomes the first grasping member. A screw member that is screwed and coupled into the other side wall of the groove member becomes the pressing member. Alternatively, an elastic member fixed to the other side wall may become the pressing member. The second grasping member may be fixed to the tip end of the screw member or the elastic member.

Further, in any of the above-summarized wearable display units, some portion in a part ranging from the attachment to the display support member holding part may be formed with a clearance part that extends in a direction including a directional component receding from a headphone speaker connected to the headphone arm, so that the display support member holding part keeps away from the headphone speaker when the attachment is coupled to the headphone arm.

Further, any of the above-summarized wearable display units may further comprise a display unit displacement means that changes the position and/or the direction of the image display unit in relation to the attachment.

Further, in any of the above-summarized wearable display units, it is desirable that at least the external shape of the image display unit is symmetrical in the up-down direction in a state that the attachment is coupled to the headphone arm.

Further, any of the above-summarized wearable display units may further comprise a detection means that detects whether the attachment has been coupled to the side of the right ear or the side of the left ear of the headphone arm. The unit may further comprise a display control means that turns an output image upside down based on a detection result of the detection means. When the fixing position of the attachment is changed, the top and the bottom of the image display unit are reversed accordingly. Thus, as this detection means, a gravity sensor may be used that detects up-and-down inversion. Or, in the case where the attachment is provided with the electric contacts of the display-side electric connection part, an electric current sensor may be used as the detection means. Here, the electric current sensor detects whether these electric contacts in the attachment are electrically connected with the electric contacts of the headphone-side electric connection on one of the left and right sides of the headphone.

Another embodiment of a wearable display unit further comprises an attachment that is provided in the display support member holding part and that can be coupled to and removed from the headphone. An electric connection part is provided in the attachment and connected to electric contacts provided in the headphone when the attachment is coupled to the headphone.

The attachment can be provided with a display unit displacement means that can change a position and/or a direction of the image display unit in relation to the attachment. In this configuration the electric connection part has lead wires, and lead wires of the electric connection part are arranged in the attachment and the display unit displacement means.

Another embodiment of a wearable display unit further comprises an attachment that can be coupled to and removed from a speaker of a headphone. An electric connection part can be included that can be electrically connected to and disconnected from a circuit provided in the headphone.

According to another aspect of the invention, headphones are provided. An embodiment comprises a pair of speakers and a headphone arm connecting the pair of speakers with each other. The embodiment further comprises electric connection parts provided in respective portions of the pair of speakers of the headphone arm. Each of the electric connection parts can be electrically connected to a wearable display unit having an image display unit for displaying an image in front of an eye of a user. The image display of which can be arranged near a user's eye, in such a manner that the electric connection can be disconnected.

The headphone arm can be formed with coupling portions at respective portions on sides of the pair of speakers, wherein the display unit can be coupled to and removed from each coupling portion. Each of the coupling portions can be provided with electric contacts of the electric connection that are connected to electric contacts provided in the wearable display unit when the wearable display unit is coupled to the coupling portion in question.

Another aspect of the invention is directed to headphones that comprise a speaker and a headphone arm connected with the speaker. In an embodiment the speaker is formed with a coupling portion to which a wearable display unit having an image display unit for displaying an image can be coupled in a removable manner. The coupling portion can be provided with an electric connection part that can be electrically connected to and disconnected from a circuit provided in the wearable display unit.

An auxiliary holding part can be provided at a position of the display support member or a position of the display support member holding part such that the auxiliary holding part is outside a field of vision of the user when a center of the field of vision is in a visual surface of the image display unit and the auxiliary holding part presses against the user's head. A pressing force generation means can be included that uses an elastic force and/or an electromagnetic force to generate a pressing force at the auxiliary holding part for pressing against the user's head.

Another embodiment of a wearable display unit can further comprise an auxiliary holding part that is provided in the display support member or the display support member holding part, in a neighborhood of a temporal part of the head on which the wearable display unit is mounted. The auxiliary holding part can be configured to press against the temporal part.

The wearable display unit further can comprises a pressing force generation means that uses an elastic force and/or an electromagnetic force to generate a pressing force at the auxiliary holding part for pressing against the user's head. The auxiliary holding part can be provided in such a manner that the auxiliary holding part can be displaced between a pressing position where the auxiliary holding part can press against the head and a retracted position where the auxiliary holding part cannot press against the head. The wearable display unit can further comprise a pressing force detection means that detects a level of a pressing force that the auxiliary holding part at the pressing position applies to the head. The pressing force generation means can be configured to control the pressing force such that the level detected by the pressing force detection means is kept within a predetermined range.

The display support member holding part can comprise a display support member housing part that houses the display support member. The display support member housing part can be configured to hold the display support member slidably between a projecting position where the image display unit is held in front of an eye of a user and a housed position where at least a part of the display support member retracted from the front of the eye of the user is housed in the display support member housing part. The auxiliary holding part can be configured to be at the retracted position when the display support member is at the housed position. The auxiliary holding part can be at the pressing position when the display support member is at the projecting position.

Another embodiment of a wearable display unit further comprises an attachment for fixing the display support member holding part to the head mounting member that is to be mounted on the user's head. The embodiment further includes an inclination adjustment means, configured to adjust an inclination of the display support member to the attachment, within a plane including a direction of action of the pressing force and the attachment. The inclination adjustment means can comprise a projection length adjustment means that adjusts a length of projection of the auxiliary holding part with respect to the display support member or the display support member holding part.

The inclination adjustment means can comprise a distance adjustment means that adjusts a distance from the attachment to the display support member holding part at a portion connecting the attachment and the display support member holding part.

The pressing force generation means can be arranged in the attachment or in a neighborhood of the attachment, to generate a force that makes a side of the image display unit of the display support member incline toward a direction of action of the pressing force.

The wearable display unit according to any of various embodiments can further comprise a joint that fixes the display support member holding part to the attachment in such a manner that the display support member holding part can swing in a plane including a direction of action of the pressing force and the attachment.

In yet another embodiment of a wearable display unit the wearable display unit further comprises an attachment that is fixed to a head mounting member that is mounted on a head of the user. The unit further comprises a joint part that fixes the display support member holding part to the attachment in such a manner that the display support member can swing in relation to the attachment, around a plurality of virtual axes having different directions from one another. In the joint part, the torque required for swinging around at least one virtual axis among the plurality of virtual axes can be different from the torque required for swinging around an of the other virtual axes. Here, the "virtual axis" conceptually includes not only an axis as a center of rotation of a joint structure that has an actual axis but also a center of rotation of a joint structure that does not have an actual axis.

The joint portion can comprise a first joint portion that holds the display support member holding part on the attachment such that the display support member can swing in relation to the attachment around a first virtual axis among the plurality of virtual axes. The joint portion can further include a second joint portion that holds the display support member holding part on the attachment such that the display support member can swing in relation to the attachment around a second virtual axis perpendicular to the first virtual axis.

The first joint part can comprise a base-side member that is fixed to or formed integrally with the attachment and a swing-side member that is fixed to the base-side member in such a way that the swing-side member can relatively rotate in relation to the base-side member around the first virtual axis. The second joint part can comprise a swing-side member that is fixed to or formed integrally with the display support member holding part and a base-side member that is fixed to the swing-side member in such a way that the base-side member can relatively rotate in relation to the swing-side member around the second virtual axis. In that case, it is favorable that the swing-side member of the first joint part and the base-side member of the second joint part be made of the same material.

One of the plurality of virtual axes can be a virtual axis around which the image display unit fixed to the display support member swings in a direction including a vertical direction in a state that the head mounting member is mounted on a head of the user and the attachment is coupled to the head mounting member. The torque required for swinging around the virtual axis in question desirably is larger than the torque required for swinging around the other virtual axes of the plurality of virtual axes.

In a device described in Patent Document 1, a part of the signal cables of the display device unit is fixed to the head mounting belt, and the fixing position of the display device unit on the head mounting belt can be changed. However, in a case in which the head mounting belt has the same function as a headphone, the wiring cables hang from the head mounting belt (i.e. the headphone) and wiring cables hang from the display device unit also. Thus, it is not convenient to use the head mounting belt. This problem is solved by any of various embodiments of a wearable display system as summarized above. An exemplary embodiment comprises a headphone that can be mounted on a head and that comprises a speaker and a headphone arm connected with the speaker. The embodiment includes a wearable display unit that comprises an image display unit, which can be arranged near a user's eye, and can be coupled to the headphone. The wearable display unit has an attachment that can be coupled to and removed from the headphone. The wearable display unit and the headphone have respective electric connection parts that can be electrically connected and disconnected with and from each other.

Another embodiment of a wearable display unit includes an image display unit that can be arranged near a user's eye and that displays an image in front of a user's eye. The wearable display unit further comprises an attachment that can be coupled to and removed from a headphone. The unit further comprises a holding part that connects the image display unit to the attachment. An electric connection part is provided in the attachment, with the electric connection part being connected to electric contacts provided in the headphone whenever the attachment is coupled to the headphone.

Another embodiment of a wearable display unit includes an image display unit that can be arranged near a user's eye and that displays an image. The unit comprises an attachment that can be coupled to and removed from a speaker of a headphone that can be mounted on a head. An electric connection part is provided that can be electrically connected to and disconnected from a circuit provided in the headphone.

In a device described in Patent Document 2, the anti-swing member interrupts a part of a center of the field of vision of a user's eye when the user's eye views an image of the image display unit. Consequently, visibility of surroundings sometimes becomes worse. In view of these shortcomings, an embodiment of a wearable display unit is provided herein that displays an image in front of an eye of a user. The unit comprises an image display unit that displays an image. A holding part is provided that can hold the image display unit at a position in front of the eye of the user. An attachment is used for fixing the holding part to a head mounting member that is mounted on the head of the user. An auxiliary holding part is provided on the holding part at a position that is outside a field of vision of the user when a center of the field of vision of the user lies within a visual surface of the image display unit, with the auxiliary holding part being pressed against the user's head. The unit further comprises a pressing force generation means that uses an elastic force and/or an electromagnetic force to generate a pressing force at the auxiliary holding part so that the auxiliary holding part presses against the head.

Another embodiment of a wearable display unit comprises an image display unit that displays an image, and a holding part that can hold the image display unit at a position in front of the eye of the user. An attachment is provided that fixes the holding part to a head mounting member that is mounted on the user's head. An auxiliary holding part is provided on the holding part in a neighborhood of a temporal part of the head on which the head mounting member is mounted, with the auxiliary holding part pressing against the temporal part.

In a device as described in Patent Document 3, swinging of the image display unit in the vertical direction and in the horizontal direction is realized by means of a spherical seat provided in a connection part between the display support member and the coupling portion. Thus, swinging in any direction requires the same torque. As a result, if the torque required for swinging in the horizontal direction is made smaller so that a smaller force can produce swinging in the horizontal direction, the torque required for swinging in the vertical direction becomes smaller at the same time. As a result, sometimes the image display unit moves downward automatically owing to its own weight. On the other hand, if the torque required for vertical swinging is made larger, the torque required for horizontal swinging becomes larger at the same time. As a result, it becomes difficult to adjust the position horizontally. Thus, with a device as disclosed in Patent Document 3, difficult operation is required for adjusting the position of the image display unit. To solve this problem, an embodiment of a wearable display unit is provided that has an image display unit for displaying an image in front of an eye of a user and that can be arranged near a user's eye. The wearable display unit comprises an attachment to be coupled to a head mounting member that is mounted on a head of the user. The unit also includes a holding part having one end fixed to the image display unit while the other end of the holding part extends to a position opposed to the attachment. The unit also comprises a joint part that fixes the holding part to the attachment such that the holding part can swing relatively to the attachment around a plurality of virtual axes extending in respective directions different from one another. In the joint part, the torque required for swinging around at least one virtual axis among the plurality of virtual axes is different from the torque required for swinging around the other virtual axes.

In various embodiments as described herein, anti-rotation means is provided. As a result, even in a state in which the display support member can move in the neighborhood of the projecting position, it is possible to prevent rotation of the display support member in relation to the display support member holding part with respect to rotation whose direction is within a plane perpendicular to the longitudinal direction of the display support member.

Further, one cable can be used for supplying an audio signal supplied to a headphone and an image signal supplied to the wearable display unit, thereby improving the usability of the wearable display system.

Further, various embodiments can provide a wearable display unit that can suppress vibration of the image display unit is suppressed without damaging visibility of surroundings. In various embodiments, in the joint part for fixing the holding part of the image display unit swingably to the attachment, the torque required for swinging around one virtual axis among a plurality of virtual axes is different from the torque required for swinging around the other virtual axes. Thus, automatic displacement of the image display unit can be prevented, and the position of the image display unit can be adjusted by easy operation.

DETAILED DESCRIPTION

Various embodiments of the wearable display system will be described.

[First Embodiment]

In the beginning, will be described a first embodiment of a wearable display system having an image display unit, the image display unit of which can be arranged near a user's eye.

Figure 1:
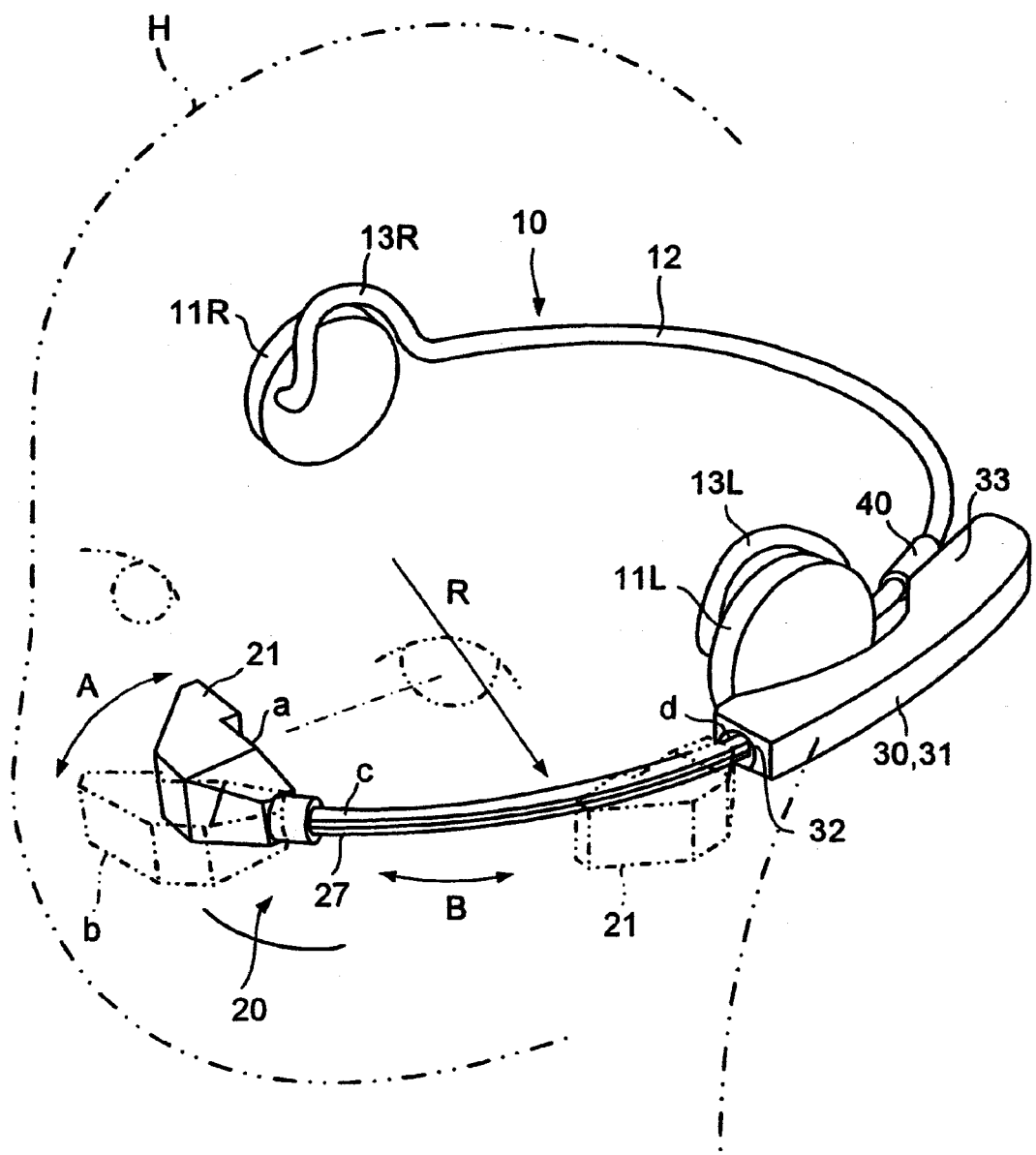
FIG. 1 is a perspective view showing a wearable display system having an image display unit of a first embodiment, the image display unit of which can be arranged near a user's eye.
Figure 2:
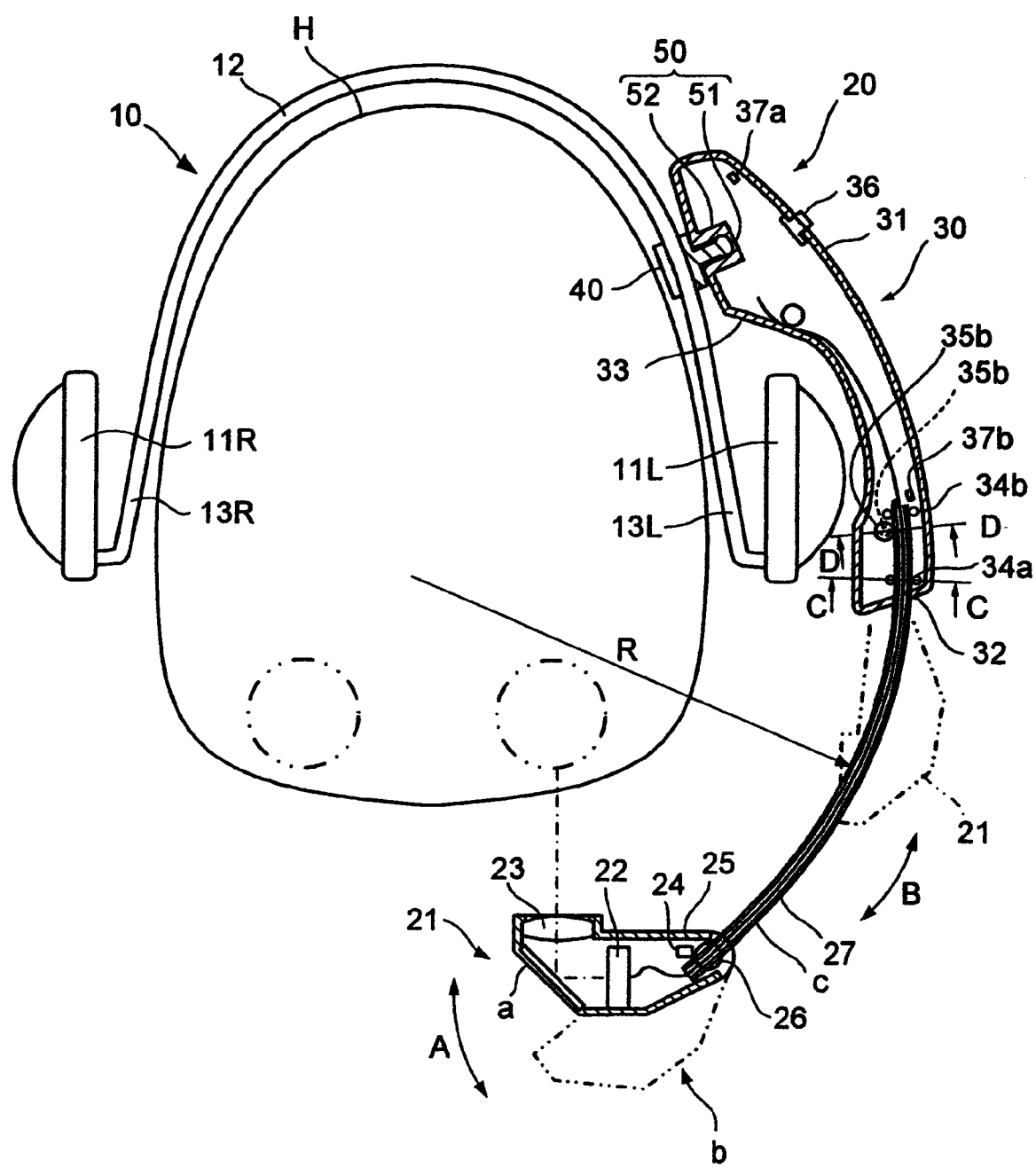
FIG. 2 is a partially-cutaway plan view showing main parts of the wearable display system (in a state of a projecting position) of the first embodiment.
Figure 3:
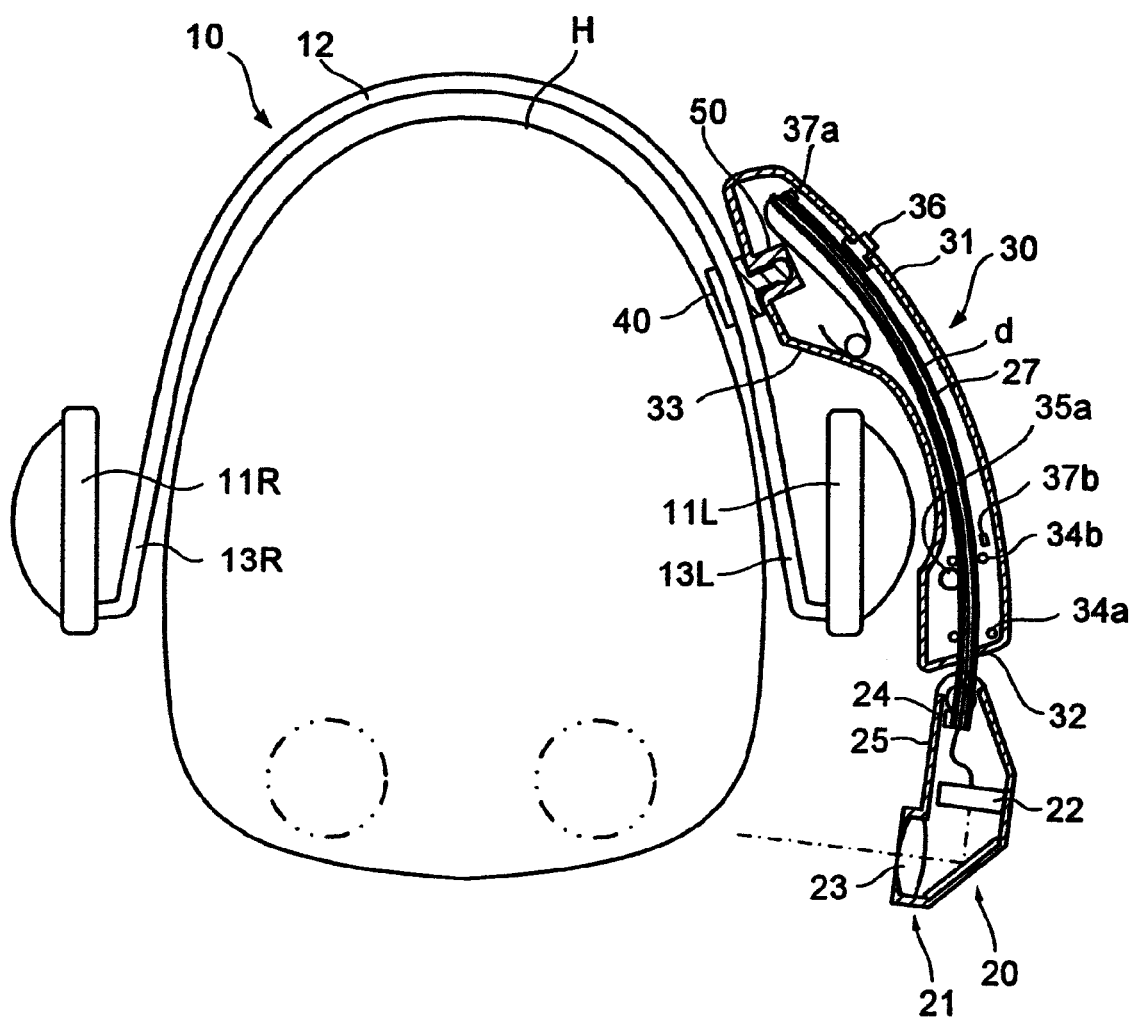
FIG. 3 is a partially-cutaway plan view showing the main parts of the wearable display system (in a state of a retracted position) of the first embodiment.

As shown in FIGS. 1-3, the wearable display system of the present embodiment comprises: headphones 10 that can be mounted on the head H of a user; and a wearable display unit 20 that is fixed to the headphones 10. FIG. 1 is a perspective view showing the wearable display system of the first embodiment. FIG. 2 is a cutaway plan view showing main parts of the wearable display system (in a state of a projecting position). And, FIG. 3 is a cutaway plan view showing the main parts of the wearable display system (in a state of a retracted position).

The headphones 10 of this wearable display system comprises: left and right speakers 11L and 11R; and an arm 12 that connects the left and right speakers 11L and 11R with each other. Both end portions of the arm 12 are curved such that these end portions can be placed on the left and right ears of the user. Thus, these end portions form earpieces 13L and 13R. The headphones 10 are rear-arm type headphones whose arm 12 is positioned around the back of the head of a user.

The wearable display unit 20 comprises: an image display unit 21 that displays an image in front of a user's eye; a display support member 27 that fixes the image display unit 21 at its end portion; a display support member holding part 30 that supports the display support member 27 slidably; and an attachment 40 that fixes the display support member holding part to the headphone arm 12.

The display support member 27 has a bar shape curved smoothly at a radius of curvature R. When the wearable display unit 20 is mounted on the head H of the user, the center of curvature of the display support member 27 lies inside the head H. This display support member 27 is supported by the display support member holding part 30 such that the image display unit 21 can move between a retracted position d (FIG. 3) and a projecting position c (FIGS. 1 and 2) along a locus B corresponding to the curved shape of the display support member 27. At the retracted position d, the display support member 27 is housed in the display support member holding part 30. And, at the projecting position c, the display support member 27 projects from the display support member holding part 30 and the image display unit 21 can display an image in front of a user's eye. Further, the image display unit 21 is fixed at the end portion of the display support member 27 in such a way that the display unit 21 can swing in the direction of the arrow A between a displayable position a where a visual surface of the image display unit 21 faces a user's eye and non-displayable position b where the display screen is inclined at a angle larger than or equal to a certain angle with the line of sight of the user's eye. The length of the display support member 27 is determined such that the display screen of the image display unit 21 can be at a distance of 20 mm or more from the user's eye when the image display unit 21 is at the displayable position. Here, the distance of 20 mm or more is determined considering the case where a user uses a pair of glasses. Thus, since the display support member 27 has the curved shape and the image display unit 21 can move depicting the locus B corresponding to the curved shape, the image display unit 21 can move safely without interfering with the head.

As shown in FIGS. 2 and 3, the image display unit 21 comprises: a display device 22; an optical system 23 for leading an image displayed by the display device 22 to a user's eye; a display unit position detection sensor 24 for detecting whether the image display unit 21 is in the above-mentioned displayable position or in the non-displayable position; and a display unit housing 25 that houses these components. The display unit housing 25 is formed with a fixing member 26 that is fixed to the end portion of the display support member 27. The display unit position detection sensor 24 is an optical sensor and detects whether the image display unit 21 is in the displayable position or the non-displayable position based on a change of a relative position of the display support member 27 within the display unit housing 25.

The display support member holding part 30 comprises: a display support member housing 31 formed with an internal space that can house the display support member 27; guide rollers 34a and 34b that can support the display support member 27 slidably; a driving roller 35a that makes the display support member 27 slide; a display support member driving motor 35b that makes the driving roller 35a rotate; a retraction detection sensor 37a that detects whether the display support member 27 is in the above-mentioned retracted position d or not; a projection detection sensor 37b that detects whether the display support member 27 is in the above-mentioned projecting position c or not; and a display support member drive switch 36 for instructing operation of the display support member driving motor 35b.

The internal space of the display support member housing 31 is curved correspondingly to the curved shape of the display support member 27. In one end (hereinafter, referred to as a forward end) of the display support member housing 31, there is formed a display support member insertion hole 32 through which the display support member 27 enters and exits the display support member housing 31. And, in the other end (hereinafter, referred to as a rear end) of the display support member housing 31, there is formed a clearance part 33. The clearance part 33 is a part that extends in a direction for keeping away from the headphone arm 12 so as to prevent interference between the speaker 11L or 11R of the headphones 10 and the display support member housing 31 when the attachment 40 is coupled to the headphone arm 12. In the neighborhood of the display support member insertion hole 32 of the display support member housing 31, a pair of guide rollers 34a, 34b is provided in each of two places along a moving path B of the display support member 27. Between the guide rollers 34a on the forward end side and the guide rollers 34b on the rear end side, the driving roller 35a is provided on the inner side of the curved display support member 27, i.e. on the side of the user's head.

Figure 4:
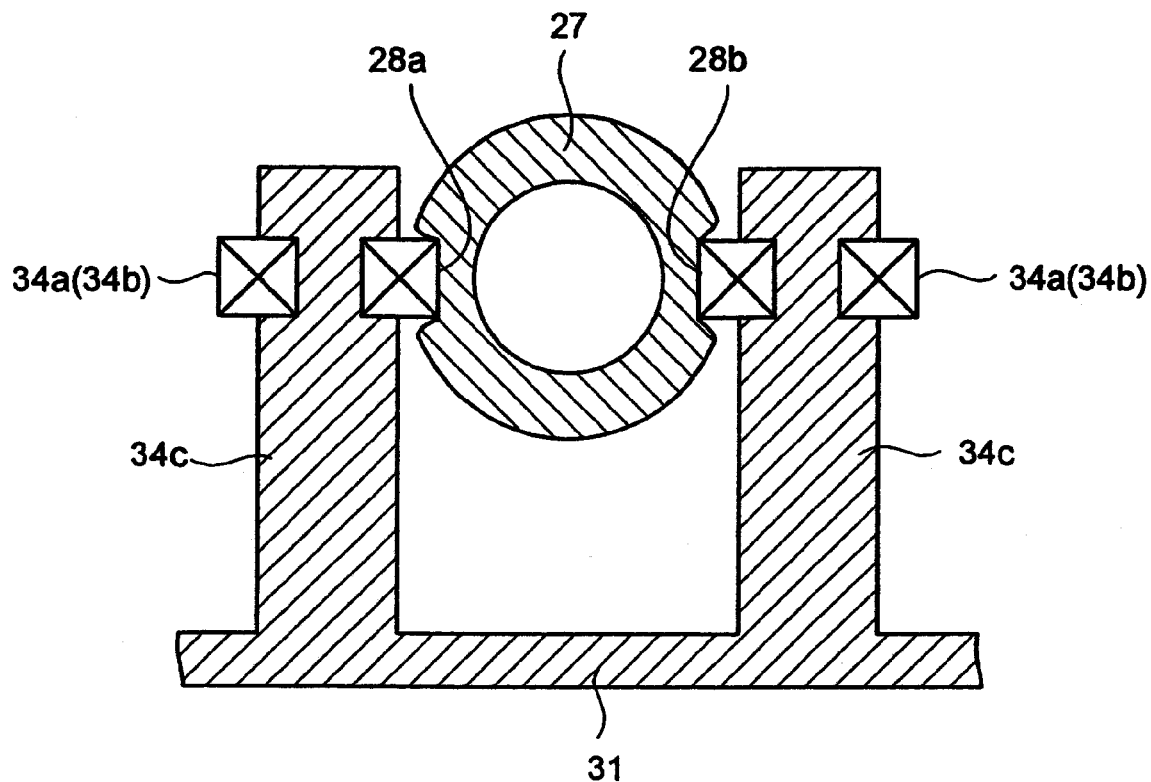
FIG. 4 is a cross section taken along the C-C line in FIG. 2.
Figure 5:
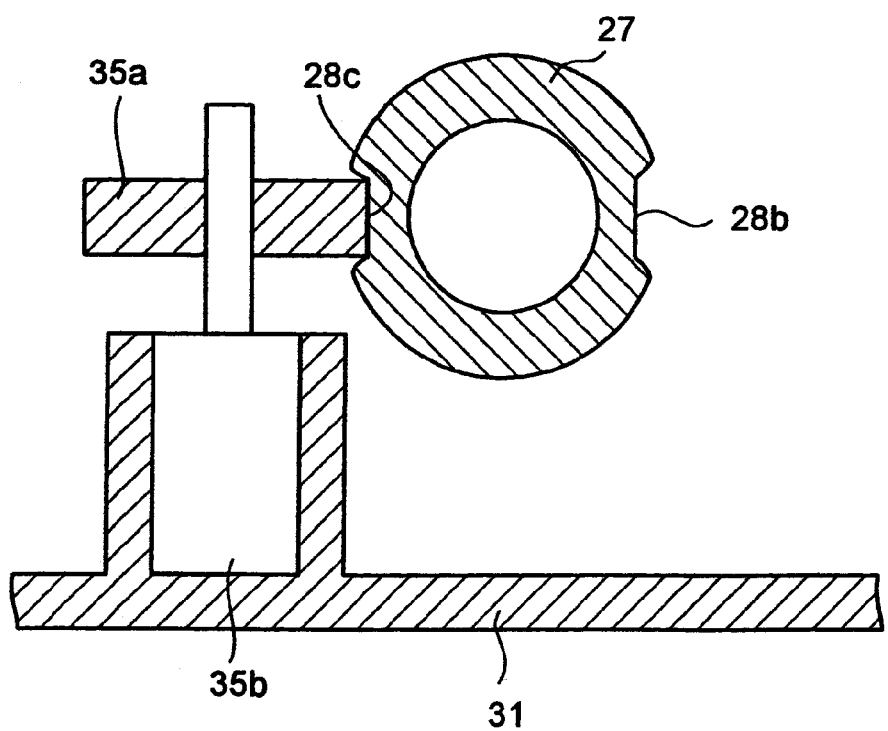
FIG. 5 is a cross section taken along the D-D line in FIG. 2.

As shown in FIGS. 4 and 5, the shape of the outer periphery of the display support member 27 in a cross section perpendicular to its longitudinal direction has parts of different distances from the center of gravity of the cross section. In other words, that shape is not a circle. Or, in more concrete terms, the shape is nearly circular, but formed with grooves 28a and 28b on the inner side and the outer side (i.e. the other side) of the curved display support member 27 respectively, to form anti-rotation-shape parts. Thus, the shape of the cross section of the display support member 27 is not circular in order to prevent rotation around its longitudinal axis. The grooves 28a and 28b on the internal and outer sides of the display support member 27 extend in the longitudinal direction of the display support member 27. Here, FIG. 4 shows the cross section taken along the C-C line in FIG. 2, and FIG. 5 the cross section taken along the D-D line in FIG. 2.

As shown in FIG. 4, the above-mentioned pair of guide rollers 34a, 34a (34b, 34b) is in contact with the insides of the grooves 28a and 28b (i.e. the anti-rotation-shape parts) of the display support member 27 and thus becomes abutting parts that abut on the anti-rotation-shape parts. Each guide roller 34a (34b) is rotatably mounted on a roller shaft 34c provided in the display support member housing 31. Further, the above-mentioned driving roller 35a also is in contact with the bottom of the groove 28a on the inner side of the display support member 27, as shown in FIG. 5. The driving roller 35a is mounted on a driving shaft of the display support member driving motor 35b fixed within the display support member housing 31. Thus, by arranging the driving roller 35a and the display support member driving motor 35b on the inner side of the display support member 27, the heavy component is positioned near to the head of a user as shown in FIG. 2. This can improve stability at the time of movement of the head and reduce extension of the display support member housing 31 toward the outer side of the display support member, i.e. in the direction of getting away from the head.

Figure 6A:
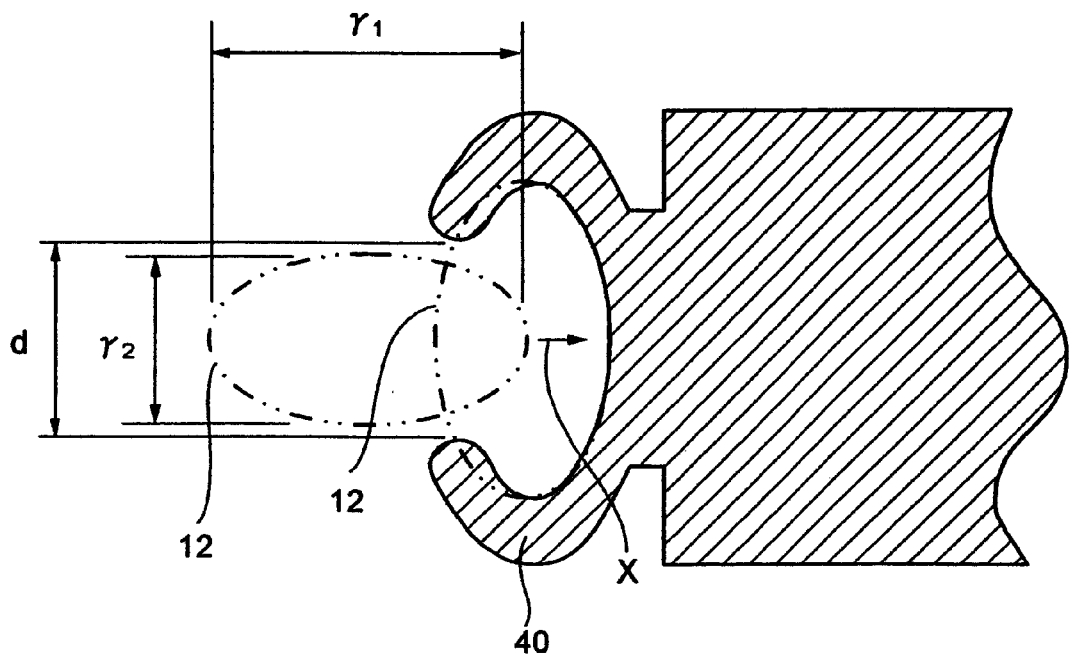
FIG. 6 is a cross section showing an attachment of the wearable display unit of the first embodiment.
Figure 6B:
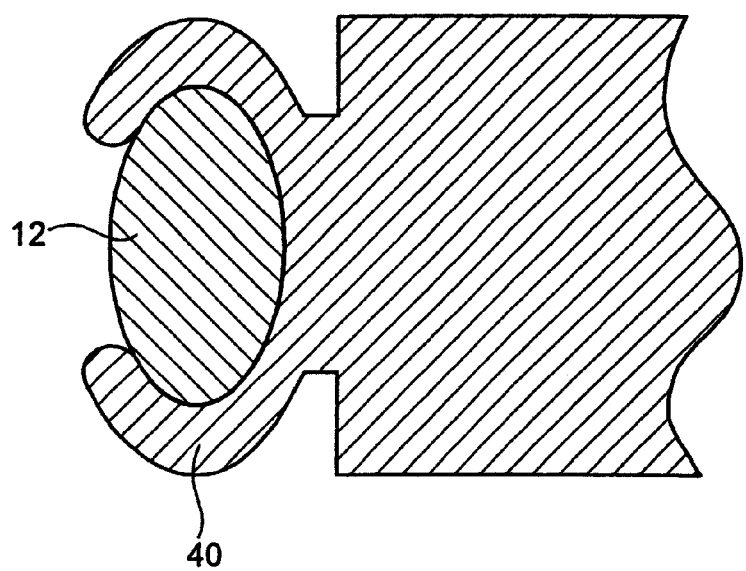

As shown in FIG. 6A, the attachment 40 is made of an elastic material such as resin and is formed to have a C-shaped cross section. A space d of the opening of the C-shape is slightly larger than the minor axis γ2 of the headphone arm 12 whose cross section is an ellipse, although smaller than the major axis γ1 of the headphone arm 12. Thus, the headphone arm 12 can be easily put into the attachment 40 by making the minor axis γ2 of the headphone arm 12 vertical and thereafter by bringing the headphone arm 12 close to the opening of the attachment 40 in the X direction shown in the figure. Then, by relatively rotating the headphone arm 12 through 90 degrees, the headphone arm 12 is completely fitted in the attachment 40 as shown in FIG. 6B. At that time, the attachment 40 is elastically deformed to be slightly widened, and thus the attachment 40 grasps the headphone arm 12 tightly. As a result, the wearable display unit 20 has been fixed to the headphone arm 12.

Thus, according to the present embodiment, the wearable display unit 20 can be fixed to the headphone arm 12 by simply grasping the headphone arm 12. As a result, the wearable display unit 20 can be used in many different ways. Further, in the present embodiment, the attachment 40 grasps the headphone arm 12 by its elastic deformation, and can adapt to a headphone arm 12 having a slightly different cross section. Further, the headphones 10 do not have a special fixing structure for the wearable display unit, and thus the beauty of the headphones is improved when it is used as a single item.

As shown in FIGS. 2 and 3, the clearance part 33 of the display support member housing 31 is provided with a displacement mechanism 50. The displacement mechanism 50 is provided for changing the position and direction of the image display unit 21 relatively to the attachment 40. The displacement mechanism 50 comprises a ball 51 provided in the attachment 40 and a ball socket 52 formed in the clearance part 33 of the display support member housing 31. Frictional force larger than a certain magnitude acts between the ball 51 and the ball socket 52. Thus, the ball socket 52 can not rotate relatively to the ball 51 unless turning force larger than a certain magnitude acts on the ball socket 52 in relation to the ball 51.

Since the displacement mechanism comprises the ball 51 and the ball socket 52 as described above, the display support member holding part 30, the display support member 27 held by the display support member holding part 30 and the image display unit 21 fixed to the display support member 27 can be displaced around each of three independent axes in the three-dimensional space.

This displacement mechanism 50 may be provided between the display support member holding part 30 and the image display unit 21, or may be provided in the display support member holding part 30. However, the displacement mechanism 50 has its own weight. And, it is favorable to provide the displacement mechanism 50 between the attachment 40 and the display support member holding part 30 as in the present embodiment, in order to reduce the moment around the attachment 40 as far as possible. Further, in the present embodiment, the ball 50 is formed on the side of the attachment 40. It is needless to say, however, that the ball 50 can be formed on the side of the display support member housing 31 and the ball socket 52 on the side of the attachment 40.

Figure 7:
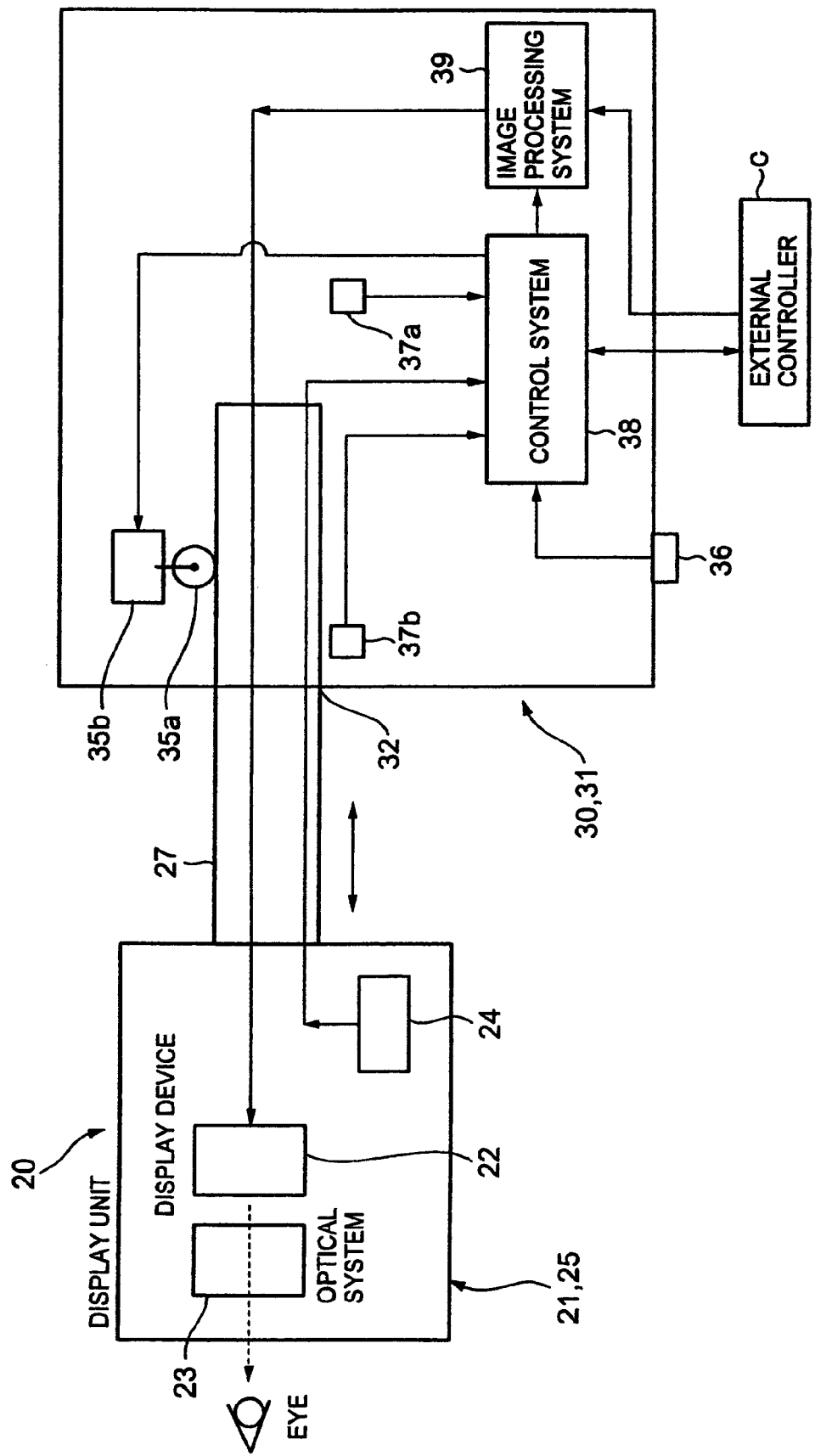
FIG. 7 is a circuit block diagram of the wearable display unit of the first embodiment.
Figure 8:
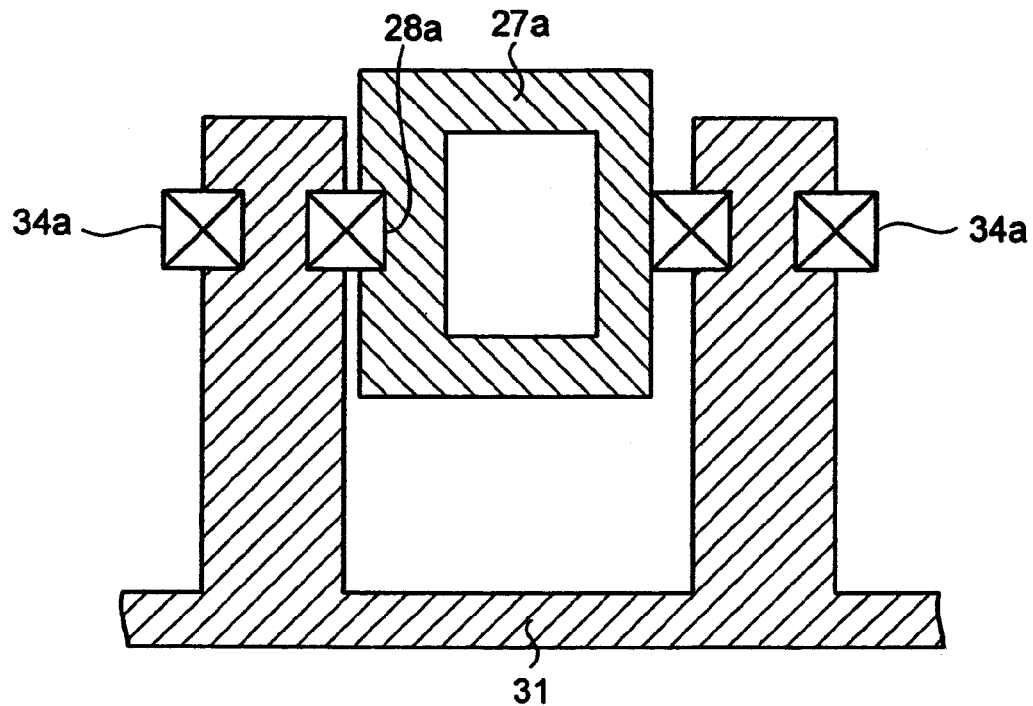
FIG. 8 is a cross section showing a first variant of the display support member and its holding part of the wearable display unit of the first embodiment.

FIG. 7 is a circuit block diagram showing the present wearable display system.

The display support member housing 31 of the display support member holding part 30 is provided with the driving roller 35a, the display support member driving motor 35b, the retraction detection sensor 37a, the projection detection sensor 37b, the display support member drive switch 36, and in addition, a control system 38 and an image processing system 39. The control system 38 controls the display support member driving motor 35b based on signals from the various sensors 24, 37a and 37b and the display support member drive switch 36. The image processing system 39 sends an image signal to the display device 22 of the image display unit 21 based on a signal from an external controller C.

It is possible that the external controller C sends an audio signal to the headphones 10 through the wearable display unit 20. Or, reversely, it is possible that the external controller C sends the image signal, a control signal and the like in addition to the audio signal to the headphones 10, and the headphones 10 in turn send the image signal, the control signal and the like among those signals to the wearable display unit 20. In the case where all the signals are sent to one of the headphones 10 and the wearable display unit 20 and then signals required for the other component are sent from the component that has received all the signals, it is necessary that both components are provided with respective electric connection parts that can be disconnected, in order to connect both electrically.

Next, will be described manipulation and associated operation of the wearable display unit 20 in the present embodiment.

First, the attachment 40 of the wearable display unit 20 is coupled to the headphone arm 12 as described above. Then, the headphones 10 fixed with the wearable display unit 20 are mounted on the head. At that time, as shown in FIG. 3, the image display unit 21 of the wearable display unit 20 is positioned in the non-displayable position b and the display support member 27 is in the retracted position d.

Next, when the display support member drive switch 36 of the wearable display unit 20 is pushed, the control system 38 detects an ON/OFF state of the display support member drive switch 36 and outputs a display support member drive control signal to the display support member driving motor 35b so that the display support member driving motor 35b starts driving the display support member 27 to project. At that time, the display support member 27 and the image display unit 21 move along the locus B corresponding to the curved shape of the display support member 27. When the display support member 27 reaches the projecting position c, the projection detection sensor 37b detects this and informs the control system 38 of this fact. Then, a projection off signal sent from the control system 38 stops the display support member driving motor 35b, and the display support member 27 stops at the projecting position c.

When the image display unit 21 is manually moved from the non-displayable position b to the displayable position a as shown in FIGS. 1 and 2 in a state where the display support member 27 is in the projecting position c, the display unit position detection sensor 24 detects this change of position and informs the control system 38 of this fact. The control system 38 informs the external controller C of the fact that the image display unit 21 reaches the displayable position. Then, the external controller C knows that the wearable display unit 20 is ready to send the image signal. When a play button of the external controller C is pushed in this state, the external controller C sends the image signal to the image processing system 39. The image processing system 39 in turn sends the image signal to the display device of the image display unit 21 to reproduce an image based on the image signal. Here, instead of pushing the display support member drive switch 36 at the beginning, it may be arranged as follows. Namely, when the play button of the external controller C is pushed, the external controller C sends the display support member drive control signal to the control system 38 to carry out the above-mentioned series of operations.

To stop the reproduction of the image, the image display unit 21 is manually moved from the displayable position a to the non-displayable position b. Then, the display unit position detection sensor 24 detects this change of position, and informs the control system 38 of this change. The control system 38 informs the external controller C of the fact that the image display unit 21 reaches the non-displayable position b to stop sending of the image signal from the external controller C.

Next, when the display support member drive switch 36 of the wearable display unit 20 is pushed, the control system 38 detects an ON/OFF state of the display support member drive switch 36 and outputs the display support member drive control signal to the display support member driving motor 35b so that the display support member driving motor 35b starts driving the display support member 27 to retract. In this retraction process, the display support member 27 moves along the locus B corresponding to its own curved shape. When the display support member 27 reaches the retracted position d, the retraction detection sensor 37a detects this and informs the control system 38 of this fact. Then, a retraction off signal sent from the control system 38 stops the display support member driving motor 35b, and the display support member 27 stops at the retracted position d.

Thus, in the present embodiment, the display support member 27 and the image display unit 21 move along the locus corresponding to the curved shape of the display support member 27. As a result, the display support member 27 and the image display unit 21 move along the head of a user, and it is possible to suppress the distance between these components and the user's head to the minimum distance that does not cause interference with the user's head. This reduces the possibility that the image display unit 21 and the like touch other things even when the user's head moves during movement of the image display unit 21 and the display support member 27.

Further, in the present embodiment, when the image display unit 21 does not display an image, the display support member 27 is at the retracted position where the display support member 27 is housed in the display support member housing 31. This reduces the moment of the wearable display unit 20 around the attachment 40 that is coupled to the headphone arm 12 as a head mounting belt. As a result, it is possible to reduce swinging of the wearable display unit 20 even if the user's head moves in a state that the image display unit 21 is retracted and the user's field of vision is ensured. This improves the comfort of the mounted wearable display unit 20.

Further, in the present embodiment, the groove 28a is formed in the display support member 27 and the guide rollers 34a and 34b and the driving roller 35a are made to be in contact with the bottom of the groove 28a. This prevents rotation of the display support member 27 around its longitudinal axis whether the display support member 27 is moving or not.

Next, referring to FIGS. 8-17, will be described various variants of the anti-rotation-shape parts of the above-described wearable display unit 20 as well as various variants of the abutting parts that abut on the anti-rotation-shape parts. FIGS. 8-10, 12 and 13 are cross sections at the respective positions that correspond to the cross section at the C-C line in FIG. 2. Further, FIG. 11 is an explanatory view for illustrating difference in working methods according to a position of a groove to be formed in a curved bar-shaped member.

In a first variant, the shape of cross section of the display support member 27a is almost rectangular and a groove is formed in one side of the display support member 27a. A guide roller 34a on the inner side of the display support member 27a is in contact with the inside of the groove 28a formed in one side of the display support member 27a, and a guide roller 34a on the outer side is in contact with the other side of the display support member 27a. Thus, in the case of the display support member 27a having the cross section of the almost rectangular shape also, it is possible to prevent rotation of the display support member 27a around its longitudinal axis. Further, even if the groove is formed only in the inner side of the display support member 27a, it is possible to control rotation of the display support member 27a as well as its movement in a direction other than the longitudinal direction, as long as the guide roller 34a enters the groove 28a on the inner side.

In this variant and the above-described embodiment, the groove(s) of the display support member is (are) formed in the inner side or (and) the outer side, i.e. the left or (and) right side(s) of the display support member 27, 27a. However, basically same effects can be obtained when grooves of the display support member are formed instead in the top and/or the bottom of the display support member 27, 27a.

Figure 11:
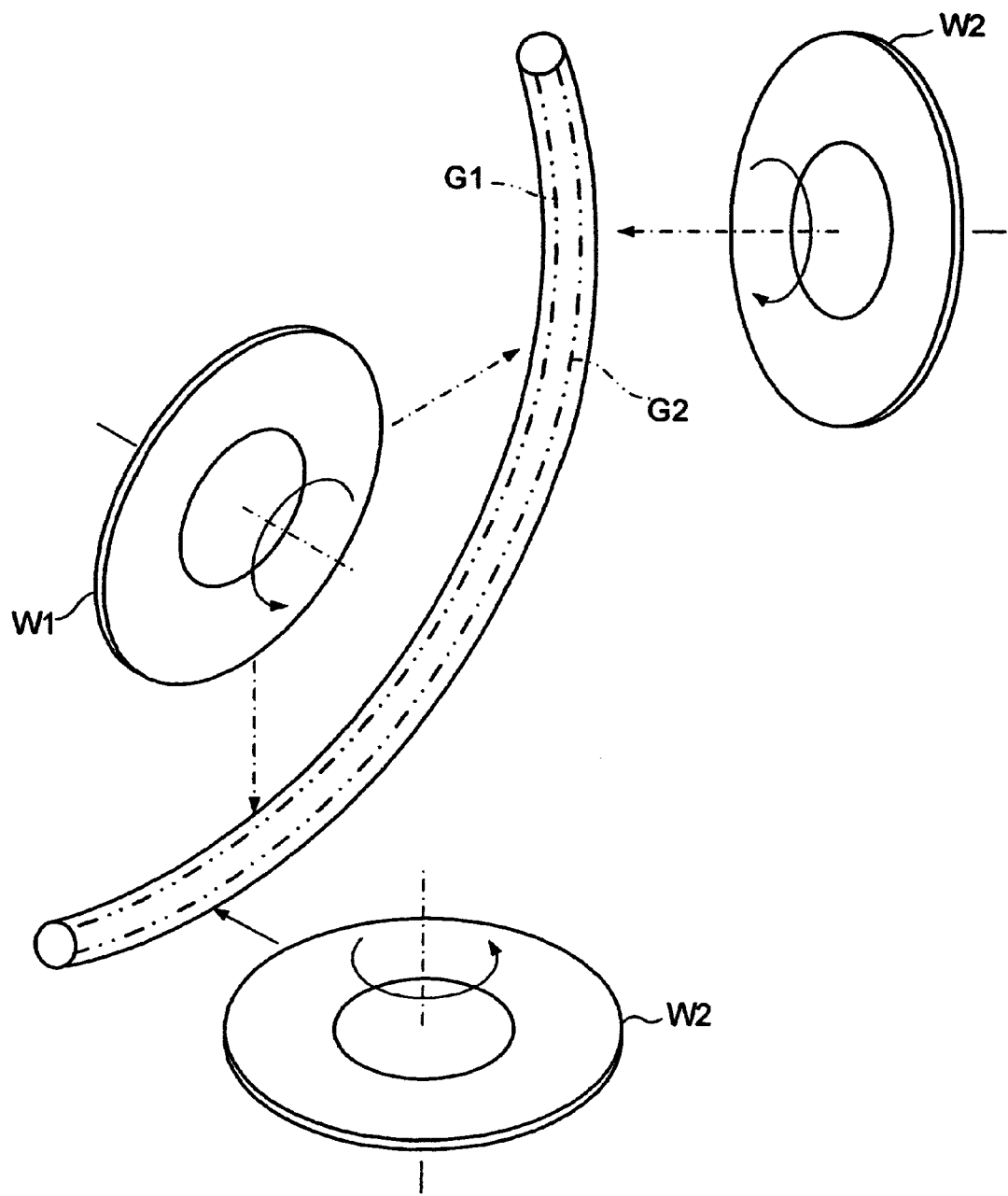
FIG. 11 is an explanatory view for explaining difference in working methods according to a position of a groove to be formed in a curved bar-shaped member.

However, when a groove is formed in a curved bar-shaped member by means of a disk-shaped working tool W1, W2 as shown in FIG. 11, a groove G1 can be formed without changing the direction of the rotation axis of the disk-shaped working tool W1 in the case where the groove G1 is to be formed on the inner side and/or the outer side of the curved bar-shaped member. On the other hand, when a groove G2 is to be formed on a side perpendicular to the inner side-outer side direction of the curved bar-shaped member, the direction of the rotation axis of the disk-shaped working tool W2 should be changed successively as the working tool W2 moves. Thus, from the viewpoint of groove working, it is favorable to form the groove(s) on the inner side and/or the outer side of the curved display support member.

Figure 9:
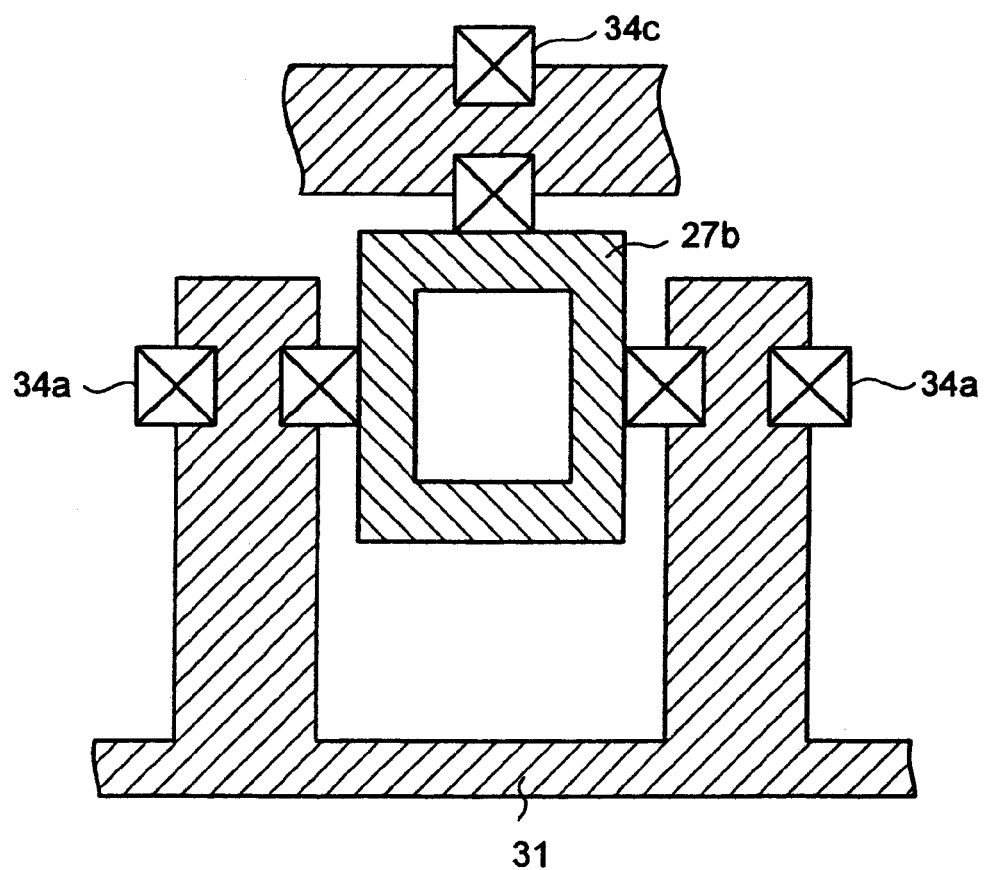
FIG. 9 is a cross section showing a second variant of the display support member and its holding part of the wearable display unit of the first embodiment.
Figure 10:
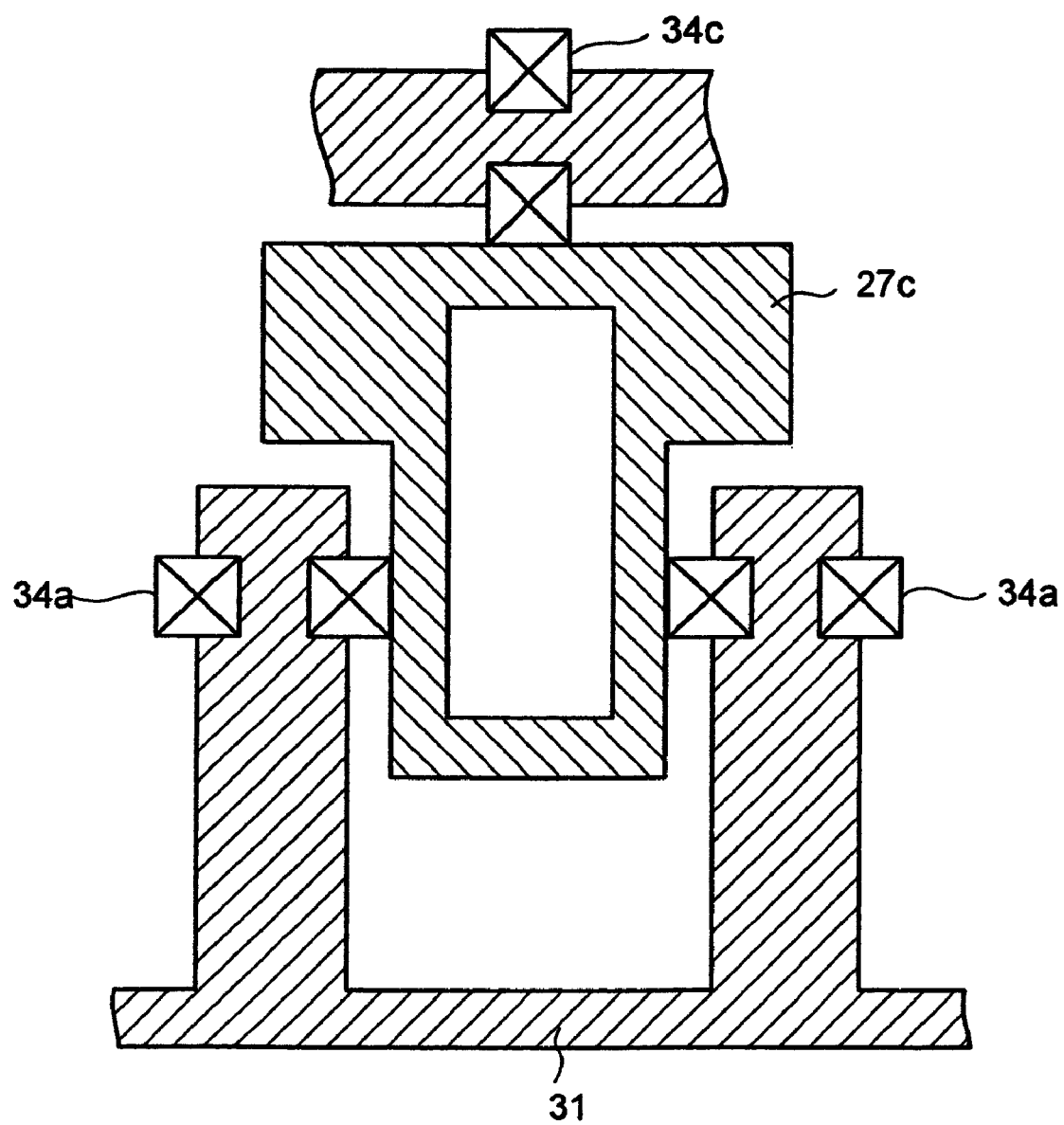
FIG. 10 is a cross section showing a third variant of the display support member and its holding part of the wearable display unit of the first embodiment.

Second and third embodiments are shown in FIGS. 9 and 10 respectively, and, in these embodiments, the cross section of each display support member 27b, 27c has the shape of a rectangle or two-tiered vertical and horizontal rectangles in which no groove is formed. These variants also can prevent rotation of the display support member 27b, 27c around its longitudinal axis as in the above embodiment and the first variant. However, these second and third variants do not have a groove differently from the above embodiment and the first variant. Accordingly, to control movement of the display support member 27b, 27c in the up-and-down direction, i.e. the direction perpendicular to the inner side-outer side direction, it is necessary to provide a guide roller 34c at a position in the up-and-down direction.

Figure 12:
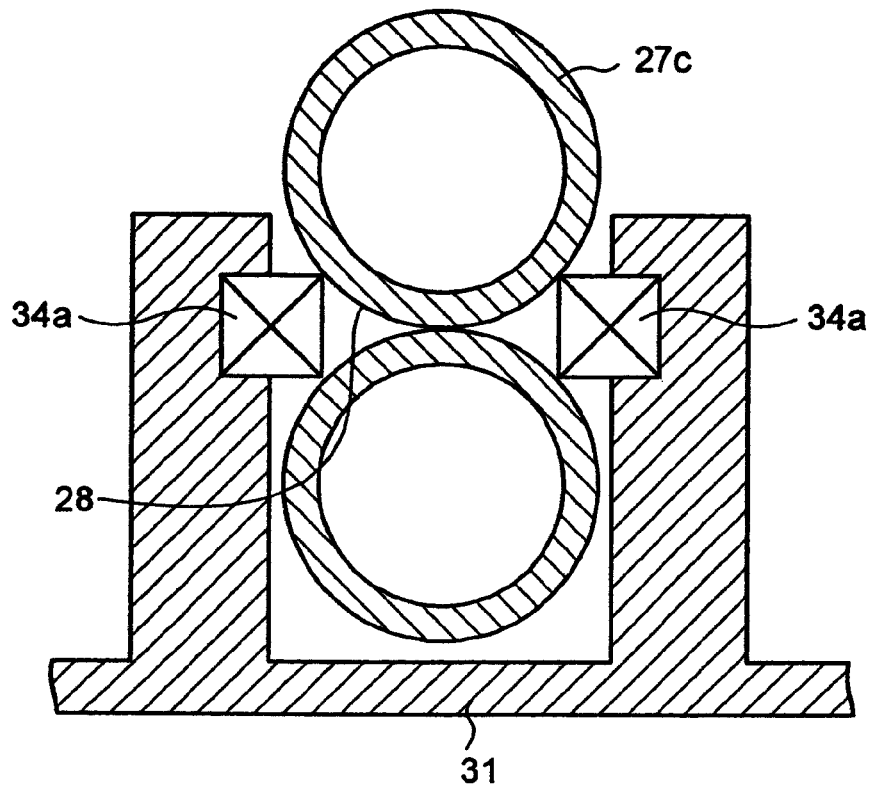
FIG. 12 is a cross section showing a fourth variant of the display support member and its holding part of the wearable display unit of the first embodiment.
Figure 13:
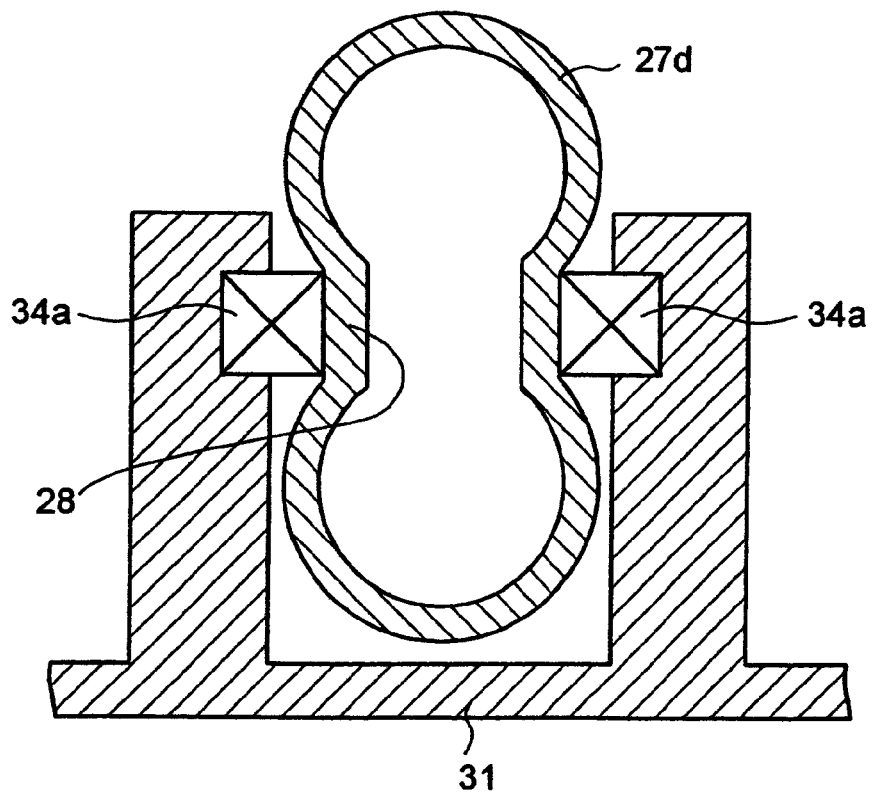
FIG. 13 is a cross section showing a fifth variant of the display support member and its holding part of the wearable display unit of the first embodiment.
Figure 14:
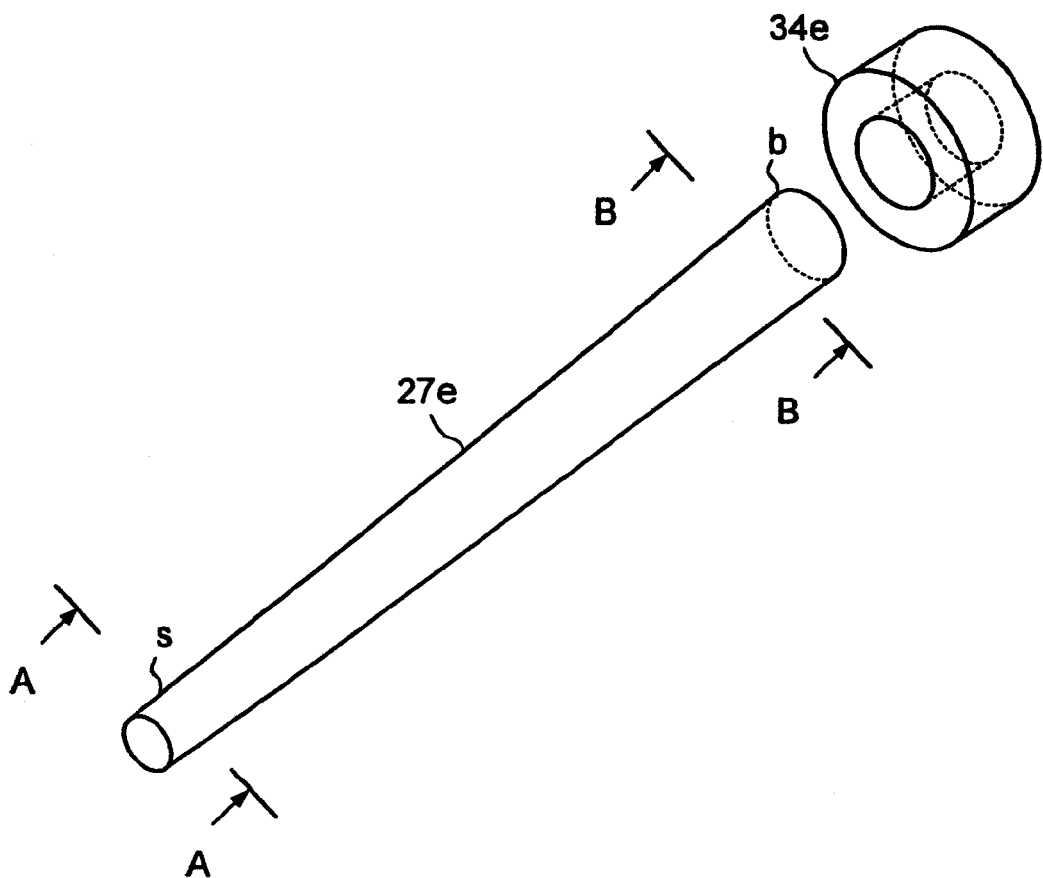
FIG. 14 is a cross section showing a sixth variant of the display support member and its holding part of the wearable display unit of the first embodiment.

Fourth and fifth variants are shown in FIGS. 12 and 13 respectively. Each display support member 27c, 27d of these variants has a cross section of a circle-on-circle shape. In detail, a cross section of the display support member 27 of the fourth variant has a shape of two circles tangent to each other. On the other hand, a cross section of the display support member 27d of the fifth variant has a shape of two slightly-separated circles having connection parts between them. Each display support member 27c, 27d of these variants forms a groove 28 at a part of opposed arcs, and a guide roller 34a is in contact with this groove 28.

In sixth and seventh variants shown in FIGS. 14-17, each display support member 27e, 27a has different cross sections at the tip portion s at which the image display unit is fixed and at the base portion b on the other side. Further, each display support member 27e, 27f is supported by a slide shoe 34e, 34f. Each slide shoe 34e, 34f is fixed to the display support member insertion hole 32 shown in FIG. 1.

Figure 15A:
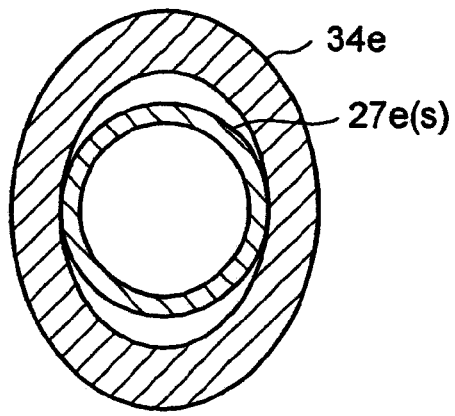
FIG. 15 is a cross section showing the sixth variant of the display support member and its holding part of the wearable display unit of the first embodiment, FIG. 15A being a cross section showing the display support member and a slide shoe seen along the A-A line in FIG. 14, and FIG. 15B a cross section showing the display support member and the slide shoe seen along the B-B line in FIG. 14.
Figure 15B:
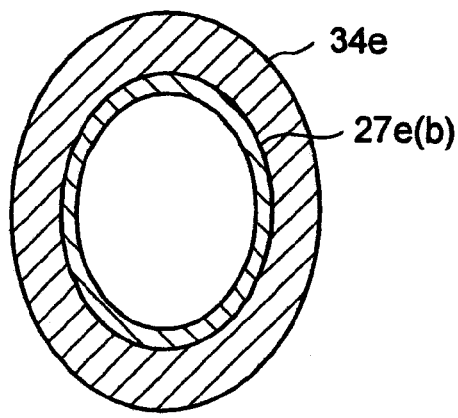
Figure 16:
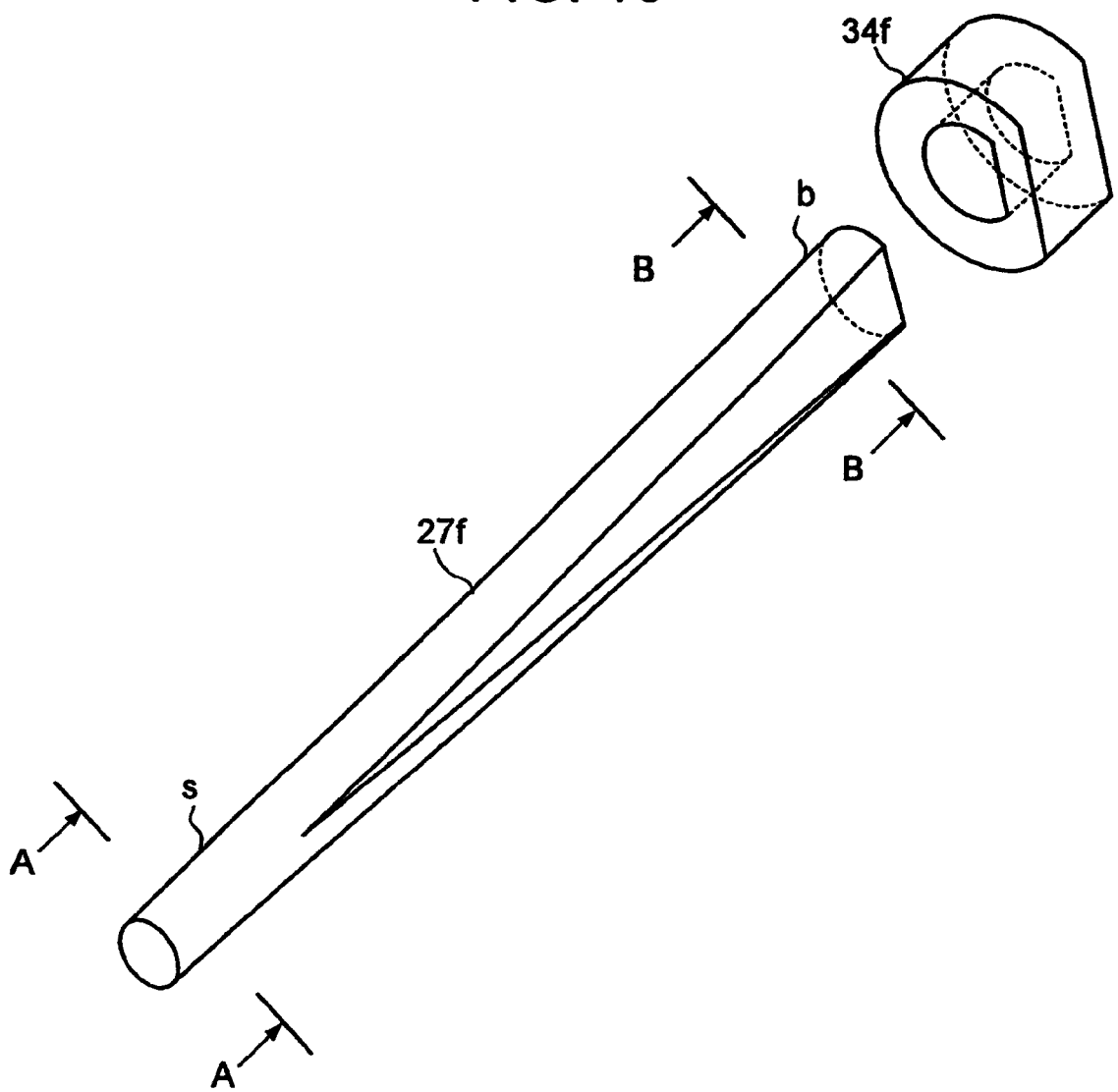
FIG. 16 is a perspective view showing a seventh variant of the display support member and its holding part of the wearable display unit of the first embodiment.

The display support member 27e of the sixth variant has a cross section of a circular shape on the side of its tip portion s as shown in FIG. 15A and a cross section of an elliptical shape on the side of its base portion b as shown in FIG. 15B. Here, FIG. 15A shows the cross sections of the display support member 27e and the slide shoe 34e both taken along the A-A line of FIG. 14. And, FIG. 15B shows the cross sections of the display support member 27e and the slide shoe 34e both taken along the B-B line of FIG. 14.

The shape of the internal surface of the slide shoe 34e through which the display support member 27e is inserted is an elliptical shape of the same shape and size as the shape of the cross section of the display support member 27e on the side of its base portion b. As a result, when the base portion b of the display support member 27e is at the position of the slide shoe 34e, or in other words, when the image display unit is nearly at the projecting position, movement of the display support member 27e in any direction within a plane perpendicular to the longitudinal axis of the display support member 27e and rotation of the display support member 27e in a direction within this plane are restricted and only movement in the longitudinal direction is possible. On the other hand, the cross section of the display support member 27e on the side of its tip portion s has a shape of a circle as described above, and the diameter of the circle is same as the minor axis of the elliptical shape on the side of the base portion b. As a result, when the tip portion s of the display support member 27e is at the position of the slide shoe 34e, or in other words, when the image display unit is nearly at the retracted position, movement of the display support member 27e in any direction within a plane perpendicular to the longitudinal axis of the display support member 27e is restricted while rotation of the display support member 27e in a direction within this plane is not restricted.

Figure 17A:
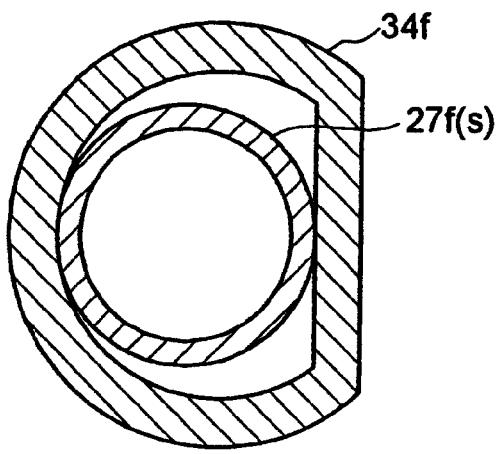
FIG. 17 is a cross section showing the seventh variant of the display support member and its holding part of the wearable display unit of the first embodiment, FIG. 17A being a cross section showing the display support member and a slide shoe seen along the A-A line in FIG. 16 and FIG. 17B a cross section showing the display support member and the slide shoe seen along the B-B line in FIG. 16.
Figure 17B:
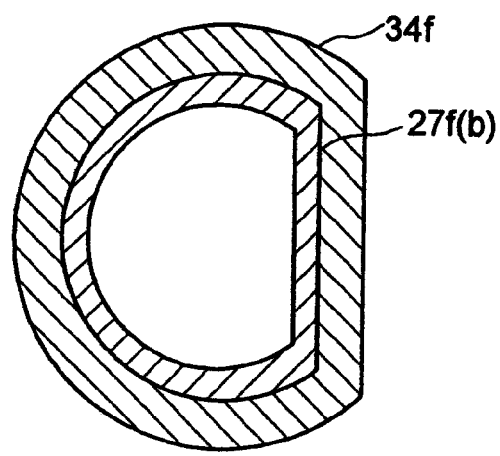

Accordingly, in the case of this variant, when the image display unit is nearly positioned at the projecting position, the display support member 27e can not rotate whether the display support member 27e is moving or not, and thus the image display unit is prevented from inclining. On the other hand, when, in this variant, the image display unit is nearly positioned at the retracted position, it is possible to rotate the display support member 27e such that the image display unit is inclined suitably. In other words, in the present embodiment, even though the display support member 27e is in any posture in the neighborhood of the retracted position, the image display unit assumes the determined posture at the projecting position. Further, at the projecting position, lead wires from the display support member 27e have little play in the display support member housing 31, and there is a possibility that the lead wires may break when the display support member 27e rotates. However, the present embodiment prevents rotation of the display support member 27 when it is nearly at the projecting position, and accordingly the lead wires can be prevented from breaking The display support member 27*f* of the seventh variant has a cross section of a circular shape on the side of its tip portion s as shown in FIG. 17A and a cross section of an arc shape on the side of its base portion b as shown in FIG. 17B. Here, FIG. 17A shows the cross sections of the display support member 27*f* and the slide shoe 34*f* both taken along the A-A line of FIG. 16. And, FIG. 17B shows the cross sections of the display support member 27*f* and the slide shoe 34*f* both taken along the B-B line of FIG. 16.

The shape of the internal surface of the slide shoe 34*f* through which the display support member 27*f* is inserted is an arc shape of the same shape and size as the shape of the cross section of the display support member 27*f* on its side of the base portion b. As a result, when the base portion b of the display support member 27*f* is at the position of the slide shoe 34*f*, or in other words, when the image display unit is nearly at the projecting position, movement of the display support member 27*f* in any direction within a plane perpendicular to the longitudinal axis of the display support member 27*f* and rotation of the display support member 27*f* in a direction within this plane are restricted and only movement in the longitudinal direction is possible. On the other hand, the cross section of the display support member 27*f* on its side of the tip portion s has a shape of a circle as described above, and the diameter of the circle is same as the height of the arc (i.e. the height from the chord as the base) on the side of the base portion. As a result, when the tip portion s of the display support member 27*f* is at the position of the slide shoe 34*f*, or in other words, when the image display unit is nearly at the retracted position, movement of the display support member 27*f* in any direction within a plane perpendicular to the longitudinal axis of the display support member 27*f* is restricted while rotation of the display support member 27*f* in a direction within this plane is not restricted.

Thus, the present variant can obtain the effects similar to the sixth variant.

Figure 18:
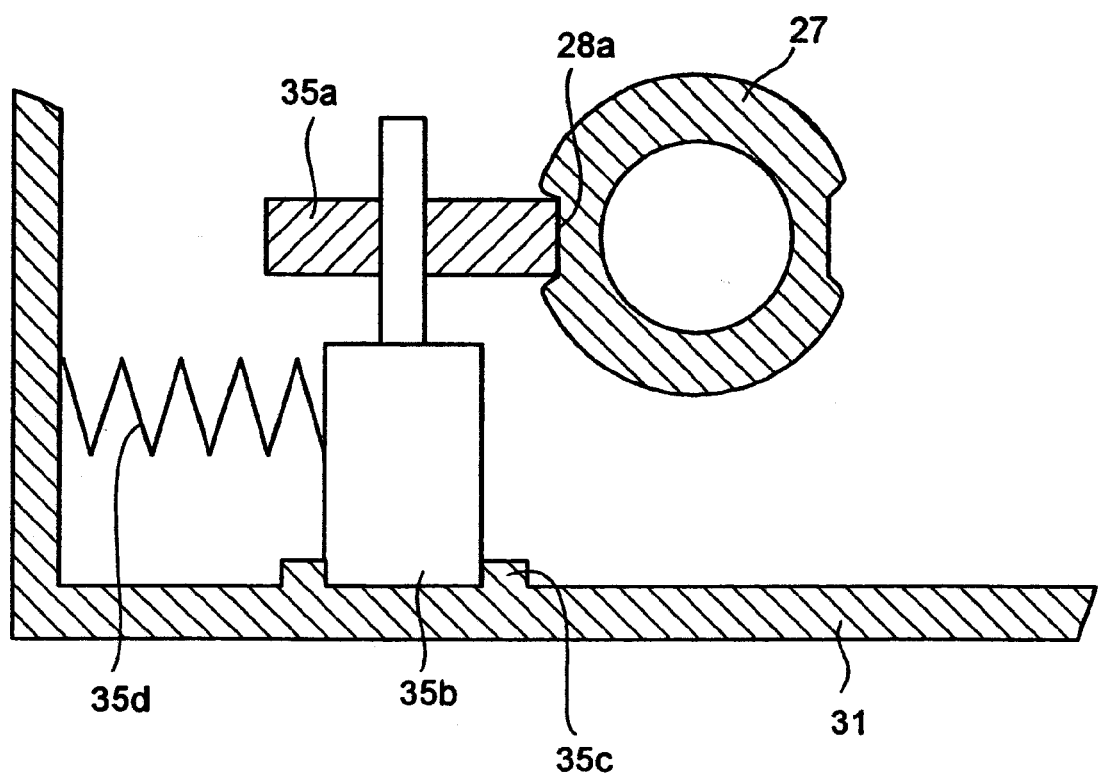
FIG. 18 is a cross section showing a variant of the display support member and its driving part of the wearable display unit of the first embodiment.

Next, referring to FIG. 18, will be described a variant of a mode of fixing the display support member driving motor 35*b* that makes the display support member 27 move.

As shown in FIG. 5, in the above-described embodiment, a motor fixing wall is formed as a high wall adapted for an external shape of the casing of the display support member driving motor 35*b* in order to prevent shift and swing of the display support member driving motor 35*b*. In the present embodiment, the motor fixing wall 35*c* is made lower so that the tip side of the display support member driving motor 35*b* can swing although it can not shift. At the same time, the tip side of the display support member driving motor 35*b* is biased toward the display support member 27 by means of a spring 35*d*.

Generally, in the case where the display support member driving motor 35*b* is fixed firmly as in the above-described embodiment, it is impossible to keep a prescribed contact pressure between the display arm support member 27 and the driving roller 35*a* mounted on the end of the display support member driving motor 35*b* unless the fixing position of the display support member driving motor 35*b* is determined very precisely. Even if the position of the display support member driving motor 35*b* is determined very precisely, the contact pressure changes when the display support member 27 moves and accordingly the relative distance between the driving roller 35*a* and the display support member 27 changes slightly. Thus, in the case where the contact pressure between the display support member 27 and the driving roller 35 can not be controlled to be constant, the driving roller 35*a* may slip on the display support member 27 so that the display support member 27 can not be moved by an intended distance.

In the present embodiment, the contact pressure between the driving roller 35*a* and the display support member 27 is managed to be an intended contact pressure by holding the driving roller 35*a* toward the display support member 27 by means of the spring 35*d* while allowing the tip portion, i.e. the driving roller 35*a* of the display support member driving motor 35*b* to move in the direction of approaching to and leaving from the display support member 27.

Hereinabove, the first embodiment of the wearable display unit has been described. However, the display support member does not need to have a constant curvature as in the above-described embodiment, and for example, may be curved in a shape like a part of the circumference of an ellipse. Further, in this embodiment, the locus of the movement of the image display unit 21 completely coincides with the curved shape of the display support member 27. However, it is sufficient that the locus of the image display unit is curved in a shape nearly similar to the curved shape of the display support member.

Further, the above-described embodiment has been described taking up the rear-arm type headphones 10. However, the present invention is not limited to this and may be applied to a head-arm type that is worn by putting its arm around the top of a head. Further, the above-described embodiment is directed to headphones provided with speakers. However, the present invention can be applied to a head-mounted device as long as the device has an arm to be mounted on a head to hold the head from its left and right sides, even if the device is not provided with speakers.

[Second Embodiment]

Figure 19:
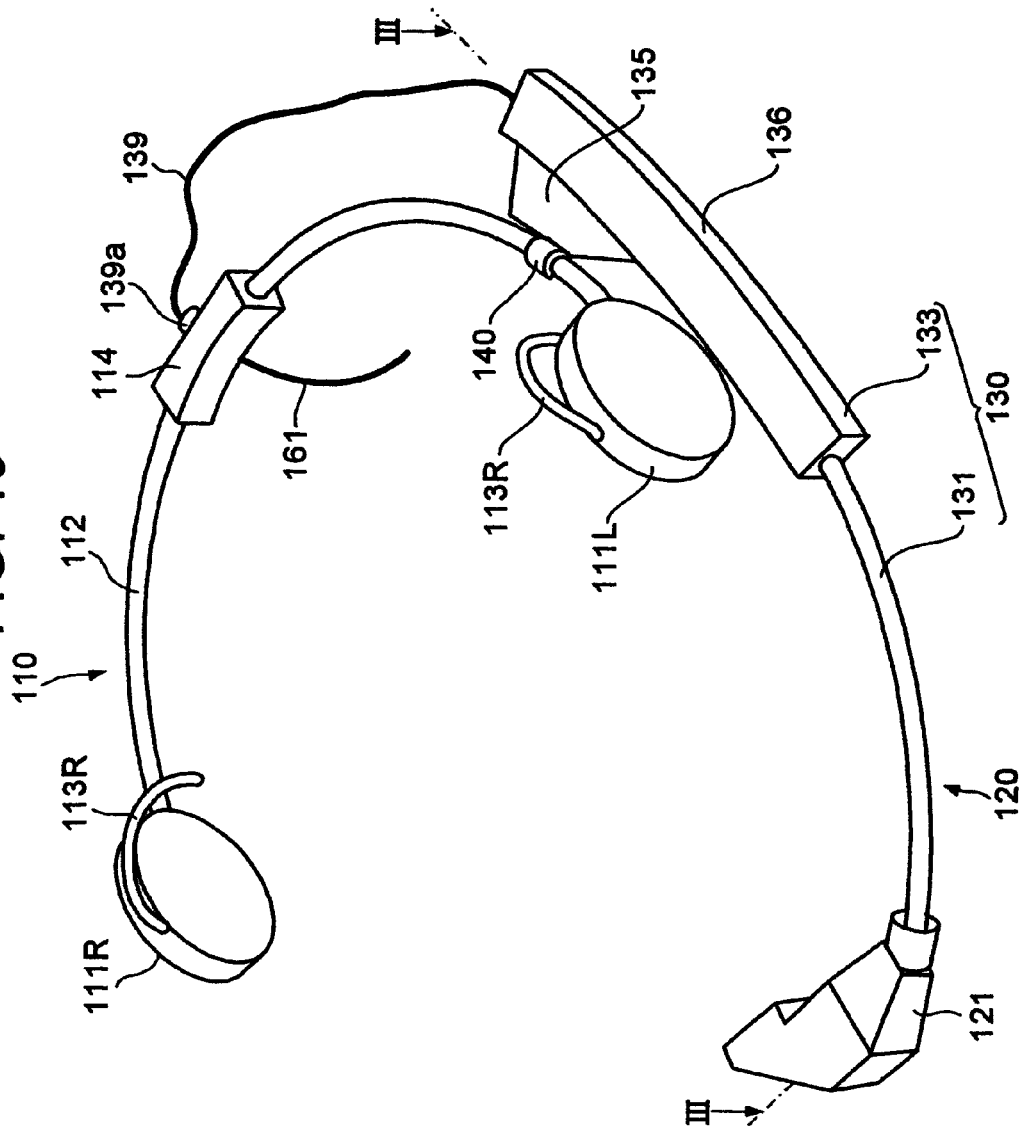
FIG. 19 is a perspective view showing a wearable display system having a image display unit (in a coupled state) of a second embodiment, the image display unit of which can be arranged near a user's eye.
Figure 20:
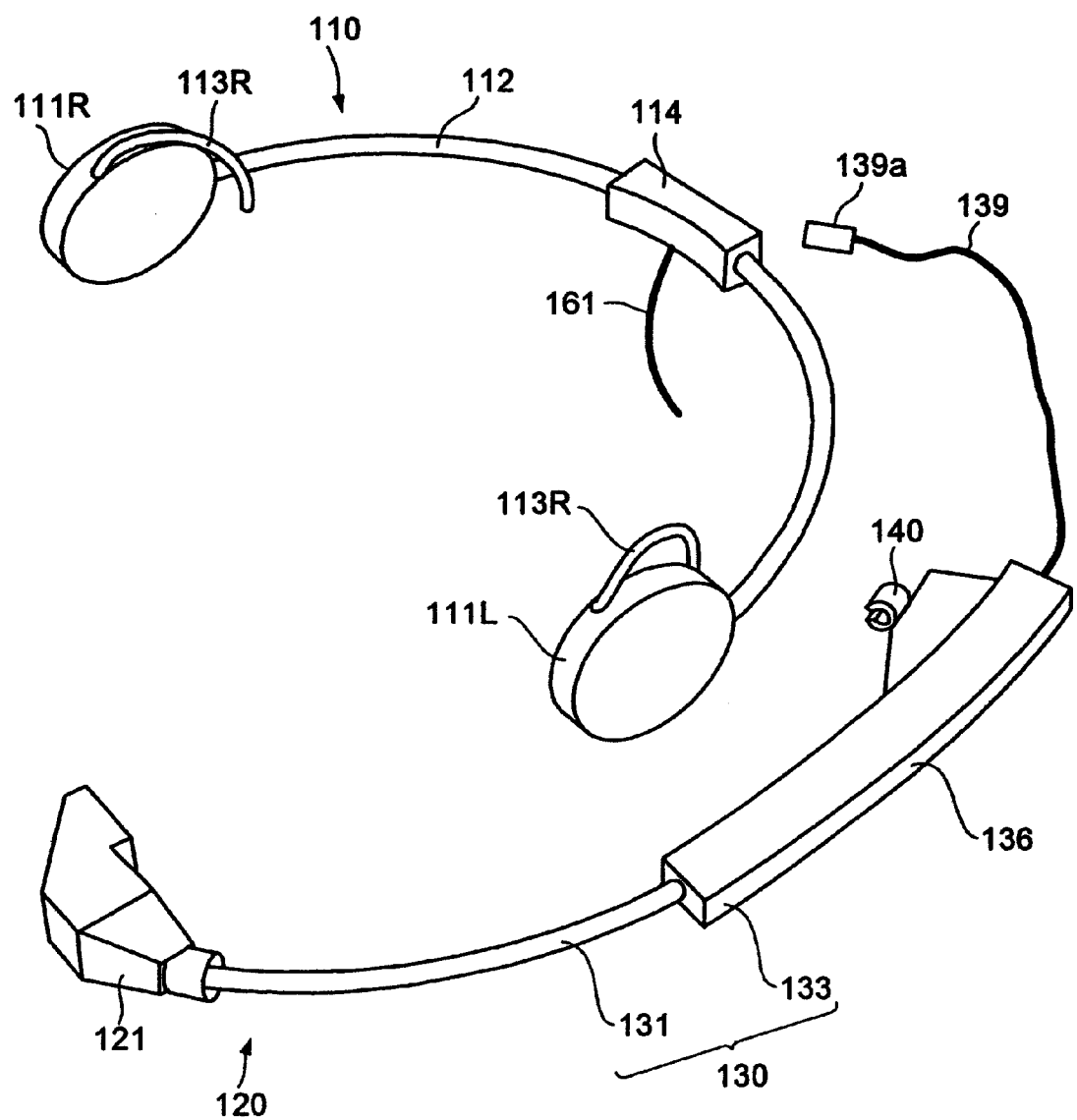
FIG. 20 is a perspective view showing the wearable display system (in a non-coupled state) of the second embodiment.
Figure 21:
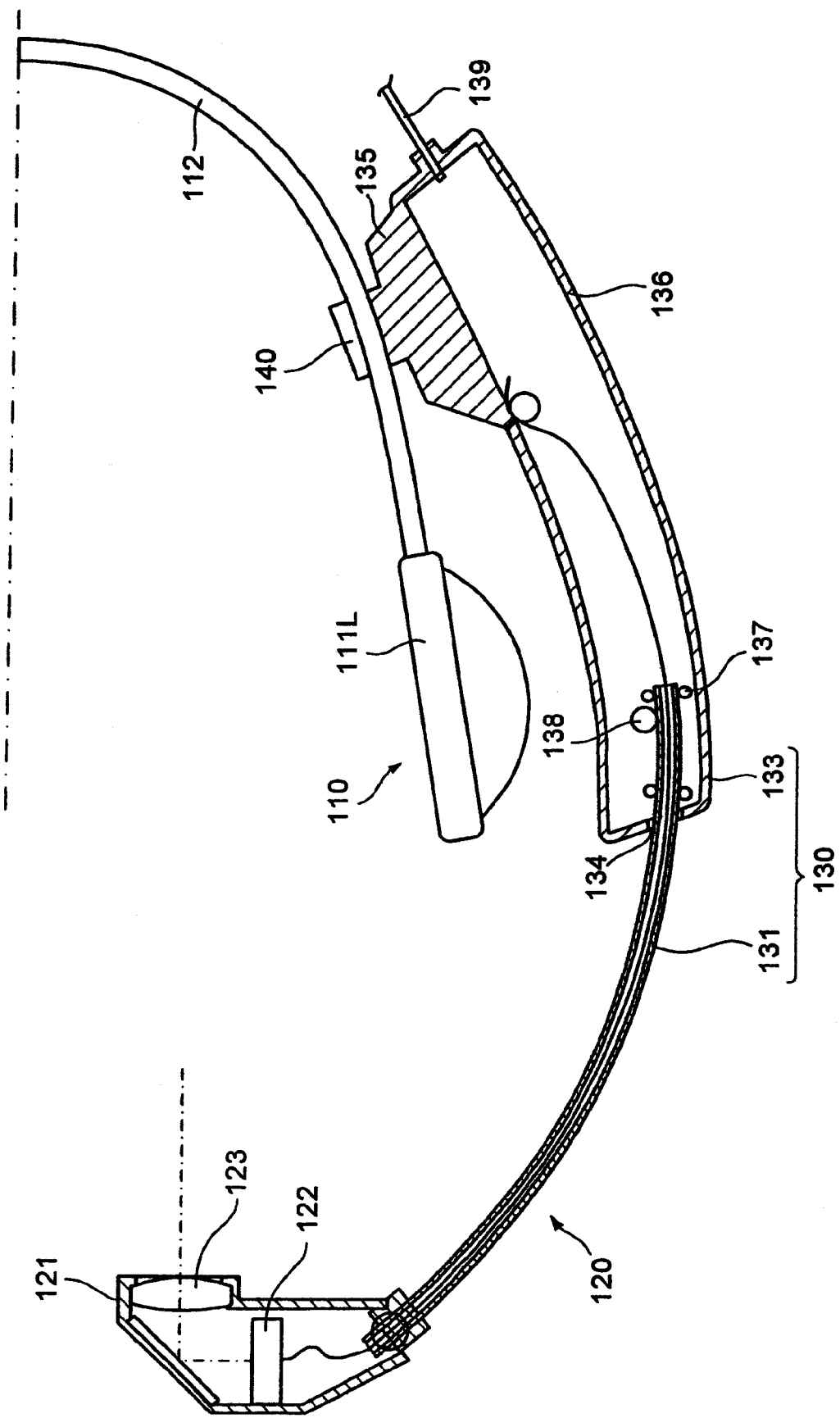
FIG. 21 is a cross section taken along the line in FIG. 19.
Figure 22:
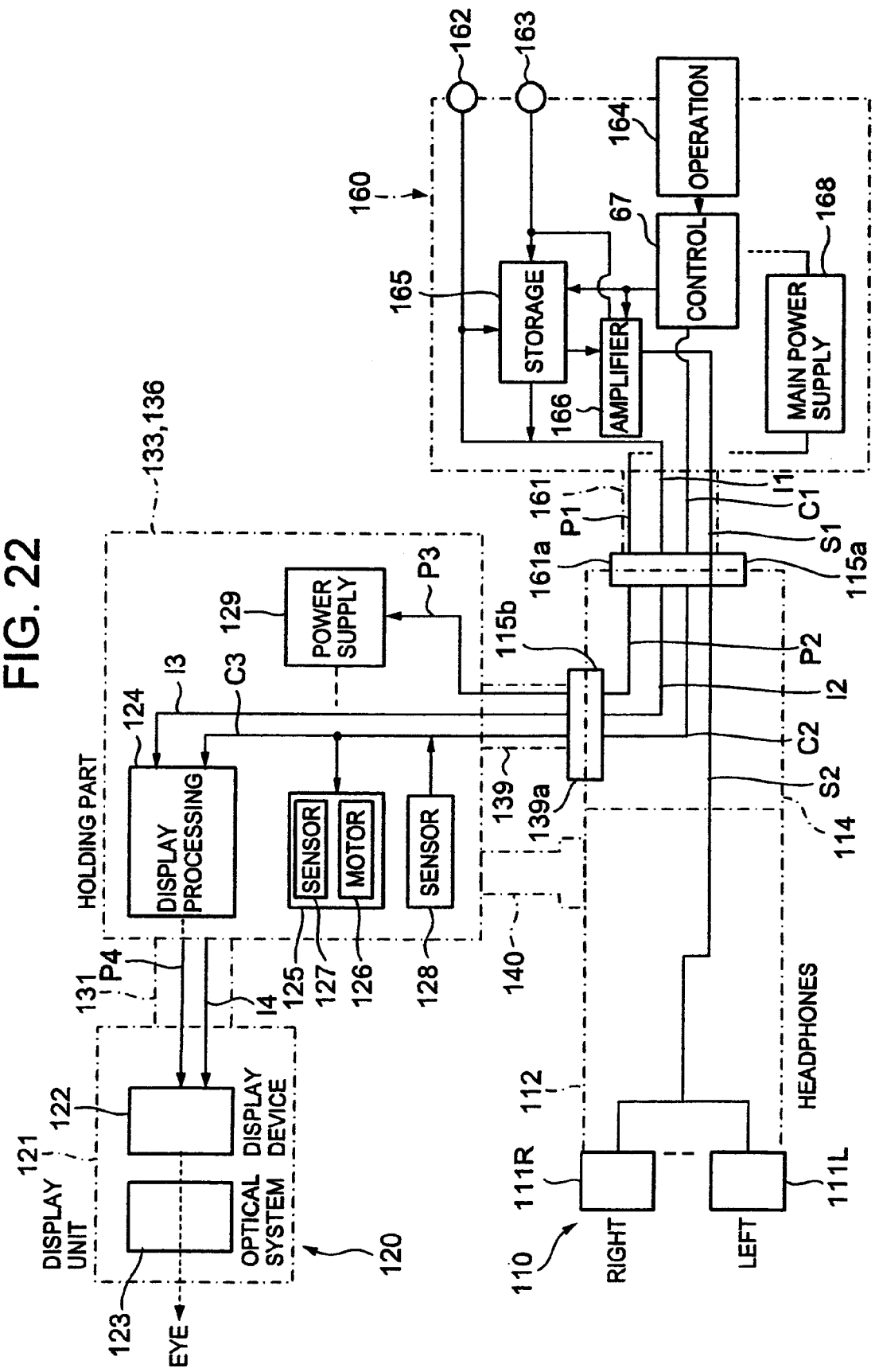
FIG. 22 is a circuit block diagram of the wearable display system of the second embodiment.

A second embodiment of the wearable display system of which the image display unit can be arranged near a user's eye will be described referring to FIGS. 19-22. In each of the below-described embodiments also, a mechanism for preventing rotation of a display support member is provided similarly to the first embodiment and its variants. FIG. 19 is a perspective view showing a wearable display system having an image display unit (in a coupled state) of the present embodiment, the image display unit of which can be arranged near a user's eye; FIG. 20 is a perspective view showing the wearable display system (in a non-coupled state); FIG. 21 is a cross section taken along the III-III line in FIG. 19; and FIG. 22 is a circuit block diagram of the wearable display system.

As shown in FIGS. 19 and 20, the wearable display system of the present embodiment comprises headphones 110 and a wearable display unit 120 that can be mounted on the headphones 110 and the image display unit of which can be arranged near a user's eye.

The headphones 110 comprises: left and right speakers 111L and 111R; a headphone arm 112 that connects the left and right speakers 111L and 111R with each other; earpieces 113L and 113R provided in the left and right speakers 111L and 111R respectively; and a cable connection part (an external connection part) 114. The headphones 110 are rear-arm type headphones whose headphone arm 112 is positioned around the back of the head of a user.

The wearable display unit 120 comprises: an image display unit 121 that displays an image in front of a user's eye; an attachment 140 that is fixed to the headphone arm 112; a holding part 130 that couples an image display unit 121 to the attachment 140; and a cable 139 as a display-side electric connection part for electric connection with the headphones 110. The holding part 130 comprises: a bar-shaped display support member 131 whose cross section has an elliptic shape; and a display support member housing part 133 for housing the display support member 131. The longitudinal shape of the display support member 131 is curved correspondingly to a shape of a head of a user. The display support member housing part 133 has an internal space that can house most of the display support member 131. The external shape of this wearable display unit 120 including a display screen of the image display unit 121 is symmetrical about a horizontal plane in a state that the wearable display unit 120 is mounted horizontally on the head of a user.

As shown in FIG. 21, the display support member housing part 133 comprises: a display support member housing 136 for housing the display support member 131; a plurality of bearings 137 that slidably support the display support member 131; and a driving roller 138 for moving the display support member 131. In one end of the display support member housing 136, there is formed a display support member insertion hole 134 for insertion of the display support member 131. And, in the other end of the display support member housing 136, there is provided the display cable (the display-side electric connection part) 139 for electric connection with the headphones 110. And further, at a part connecting to the attachment 140, there is formed a clearance part 135. This clearance part 135 serves to avoid interference between the speaker 111L or 111R of the headphones 110 and the display support member housing 136. The driving roller 138 is connected to the below-mentioned display support member driving motor (shown in FIG. 22). The image display unit 121 comprises a display device 122 and an optical system 123 for the display device 122.

The attachment 140 is made of an elastic material such as resin and is formed to have a C-shaped cross section similarly to the first embodiment. Thus, also in the present embodiment as well as the first embodiment, the wearable display unit 120 can be mechanically mounted to the headphone arm 112 by simply grasping the headphone arm 112. Thus, it is not necessary to prepare a dedicated attachment on the side of the headphones. In other words, the present embodiment does not need dedicated headphones.

The cable connection part (the external connection part) 114 of the headphones 110 is connected with a controller 160 that controls the headphones 110 and the wearable display unit 120. This controller 160 comprises: a controller cable 161 connected with the cable connection part 114 of the headphones 110; an image signal receiving terminal 162 for receiving an image signal from the outside; an audio signal receiving terminal 163 for receiving an audio signal from the outside; an operation part 164 for user's operation; a signal storage part 165 for storing the image signal and the audio signal; an amplifier 166 that amplifies the audio signal; a control part 167 that sends a control signal to various parts according to instructions from the operation part 164; and a main power supply circuit 168. The controller cable 161 has a connector 161a provided with electric contacts. The connector 161a is provided with: an audio signal line S1 for sending the audio signal from the amplifier 166 to the cable connection part 114 of the headphones 110; an image signal line I1 for sending the image signal from the signal storage part 165 and the image signal receiving terminal 162 to the cable connection part 114 of the headphones 110; a control signal line C1 for sending the control signal from the control part 167 to the cable connection part 114 of the headphones 110; and a power line P1 for sending power from the main power supply circuit 168 to the cable connection part 114 of the headphones 110.

The cable connection part 114 of the headphones 110 is provided with a controller-side connector 115a connected to the connector 161a of the controller cable 161 and a display-side connector (a headphone-side electric connection part) 115b connected to a connector 139a of the display cable 139.

The controller-side connector 115a and the display-side connector 115b are connected with each other through an image signal line I2, a control signal line C2, a power line P2 and a ground line (not shown). Through the connectors 161a and 115a, the image signal line I1, the control signal line C1, the power line P1 and a ground line provided in the controller cable 161 are connected respectively to the image signal line I2, the control signal line C2, the power line P2 and the ground line that are connected to the controller-side connector 115a. Further, the audio signal line S1 provided in the controller cable 161 is connected to the speakers 111R and 111L through the connectors 161a and 115a and the audio signal line S2.

Within the display support member housing 136 of the wearable display unit 120, there are provided: a display processing part 124 for sending the image signal to the display device 122; a display support member drive control part 125 for moving the display support member 131; a gravity sensor 128 for detecting the up-and-down direction and for informing the display processing part 124 of a detection result; and a power supply circuit 129 for supplying electric power to these parts 124, 125 and 128 and to the display device 122. The display support member drive control part 125 comprises: a display support member driving motor 126 as a driving source for moving the display support member 131; a group of sensors 127 for detecting a forward movement critical position and a backward movement critical position of the display support member 131. The display cable 139 comprises: an image signal line I3 connected to the image signal line I2 of the display-side connector 115b of the headphones 110 through the connector 139a; a control signal line C3 connected to the control signal line C2 of the display-side connector 115b through the connector 139a; a power line P3 connected to the power line P2 of the display-side connector 115b through the connector 139a; and a ground line not shown. The image signal line I3 of the display cable 139 is connected to the display processing part 124 in the display support member housing 136; the control signal line C3 of the display cable 139 is connected to the display processing part 124 and the display support member drive control part 125 in the display support member housing 136; and the power line P3 of the display cable 139 is connected to the power supply circuit 129 in the display support member housing 136. Further, the display support member 131 is provided with: an image signal line I4 for sending the image signal from the display processing part 124 in the display support member housing 136 to the display device 122; a power line P4 for supplying electric power from the power supply circuit 129 in the display support member housing to the display device 122; and a ground line not shown.

Thus, in the present embodiment, not only the audio signal from the controller 160 but also the image signal, the control signal and the electric power are sent to the cable connection part 114 of the headphones 110. Among these, the audio signal is sent to each speaker 111R, 111L of the headphones 110, and the image signal, the control signal and the electric power are sent to the display support member housing part 133 of the wearable display unit 120 through the cable connection part 114 of the headphones 110. Namely, in the present embodiment, all the signals and the like sent from the controller 160 to the wearable display unit 120 and the headphones 110 are once sent to the headphones 110 so that the number of cables extending from the controller 160 becomes smaller.

In using the wearable display unit 120 together with the headphones 110, the attachment 140 of the wearable display unit 120 is mechanically coupled to the headphone arm 112 as described above. At that time, the attachment 140 of the wearable display unit 120 may be fixed either to the neighborhood of the right speaker 111R or to the neighborhood of the left speaker 111L of the headphone arm 112. Next, the display cable 139 is connected to the display-side connector 115b of the headphones 110, to connect the headphones 110 and the wearable display unit 120 electrically. Further, the controller cable 161 is connected to the controller-side connector 115a of the headphones 110, to connect the controller 160 and the headphones 110 electrically. Here, the mechanical coupling and the electric connection of the wearable display unit 120 with the headphones 110 and the electric connection of the controller 160 with the headphones 110 can be carried out in any order.

Then, the headphones 110 with which the wearable display unit 120 is connected mechanically and electrically is mounted on the head.

When a user wants to output sound together with a picture, the user operates the play button and the like of the operation part 164 of the controller 160. When the play button is pushed, the main power supply circuit 168 outputs electric power and the control part 167 outputs the display support member drive control signal. Then, the electric power and the display support member drive signal are sent to the wearable display unit 120 through the cable connection part 114 of the headphones 110. The electric power is sent to the power supply circuit 129 of the wearable display unit 120, and then supplied various parts in the wearable display unit 120. On the other hand, the display support member drive signal is sent to the display support member drive control part 125 of the wearable display unit 120. As a result, the display support member driving motor 126 of the display support member drive control part 125 operates, and makes the display support member 131 project from the retracted position to the displayable position. When a group of sensors 127 of the display support member drive control part 125 detects the forward movement critical position (i.e. the displayable position), the control part 167 of the controller 160 is notified of this fact. Then, according to an instruction from the control part 167, the image signal and the audio signal stored in the signal storage part or the image signal received through the image signal receiving terminal 162 and the audio signal received through the audio signal receiving terminal 163 are outputted to the cable connection part 114 of the headphones 110.

The controller 160 sends the audio signal to each speaker 111R, 111L of the headphones to reproduce the sound corresponding to the audio signal. Further, the controller 160 sends the image signal to the display device 122 through the cable connection part 114 of the headphones 110 and the display processing part 124 of the wearable display unit 120, to reproduce the image corresponding to the image signal.

In the case where the attachment 140 of the wearable display unit 120 is removed from the position in the neighborhood of the left speaker 111L of the headphone arm 112 and mechanically coupled to a position in the neighborhood of the right speaker 11R, the wearable display unit 120 is turned upside down. However, the external shape of the wearable display unit 120 (including the display screen of the image display unit 122) of the present embodiment is symmetrical in the vertical direction in a state that the wearable display unit 120 is mounted horizontally on the user's head. Thus, even if the wearable display unit 120 is turned upside down as a result of changing its fixing position from the left to the right, the user can use the wearable display unit 120 without feeling uncomfortable. Further, even if the wearable display unit 120 is turned upside down as a result of changing its fixing position from the left to the right, the gravity sensor 128 can detect the state, and the display processing part 124 automatically reverses the top and the bottom of a displayed image. Thus, the top of the displayed image is displayed correctly on the upper side. Thus, it is possible to solve inversion of the image owing to change of the left and right fixing positions of the wearable display unit 120.

When the headphones 110 are used by themselves, the display cable 139 of the wearable display unit 120 is removed from the cable connection part 114 of the headphones 110 and the attachment 140 of the wearable display unit 120 is removed from the headphone arm 112. In other words, the mechanical and electric connections between the headphones 110 and the wearable display unit 120 are released. Then, when the controller 160 sends the audio signal to the headphones 110, the sound corresponding to the audio signal is reproduced through the speakers 111R and 111L of the headphones.

As described above, in the present embodiment, the mechanical and electric connections between the headphones 110 and the wearable display unit 120 can be released, and thus the headphones 110 can be used by themselves. In addition, the headphone arm 112 can be coupled mechanically to the wearable display unit 120 without providing a special fixing mechanism to the headphone arm 112 as a head mounting belt. As a result, the beauty of the headphones 110 is improved even at the time of using by themselves.

Although, in the present embodiment, the amplifier 166 is provided in the controller 160, the amplifier 166 may be provided in the headphones 110. In that case, wires may be provided for supplying electric power from the controller 160 to the amplifier in the headphones 110. Further, in the present embodiment, the display processing part 124 is provided in the display support member housing part 133 of the wearable display unit 120. However, a part of the functions of the display processing part 124, for example a function of driving the display device 122 may be provided in the image display unit 121. Or, all the functions of the display processing part 124 may be provided in the image display unit 121. Or, a part of various functional parts of the wearable display unit 120 and a part of various functional parts of the controller 160 may be suitably provided in other parts.

Figure 23:
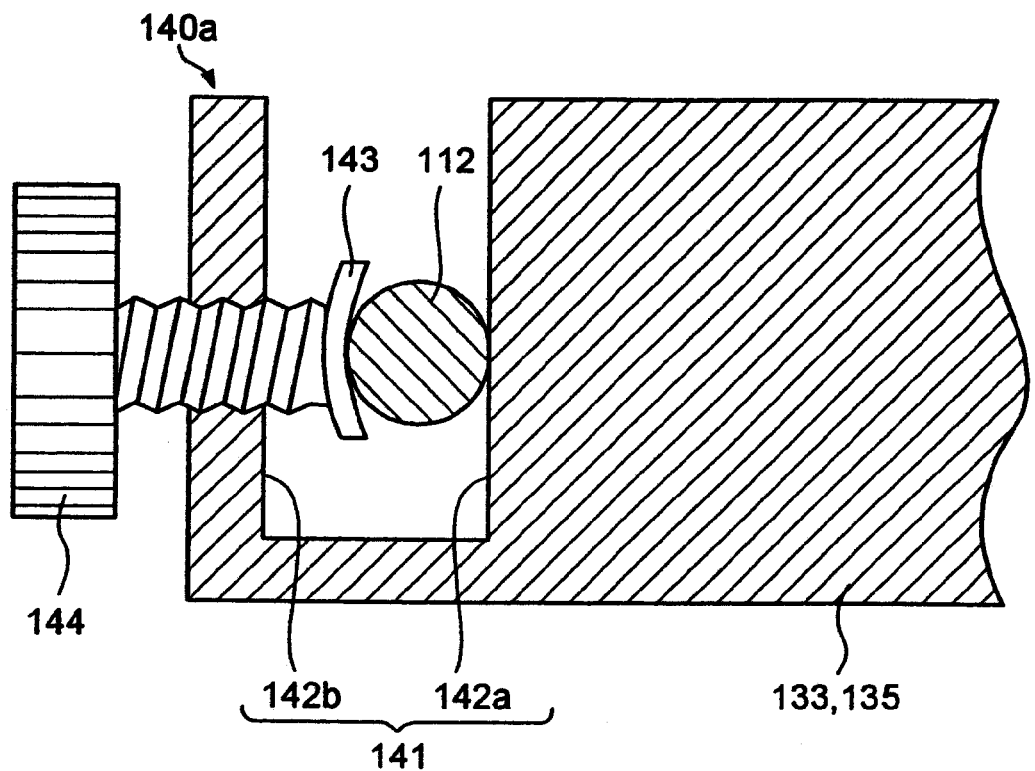
FIG. 23 is a cross section showing a first variant of an attachment of the wearable display system of the second embodiment.
Figure 24:
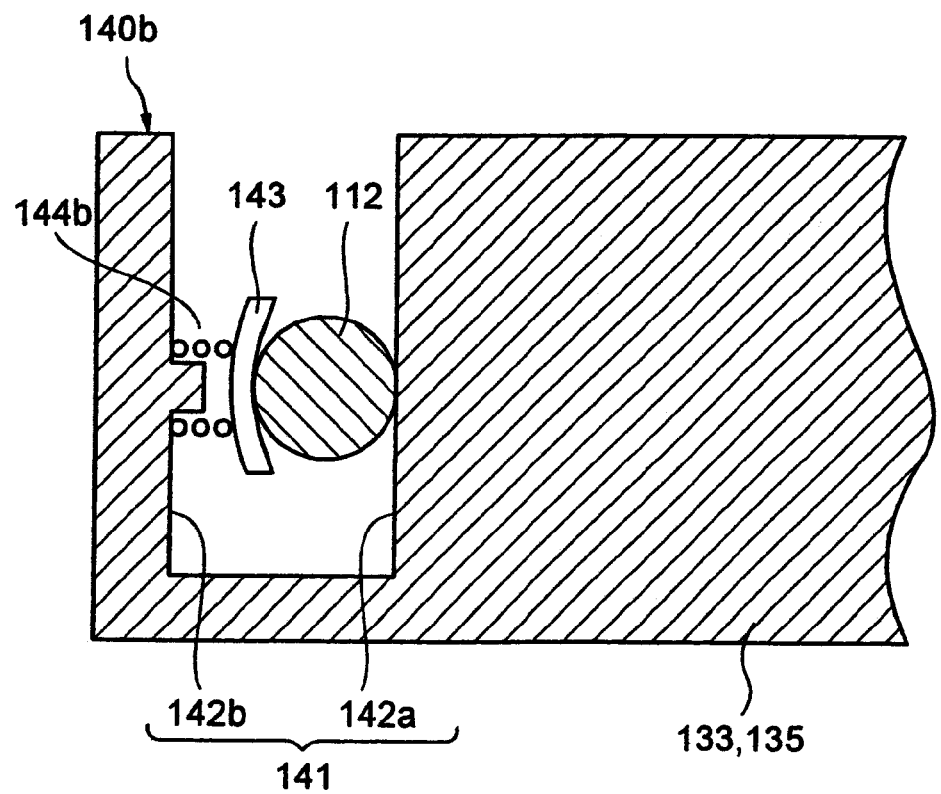
FIG. 24 is a cross section showing a second variant of the attachment of the wearable display system of the second embodiment.

Next, will be described first and second variants of the attachment in the first and second embodiments, referring to FIGS. 23 and 24 respectively. FIG. 23 is a cross section showing the first variant of the attachment of the wearable display system of the second embodiment, and FIG. 24 is a cross section showing the second variant of the attachment of the wearable display system.

As shown in FIG. 23, the attachment 140a as the first variant comprises: a groove member 141 having a pair of side walls 142a and 142b opposed to each other; a second grasping member 143 that grasps the headphone arm 112 between it and one side wall (hereinafter, referred to as a first grasping member) 142a; and a screw member 144 as a pressing member that presses the second grasping member 143 toward the first grasping member 142a.

The groove member 141 is formed integrally with the clearance part 135 of the display support member housing part 133. The side wall 142a of the groove member 141 on the side of the clearance part 135 becomes the first grasping member. The other side wall 142b of the groove member 141 is formed with a threaded hole into which the screw member 144 as the pressing member is screwed. The second grasping member 143 is fixed to the tip of the screw member 144.

To couple the attachment 140a to the headphone arm 112, a part of the headphone arm 112 is positioned between the first and second grasping members 142a and 143. Then, the screw member 144 is screwed to narrow the distance between the first grasping member 142a and the second grasping member 143 so that both grasping members 142a and 143 grasp the headphone arm 112 between them.

The attachment 140b as the second variant is shown in FIG. 24, and different from the first variant in that the screw member 144 as the pressing member is replaced by a spring coil 144b as an elastic member.

To couple this attachment 140b to the headphone arm 112, a space between the first grasping member 142a and the second grasping member 143 is widened to shrink the spring coil 144b. Then, a part of the headphone arm 112 is placed between the first and second grasping members 142a and 143 so that the elastic force of the spring coil 144b pushes the second grasping member 143 toward the first grasping member 142b to grasp the headphone arm 112 between the grasping members 142b and 143.

Thus, in both the first and second variants, the wearable display unit can be coupled to the headphone arm 112 simply by grasping the headphone arm 112. Further, in these variants, the headphone arm 112 is grasped when the attachment 140a, 140b changes its form as a result of movement of the second grasping member 143. Accordingly, these variants can be adapted for a headphone arm 112 that has a slightly different cross section.

Figure 25:
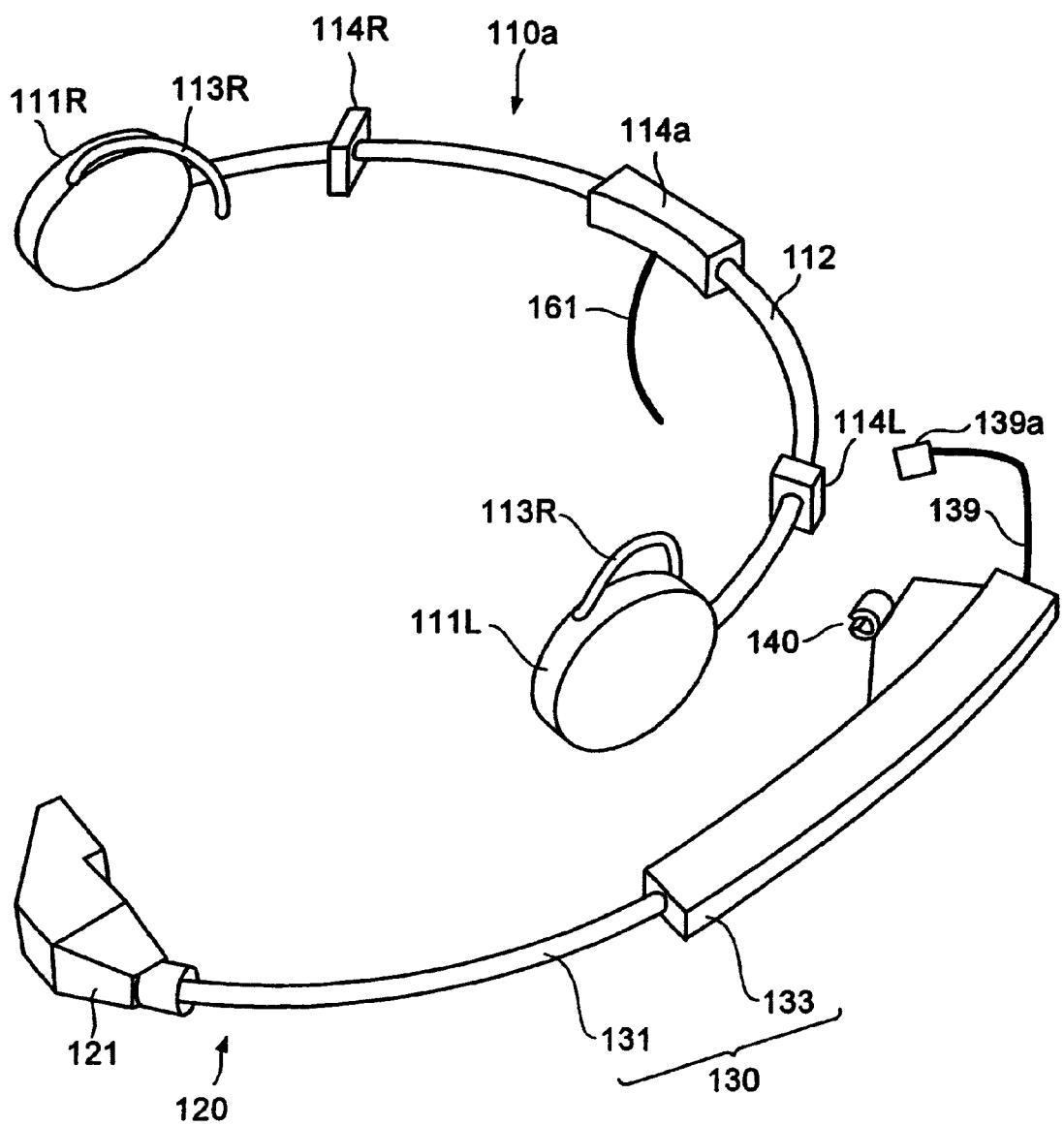
FIG. 25 is a perspective view showing a variant of headphones of the wearable display system of the second embodiment.

Next, will be described a variant of the headphones 110 in the second embodiment, referring to FIG. 25.

In headphones 110a of the present variant, the cable connection part 114 in the second embodiment is divided into three parts. In detail, cable connection parts 114a, 114R and 114L in the present variant are a controller cable connection part 114a to which the controller cable 161 from the controller 160 is connected, and two display cable connection parts 114R and 114L to which the display cable 139 from the wearable display unit 120 is connected.

The controller cable connection part 114a is provided at the same position as the cable connection part 114 in the second embodiment, namely at the center of the headphone arm 112. And, two display cable connection parts 114R and 114L are each provided between the left or right speaker 111R or 111L and the controller cable connection part 114a. Each display cable connection part 114R, 114L has a connector to which the connector 139a of the display cable 139 can be connected. Similarly to the second embodiment described referring to FIG. 22, each connector of the display cable connection parts 114R and 114L is connected with the power line P2, the image signal line I2, the control signal line C2 and the ground line from the connector of the controller cable connection part 114a.

By placing the two display cable connection parts 114R and 114L in the neighborhoods of the left and right speakers 111R and 111L respectively, it is possible to shorten the length of the display cable 139 to be connected to these display cable connection parts 114R and 114L.

[Third Embodiment]

Figure 26:
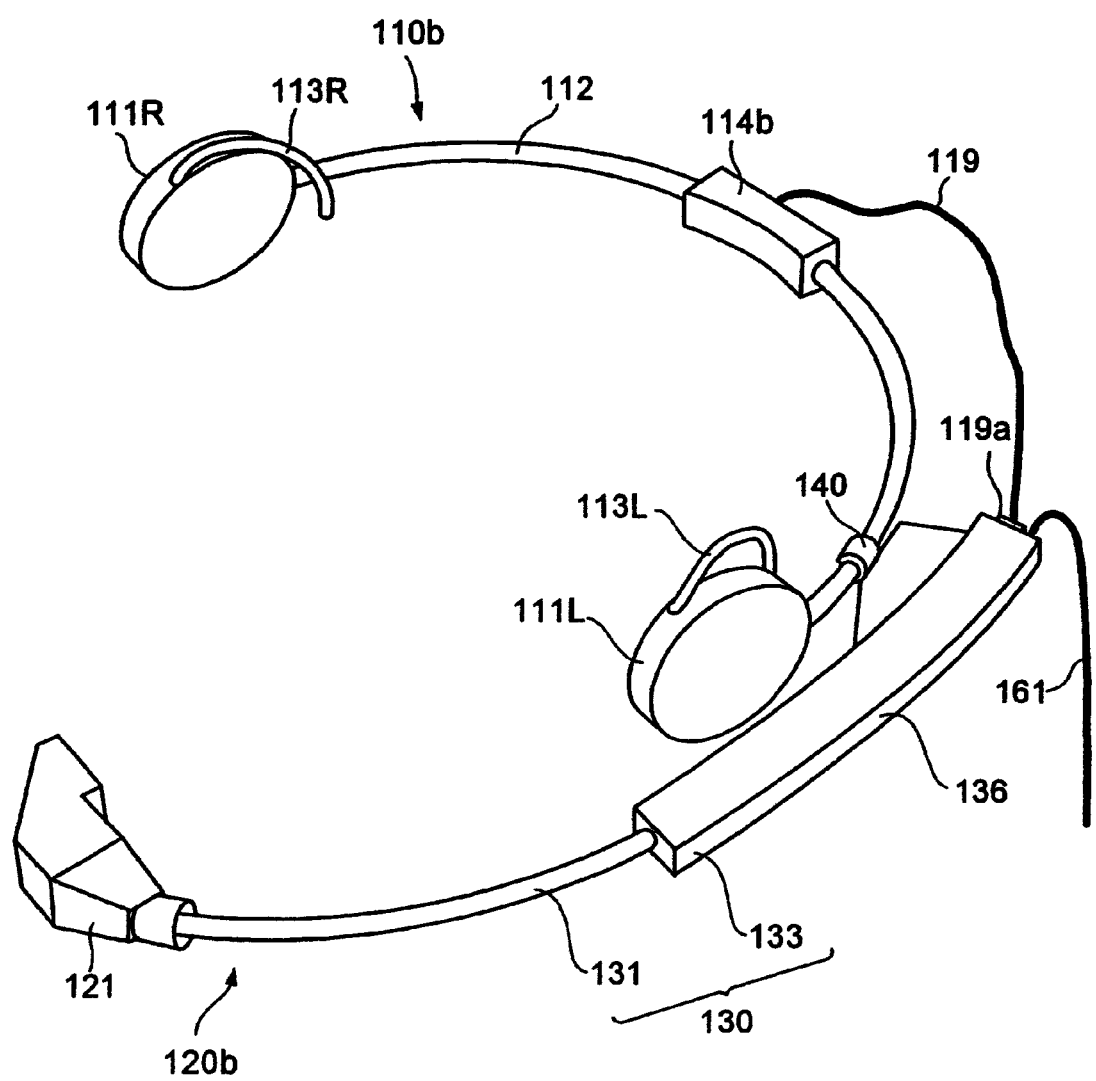
FIG. 26 is a perspective view showing a wearable display system having an image display unit (in a coupled state) of a third embodiment, the image display unit of which can be arranged near a user's eye.
Figure 27:
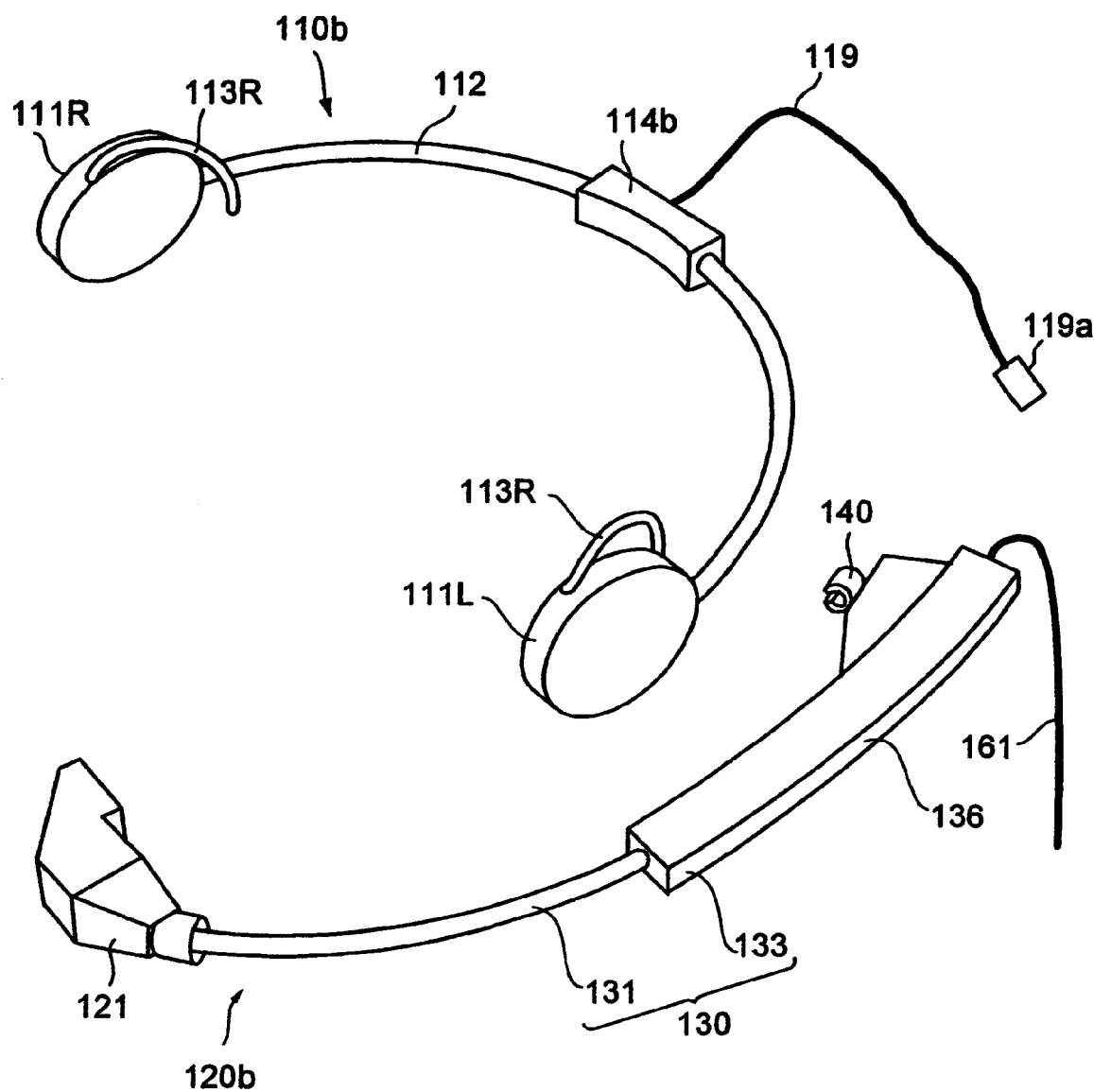
FIG. 27 is a perspective view showing the wearable display system (in a non-coupled state) of the third embodiment.
Figure 28:
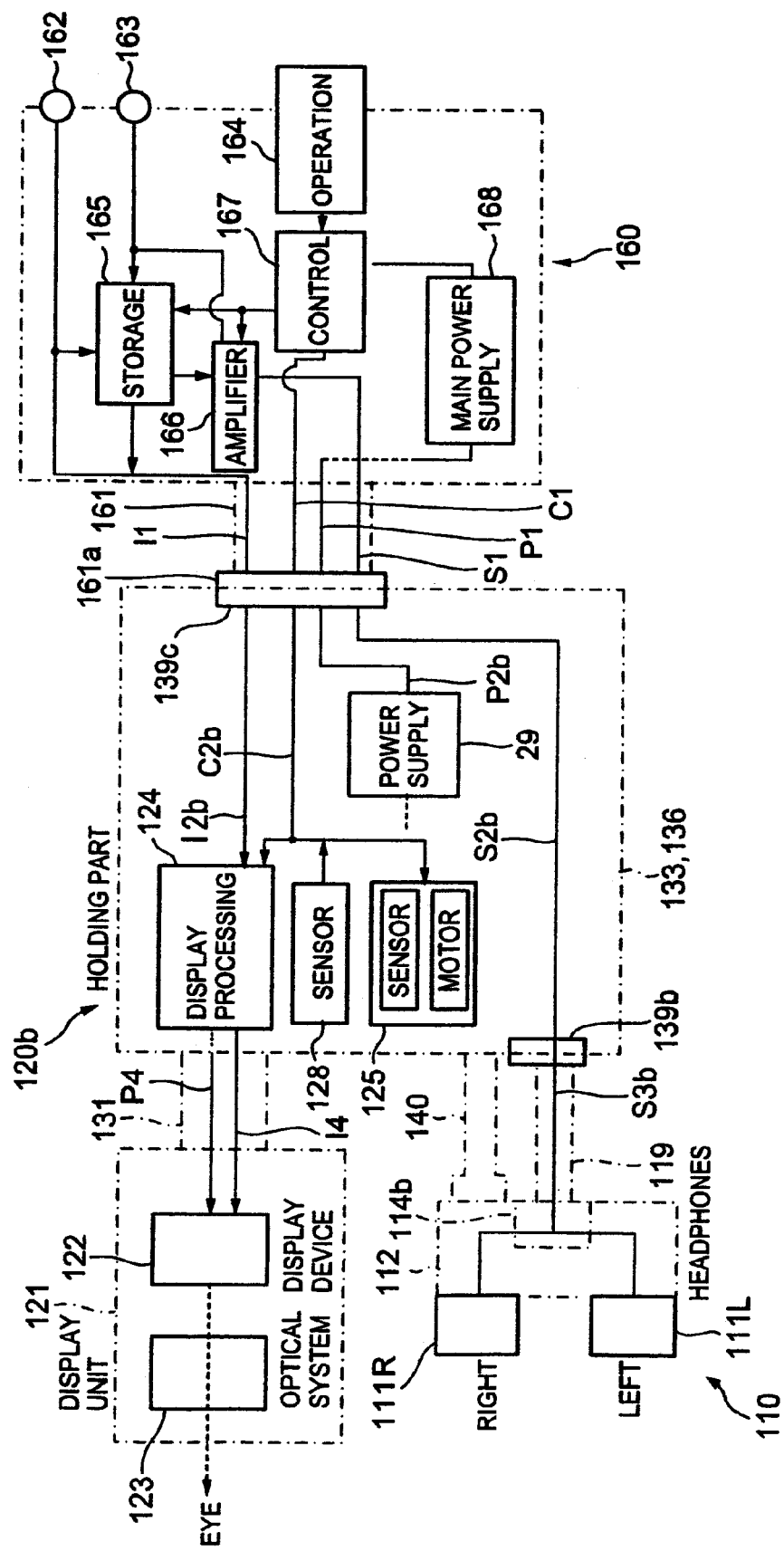
FIG. 28 is a circuit block diagram of the wearable display system of the third embodiment.

Next, referring to FIGS. 26-28, will be described a third embodiment of the wearable display system which can be arranged near a user's eye. FIG. 26 is a perspective view showing the wearable display system (in a coupled state) of the third embodiment; FIG. 27 is a perspective view showing the wearable display system (in a non-coupled state); and FIG. 28 is a circuit block diagram of the wearable display system.

As shown in FIGS. 26 and 27, the wearable display system of the present embodiment has the basically same mechanical configuration as the configuration of the second embodiment except that arrangement of the power line, the signal line and the like is different.

The display support member housing 136 of the wearable display unit 120b is provided with connection parts at the end portion on the opposite side to the insertion hole for the headphone support member 131. These connection parts are connected with a headphone cable 119 extending from the headphones 110b and the controller cable 161 extending from the controller. As shown in FIG. 28, within the display support member housing 136, are provided the display processing part 124, the display support member drive control part 125, the gravity sensor 128 and the power supply circuit 129 similarly to the second embodiment. The connection part to which the controller cable 161 is connected has a controller-side connector (an external connection part) 139c and the connection part to which the headphone cable 119 is connected has a headphone-side connector 139b. The controller-side connector 139c is connected with: an image signal line I2b connected to the image signal line I1 of the controller cable 161 through the connector 161a; a control signal line C2b connected to the control signal line C1 of the controller cable 161 through the connector 161a; a power line P2b connected to the power line P1 of the controller cable 161 through the connector 161a; and an audio signal line S2b connected to the audio signal line S1 of the controller cable 161 through the connector 161a. Further, ground lines not shown in the figure are connected to each other. The image signal line I2b extending from the controller-side connector 139c is connected with the display processing part 124. The control signal line C2b is connected with the display processing part 124, the display support member drive control part 125 and the gravity sensor 128. And, the power line P2b is connected with the power supply circuit 129. Further, the audio signal line S2b and the ground line are connected to the headphone-side connector 139b.

The cable connection part 114b of the headphones 110b is provided with the headphone cable 119, and a connector (a headphone-side electric connection part) 119b of the headphone cable 119 is connected to the headphone-side connector (a display-side electric connection part) 139b of the wearable display unit 120b.

Namely, in the present embodiment, the image signal, the audio signal and the electric power from the controller 160 are sent to the wearable display unit 120b. Among these, only the audio signal is sent to the headphones 110b through the wearable display unit 120b. The other signal and the like are processed in the wearable display unit 120b.

As described above, in the present embodiment, all the signals and the like sent from the controller 160 to the wearable display unit 120b and the headphones 110b are once sent to the wearable display unit 120b. As a result, the number of cables extending from the controller 160 is reduced. Further, the headphones 110b of the present embodiment receives only the audio signal from the wearable display unit 120b and uses the headphone cable 119 for receiving the audio signal. In addition, the headphones 110b do not need a special fixing structure for mechanical coupling to the wearable display unit 120b. As a result, ordinary headphones sold on the market can be used as the headphones 110b. Further, lead wires provided in the headphone cable 119 and the headphone arm 112 are only a right signal line, a left signal line and a ground line. Thus, thin wires can be used as the lead wires in the headphone cable 119 and the headphone arm 112. As a result, the headphones 110b itself can be made smaller and lighter and uncomfortable feeling at the time of mounting on the user's head can be reduced.

[Fourth Embodiment]

Figure 29:
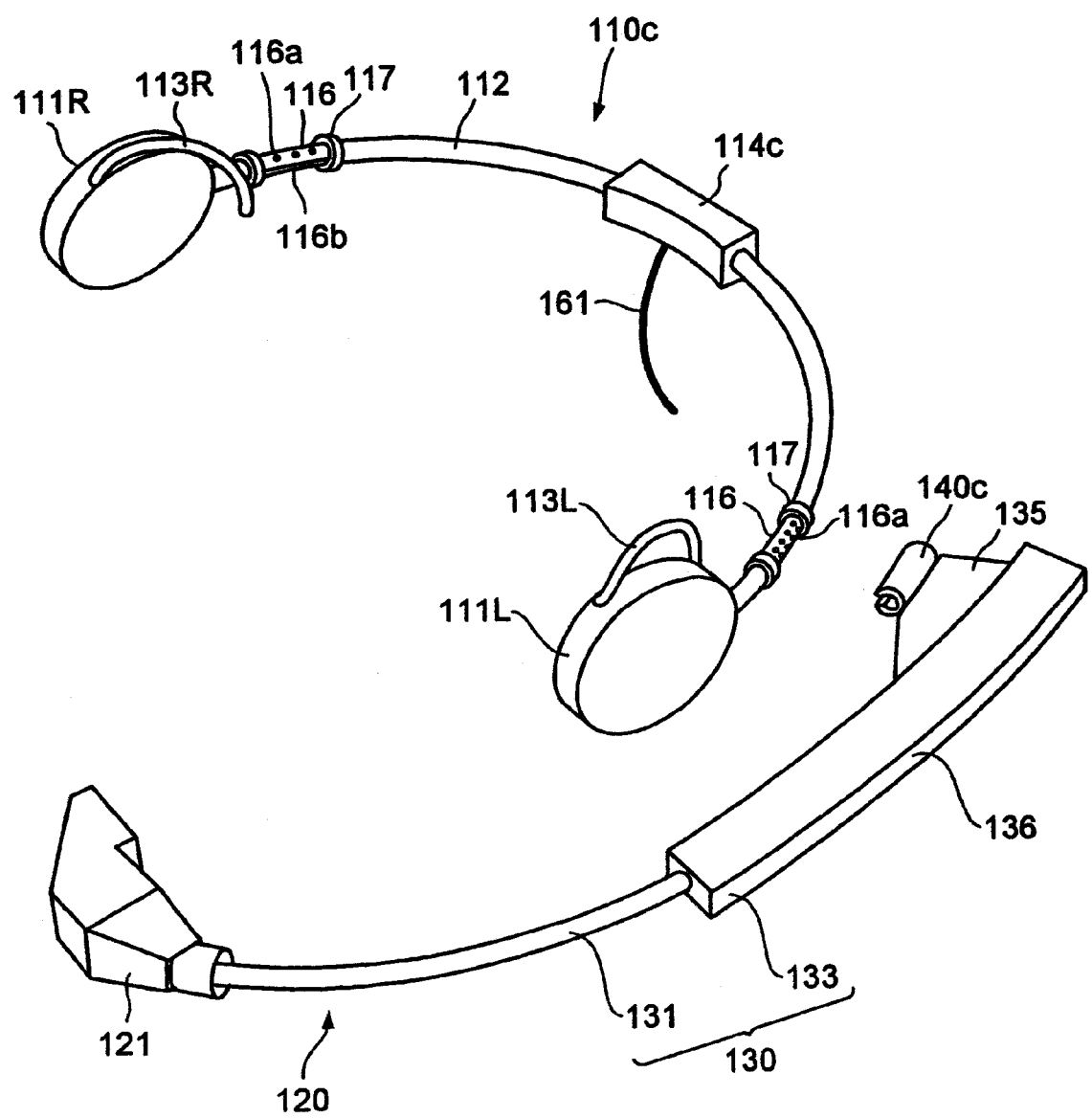
FIG. 29 is a perspective view showing a wearable display system having an image display unit (in a non-coupled state) of a fourth embodiment, the image display unit of which can be arranged near a user's eye.
Figure 30:
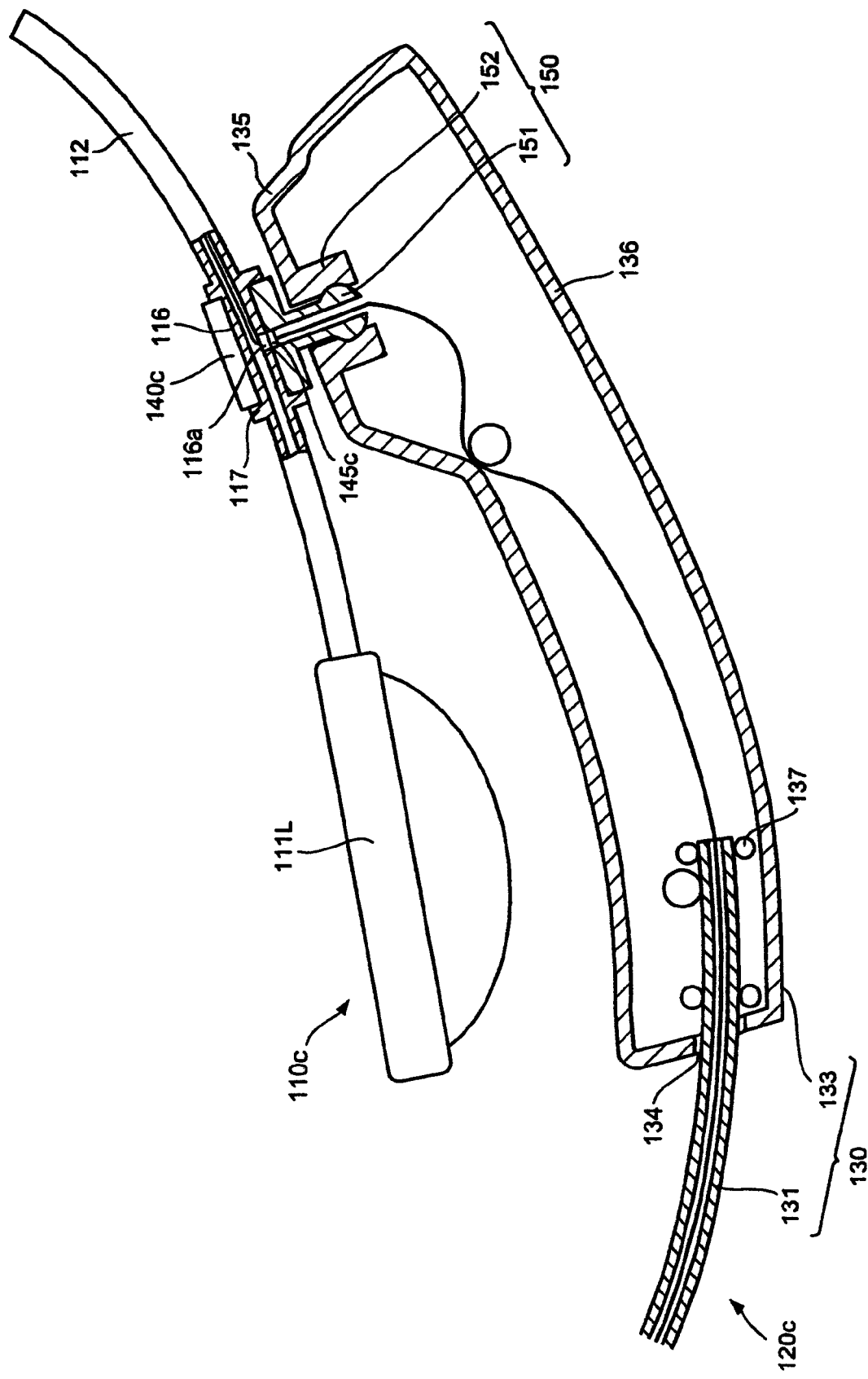
FIG. 30 is a cross section showing main parts of the wearable display system of the fourth embodiment.
Figure 31:
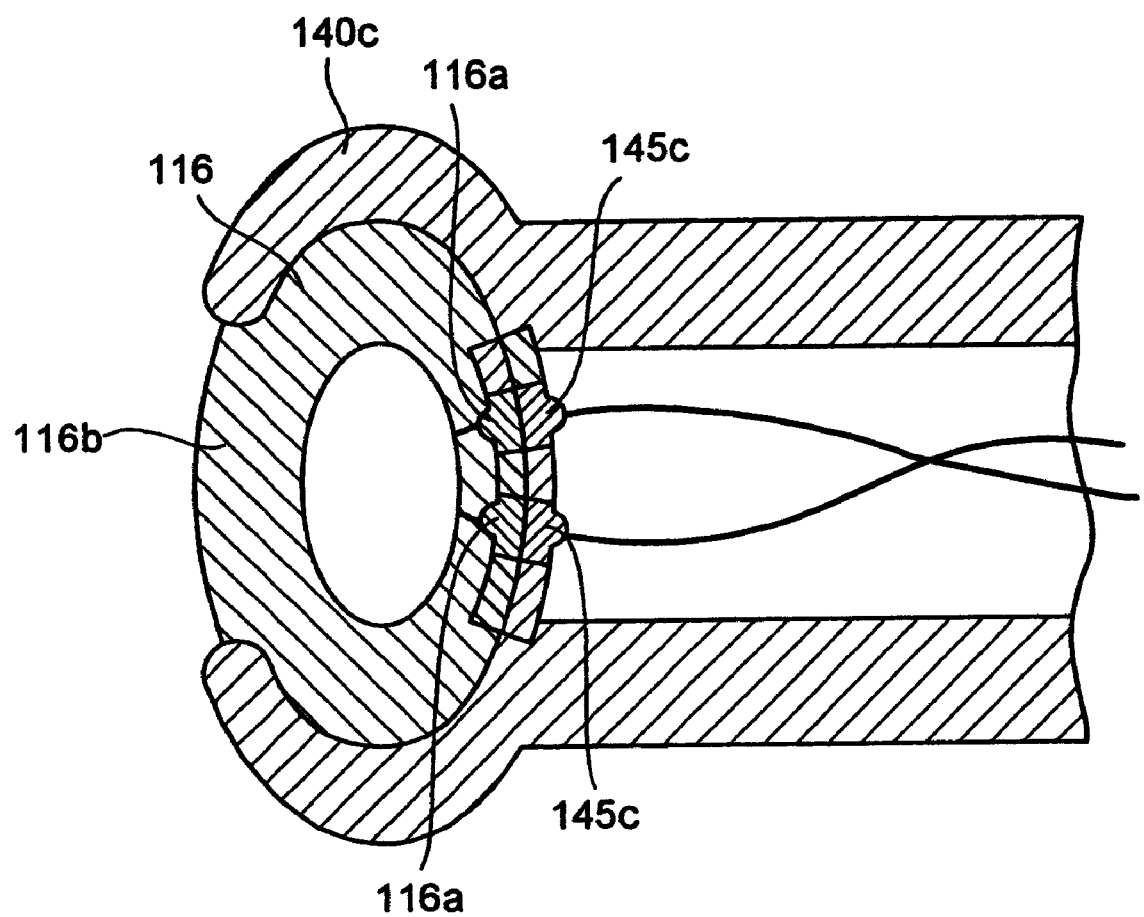
FIG. 31 is a cross section showing an attachment of the wearable display system of the fourth embodiment.
Figure 32:
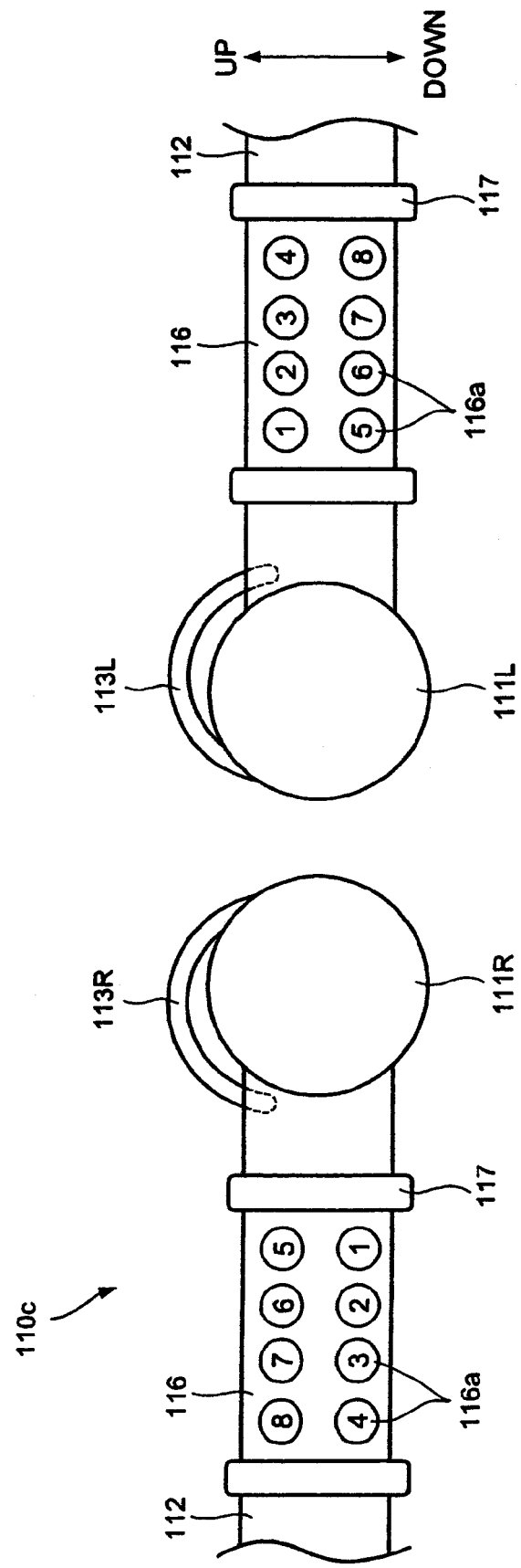
FIG. 32 is an explanatory view showing arrangement of electric contacts in coupling portions on the left and right sides of the wearable display system of the fourth embodiment.
Figure 33:
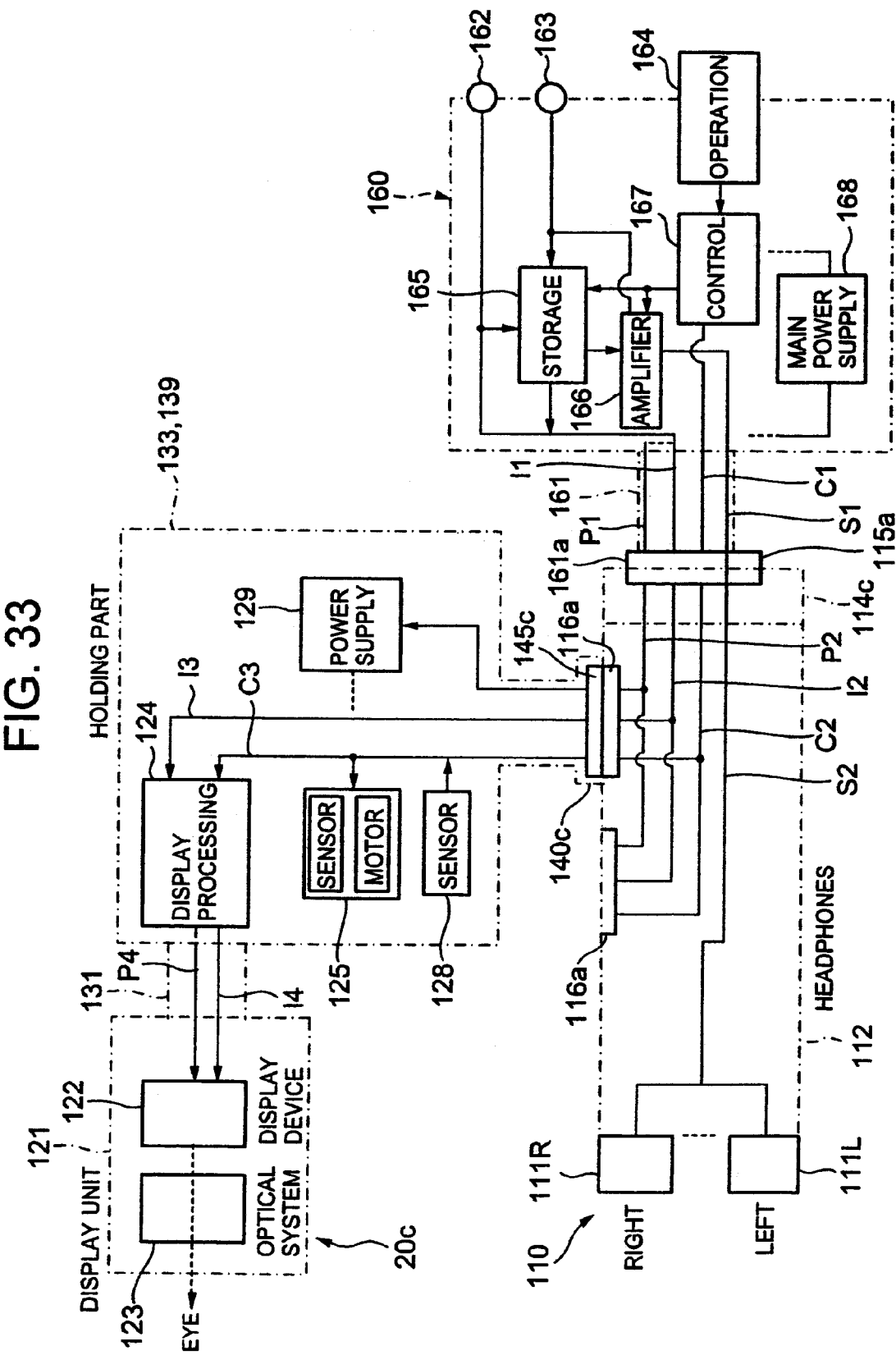
FIG. 33 is a circuit block diagram of the wearable display system of the fourth embodiment.

Next, referring to FIGS. 29-33, will be described a fourth embodiment of the wearable display system of which the image display unit can be arranged near a user's eye. FIG. 29 is a perspective view showing the wearable display system (in a non-coupled state) of the fourth embodiment; FIG. 30 is a horizontal cross section showing main parts of the wearable display system of the fourth embodiment; FIG. 31 is a vertical cross section showing an attachment of the wearable display system; FIG. 32 is an explanatory view showing arrangement of electric contacts in left and right coupling portions of the wearable display system; and FIG. 33 is a circuit block diagram of the wearable display system.

As shown in FIG. 29, the wearable display system of the present embodiment also comprises headphones 110c and a wearable display unit 120c similarly to the above-described embodiments.

At an almost central portion of the headphone arm 112 of the headphones 110c, there is provided a cable connection part 1114c to which the controller cable 161 is connected. Further, in the neighborhoods of the left and right speakers 111R and 111L of the headphone arm 112, there are formed respective coupling portions 116, 116 to which the wearable display unit 120c is coupled. Further, multiple electric contacts 116a, 116a, ... are provided in each of these coupling portions 116, 116. On both sides of each coupling portion 116, are formed projections 117, 117 for restricting a shift of the wearable display unit 120c in the longitudinal direction of the headphone arm 112. The electric contacts 116a of each coupling portion 116 are formed on the outer side of the headphone arm 112 of an arc shape adapted for a shape of a head. Further, an anti-rotation member 116b for preventing rotation of the wearable display unit 120c is formed on the inner side of each coupling portion. As shown in FIG. 31, this anti-rotation member 116b projects toward the opposite side to the electric contacts 116a and has a width corresponding to the opening width of the attachment 140c having a C-shaped cross section. FIG. 31 shows cross sections of a coupling portion 116 and the attachment 140c coupled to the coupling portion 116.

As shown in FIG. 30 illustrating the cross section of the display support member housing 136, the clearance part 135 of the display support member housing 136 is provided with a displacement mechanism 150. The displacement mechanism 150 is used for changing the relative position and direction of the image display unit 121 with respect to the attachment 140. The displacement mechanism 150 comprises a ball 151 provided in the attachment 140 and a ball socket 152 formed in the clearance part 135 of the display support member housing 136. Frictional force larger than a certain magnitude acts between the ball 151 and the ball socket 152. Thus, the ball socket 152 can not rotate relatively to the ball 151 unless turning force larger than a certain magnitude acts on the ball socket 152 in relation to the ball 151. Further, as shown in the figure, lead wires are provided within the displacement mechanism 150.

As shown in FIGS. 30 and 31, the internal surface of the attachment 140c of the C-shaped cross section is provided with a plurality of electric contacts 145c, 145c, that are respectively in contact with a plurality of electric contacts 116a, 116a, ... provided in each coupling portion 116 of the headphone arm 112. Theses electric contacts 145c are connected with the lead wires that form the signal lines and the power line. These lead wires pass through the insides of the attachment 140c and the ball 151 and extend toward the inside of the display support member housing 136.

As shown in FIG. 33, wiring of the signal lines and the like in the wearable display unit 120 and the headphones 110 is basically similar to the wiring of the second embodiment. However, as described above, the headphone arm 112 has a plurality of electric contacts 116a, 116a in each of the two portions (i.e. the left and right portions) in order to establish electric connection with the wearable display unit 120. Accordingly, the power line P2, the control signal line C2 and the image signal line I2 extending from the controller-side connector 115c of the headphones 110 are each branched on the way to extend to two electric contacts 116a, 116a. Out of two sets of electric contacts 116a, 116a provided respectively at the two portions of the headphone arm 112, one set of electric contacts 116a become in contact with a plurality of electric contacts 145c provided in the attachment 140c at the time of mechanical coupling between the attachment 140c of the wearable display unit 120c and the headphone arm 112. The other set of electric contacts 116a are connected with terminating resistance for consuming a signal transmitted through the image signal line I2 so that the image signal is efficiently supplied to the display processing part 124. In fact, considering the external appearance also, a cap having terminating resistance is put on the other set of electric contacts 116a.

The top and the bottom of the wearable display unit 120c are reversed between the case where the wearable display unit 120c is coupled to the coupling portion 116 on the right side of the headphone arm 112 and the case where the wearable display unit 120c is coupled to the coupling portion 116 on the left side of the headphone arm 112. Accordingly, it is necessary to differentiate the arrangement of a plurality of electric contacts 116a in the coupling portion 116 on the right side from the arrangement of a plurality of electric contacts 116a in the coupling portion 116 on the left side.

FIG. 32 is a view showing a state of the arrangements, seeing the left side coupling portion 116 and the right side coupling portion 116 from respective fronts of the surfaces in which electric contacts are arranged. As shown in the figure, it is assumed that, as a plurality of electric contacts 116a in each coupling portion 116, there exist contacts 1-8, and that, in the left coupling portion 116, the contacts 1-4 are placed from left to right in a row, and under this group of contacts, the contacts 5-8 are placed from left to right. As described above, when the coupling position is changed from left to right or vice versa, the top and the bottom of the wearable display unit 120 are reversed and, as a result, also a plurality of electric contacts 145c provided in the attachment 140 are turned upside down. Accordingly, in the right coupling portion 116, the contacts 5-8 (which are placed on the lower side in the left coupling portion 116) are placed on the upper side and the contacts 1-4 (which are placed on the upper side in the left coupling portion 116) are placed on the lower side. Further, in the right coupling portion 116, the contacts 1-4 are placed from right to left, i.e. to the direction to which the headphone arm 112 extends, and the contacts 5-8 are placed from right to left also.

In other words, as for contacts positioned side by side in a nearly vertical direction in a state that the headphones 110c are mounted on a user's head, their positional relationship in the vertical direction is reversed between the left and right coupling portions 116, 116. And, as for contacts positioned side by side in a nearly horizontal direction in a state that the headphones 110c are mounted on the user's head, their positional relationship in the horizontal direction is reversed between the left and right coupling portions 116, 116.

As described above, in the present embodiment also, it is possible to release the mechanical and electric connections between the headphones 110c and the wearable display unit 120 similarly to the above-described embodiments. Thus, the headphones 110c can be used by themselves. Further, since the electric contacts 116a, 145c are provided in the headphones 110c and the mechanical attachment 140c for electrically connecting the headphones 110c and the wearable display unit 120c, cables for electrically connecting the headphones 110c and the wearable display unit 120c are not required. Thus, the external appearance is improved.

In the second embodiment, the gravity sensor 128 can detect vertical inversion of the image display unit 121 caused by a change of the position of coupling the wearable display unit 120. In the present embodiment, instead, it is possible to provide a sensor that detects a state of an electrical connection of at least one contact among a plurality of electric contacts in the attachment 120c of the wearable display unit 120 or at least one contact among a plurality of electric contacts in the left and right coupling portions 116. Output of this sensor is sent to the display processing part 124, similarly to the output of the gravity sensor 128 in the second embodiment. Based on the output of this sensor, the display processing part 124 can recognize whether the wearable display unit 120c is coupled on the right side or the left side and reverse the top and the bottom of the image.

Instead of the mechanical attachment 140c of the present embodiment, the attachment 140a or 140b of the first or second variant in the second embodiment may be used while providing electric contacts to the attachment 140a or 140b. This can produce similar effects, of course.

Figure 34:
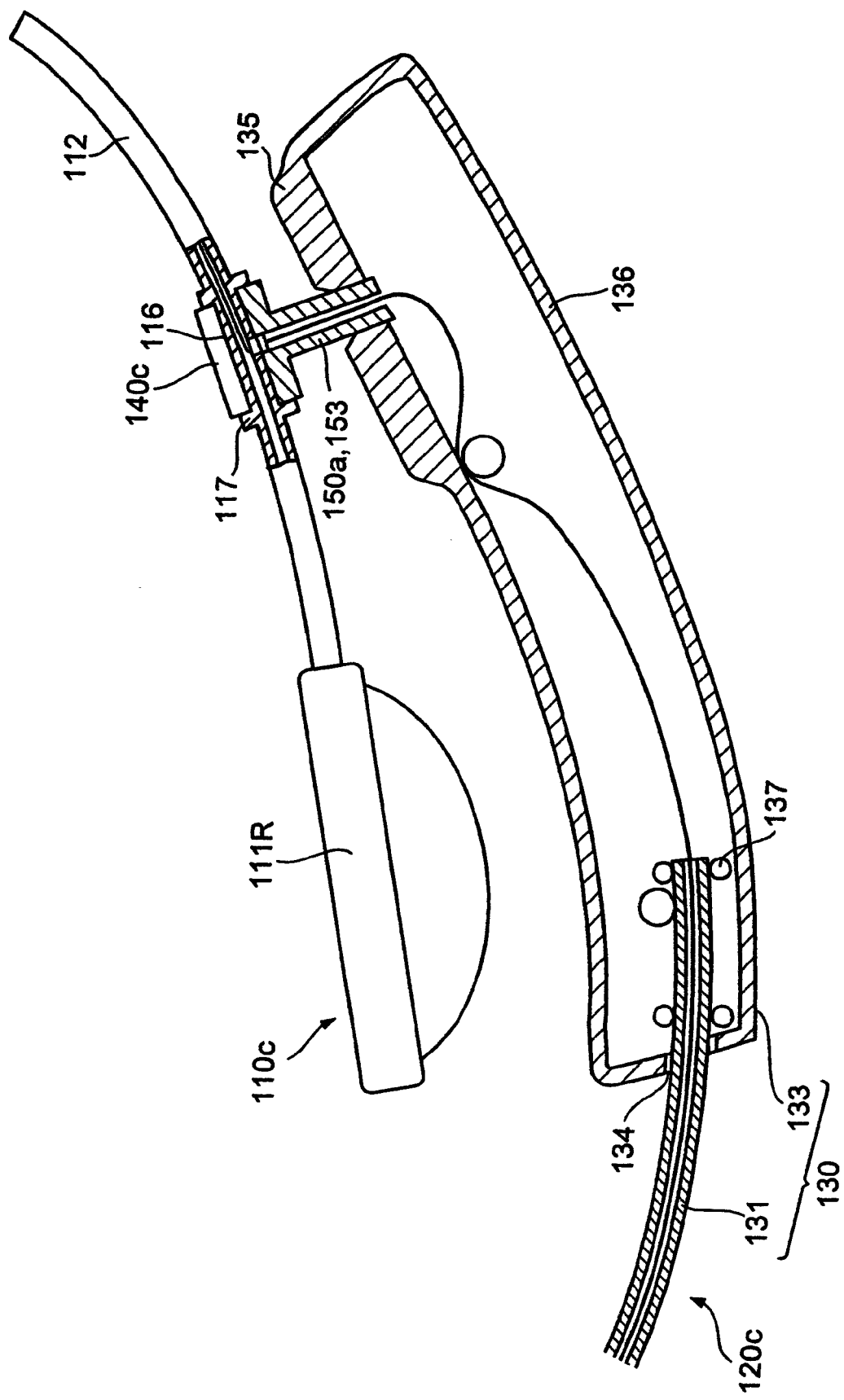
FIG. 34 is a cross section showing a displacement mechanism of the wearable display system of the fourth embodiment.

Next, referring to FIG. 34, will be described a variant of the displacement mechanism 150 in the above-described fourth embodiment.

A displacement mechanism 150a of this variant uses a flexible wire 153 instead of the ball 151 in the displacement mechanism 150 of the fourth embodiment. This flexible wire 153 is obtained by weaving fine wires into a wire rod of a certain thickness and filling resin into gaps between the fine wires and around the rod of the certain thickness. Thus, the flexible wire 153 is deformed under a force of a certain intensity and keeps the deformed state unless a force of a certain intensity is applied again.

One end of this flexible wire 153 is fixed to the clearance part 135 of the display support member housing 136, and the other end to the attachment 140c. Thus, using this flexible wire 153 instead of the ball 151 in the fourth embodiment and deforming the flexible wire 153 in various directions, the holding part 130 and the image display unit 121 held by the holding part 130 can be displaced around each of three independent axes in the three-dimensional space, similarly to the fourth embodiment.

The displacement mechanism 150 of the fourth embodiment or the displacement mechanism 150a of the present variant can be used in each of the above- and below-described embodiments.

[Fifth Embodiment]

Figure 35:
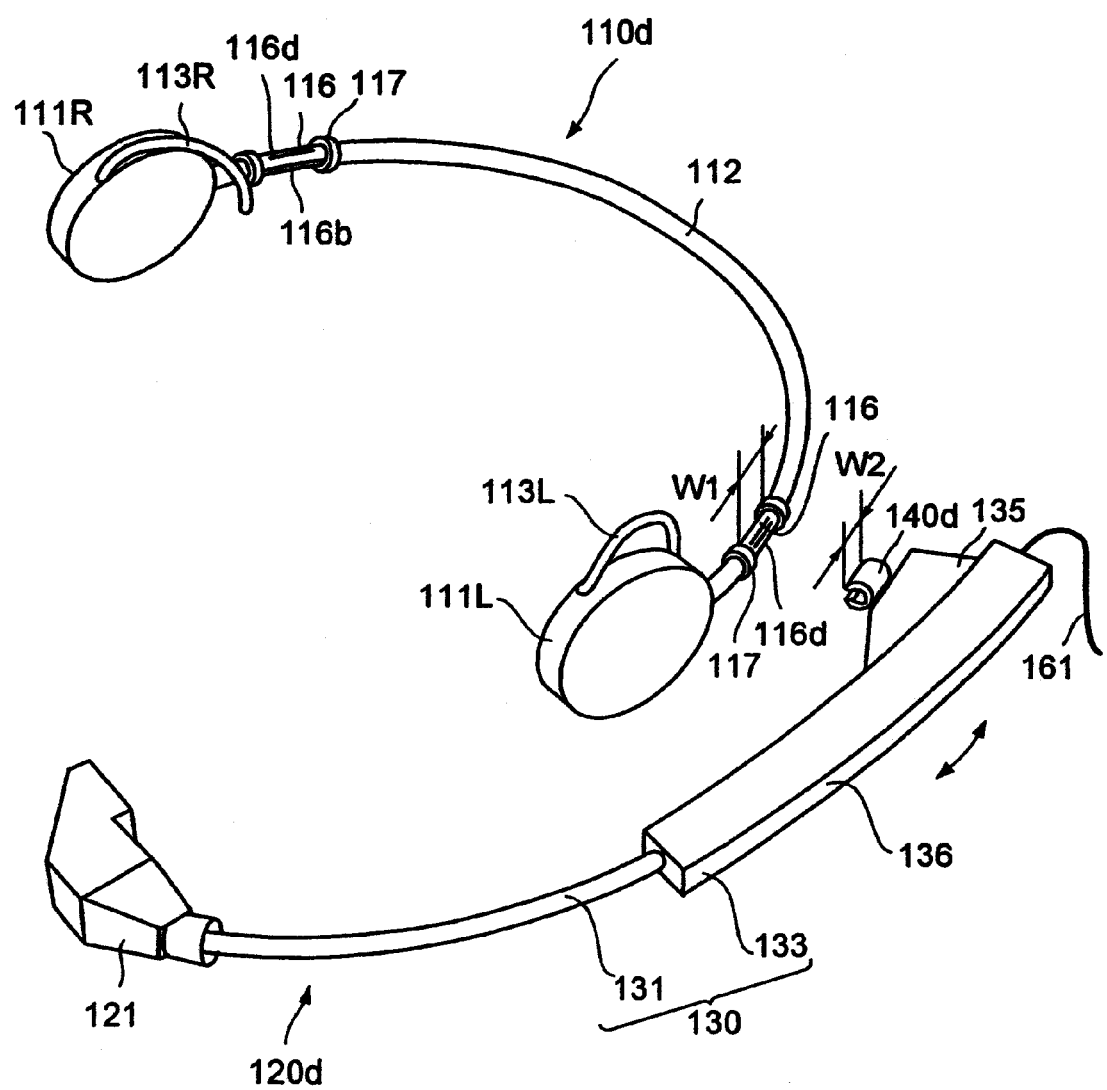
FIG. 35 is a perspective view showing a wearable display system having an image display unit of a fifth embodiment, the image display unit of which can be arranged near a user's eye.
Figure 36:
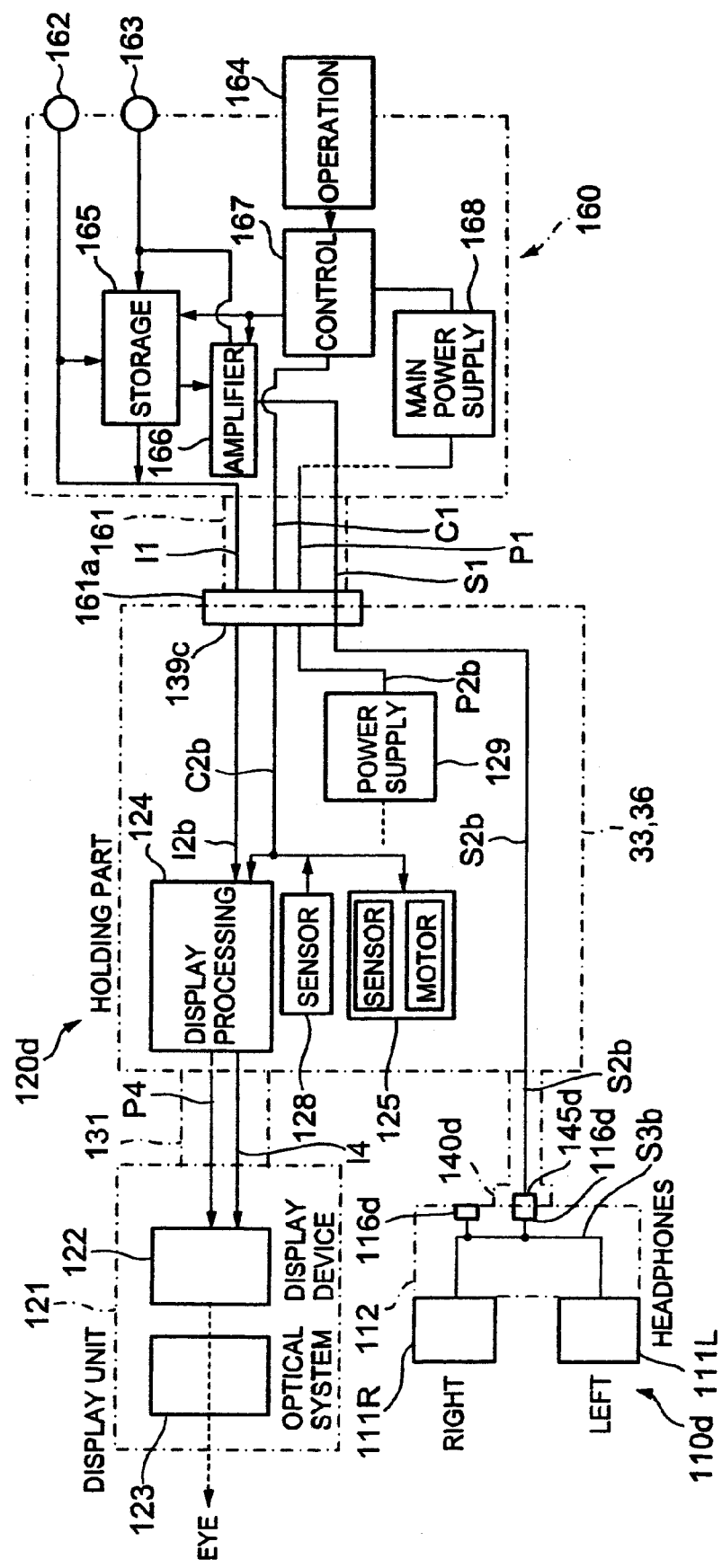
FIG. 36 is a circuit block diagram of the wearable display system of the fifth embodiment.

Next, referring to FIGS. 35 and 36, will be described a fifth embodiment of the wearable display system of which the image display unit can be arrange near a user's eye. FIG. 35 is a perspective view showing the wearable display system of the fifth embodiment, and FIG. 36 is a circuit block diagram of the wearable display system.

As shown in FIG. 35, also the wearable display system of the present embodiment comprises headphones 110d and a wearable display unit 120d similarly to the above-described embodiments.

In the neighborhoods of the left and right speakers 111R and 111L of the headphone arm 112 of the headphones 110d, are formed respective coupling portions 116, 116 to which the wearable display unit 120d is to be coupled. These coupling portions 116, 116 are each provided with a plurality of electric contacts 116d. On both sides of each coupling portion 116, are formed projections 117, 117 for restricting a shift of the wearable display unit 120d in the longitudinal direction of the headphone arm 112. The electric contacts 116d of each coupling portion 116 are formed on the outer side of the headphone arm 112 of an arch shape adapted for a shape of a head. And, on the inner side of the headphone arm 112, is formed an anti-rotation member 116b for preventing rotation of the wearable display unit 120d.

On the other hand, an attachment 140d of the wearable display unit 120 is coupled to a coupling portion 116 of the headphones 110d. The attachment 140d is basically similar to the attachment of the fourth embodiment, and the internal surface of the attachment 140d is provided with a plurality of electric contacts that are in contact with a plurality of electric contacts 116d, 116d provided in each coupling portion 116 of the headphone arm 112. These electric contacts are connected with lead wires that form the signal lines and the power line. These lead wires pass through the inside of the attachment 140d and extend toward the inside of the display support member housing 136. The width (i.e. the length in the direction of the extension of the headphone arm 112) W2 of this attachment 140d is shorter than the width W1 of each coupling portion 116 of the headphone arm 112. As a result, the attachment 140d can move relatively to each coupling portion 116 of the headphone arm 112 by the length (W1-W2) in the direction of the extension of the headphone arm 112. Accordingly, to ensure electric connections between the electric contacts 116d of each coupling portion 116 and the electric contacts in the attachment 140d, each electric contact 116d in the coupling portions 116 has the length larger than (W1-W2) in the direction of the extension of the headphone arm. In the present embodiment also, as for contacts positioned side by side in a nearly horizontal direction in a state that the headphones 110d are mounted on a user's head, their positional relationship in the horizontal direction is reversed between the left and right coupling portions 116, 116.

As shown in FIG. 36, wiring of the signal lines and the like in the wearable display unit 120c and the headphones 110c is basically similar to the wiring of the third embodiment. However, as described above, the headphone arm 112 has a plurality of electric contacts 116d, 116d in each of the two portions (i.e. the left and right portions) in order to establish electric connection with the wearable display unit 120d. Accordingly, the audio signal line S3b extending from each speaker 111R, 111L of the headphones 110d are branched on the way to extend to two electric contacts 116d, 116d. Out of two sets of electric contacts 116d, 116d provided respectively at the two portions of the headphone arm 112, one set of electric contacts 116d become in contact with a plurality of electric contacts 145d provided in the attachment 140d at the time of mechanical coupling between the attachment 140d of the wearable display unit 120d and the headphone arm 112.

As described above, the present embodiment can obtain basically same effects as ones obtained by the fourth embodiment. Further, in the present embodiment, the wearable display unit 120d can be moved relatively to the headphones 110 in the direction in which the headphone arm 112 extends. As a result, it is possible to have a larger degree of freedom of displacement of the wearable display unit 120d in relation to the headphones 110d, in comparison with the fourth embodiment.

[Sixth Embodiment]

Figure 37:
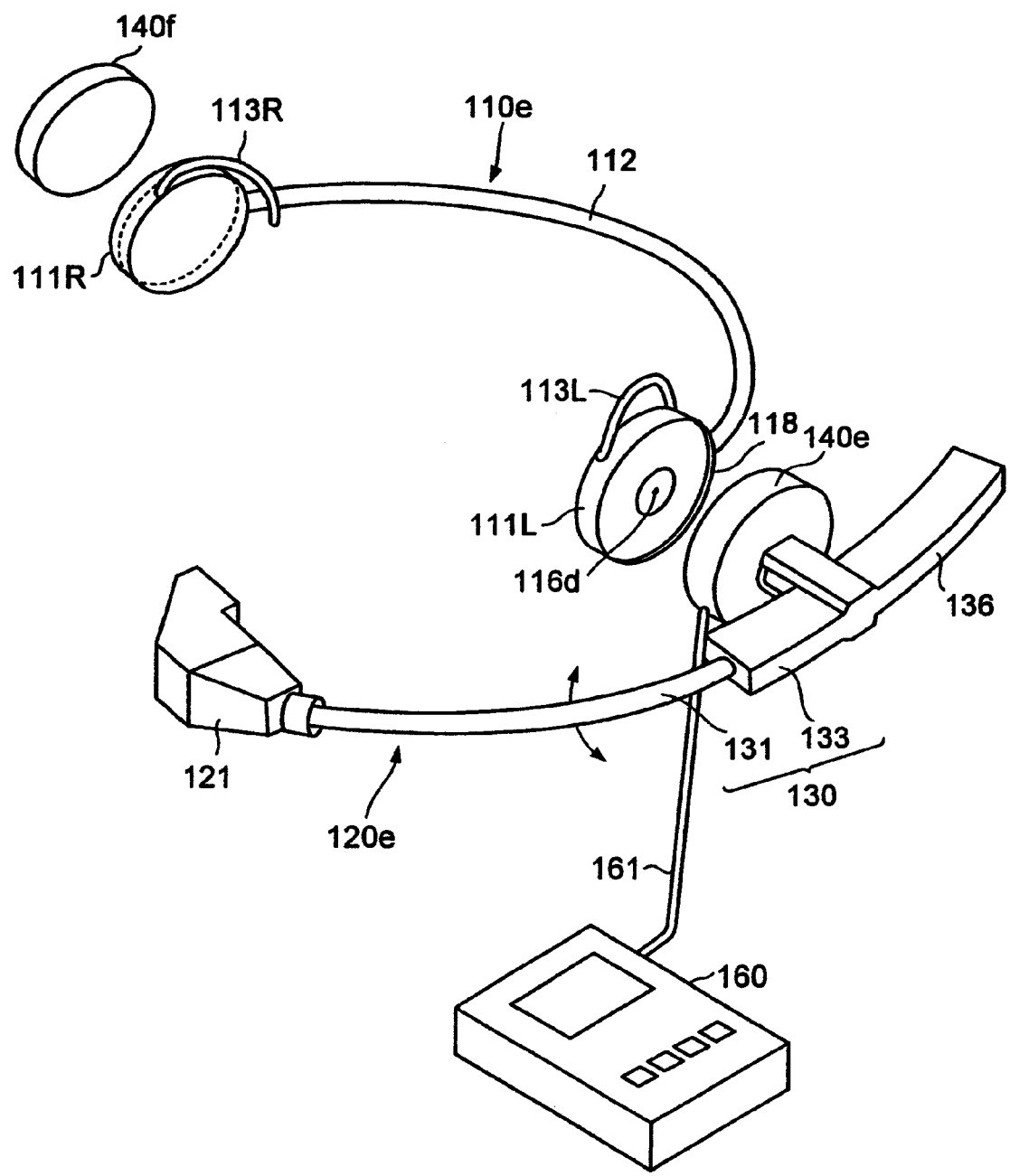
FIG. 37 is a perspective view showing a wearable display system having an image display unit of a sixth embodiment, the image display unit of which can be arranged near a user's eye.
Figure 38:
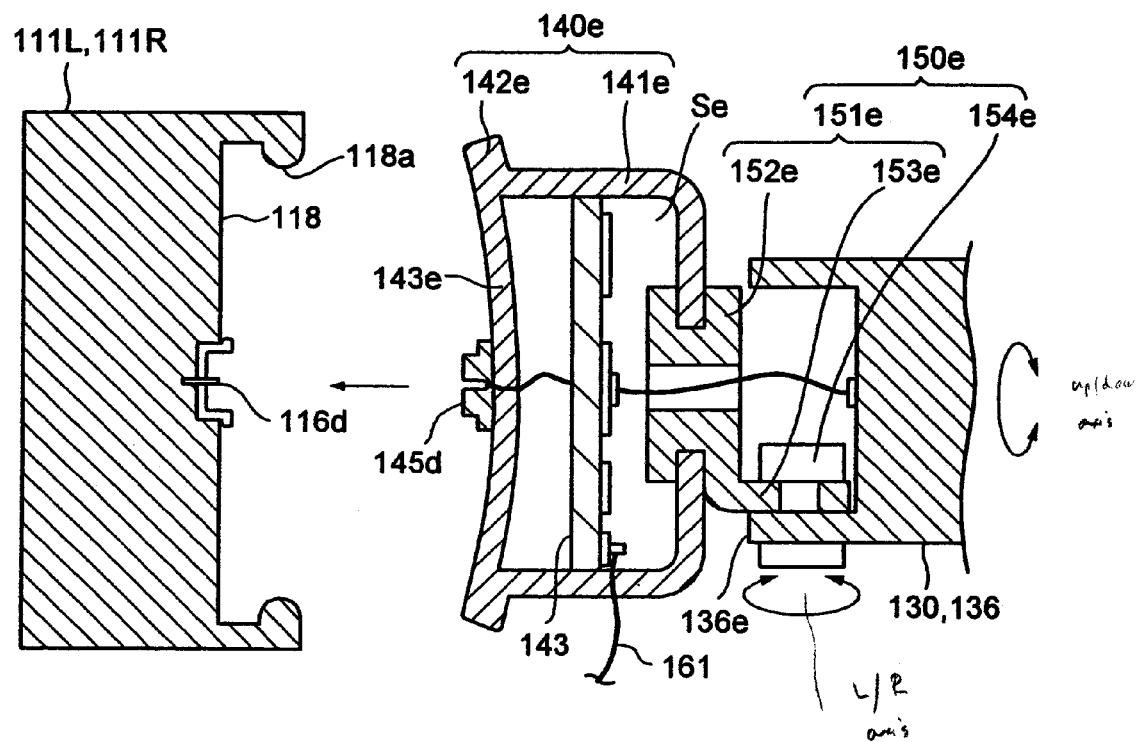
FIG. 38 is a cross section showing a speaker, an attachment and a displacement mechanism of the wearable display system of the sixth embodiment.
Figure 39:
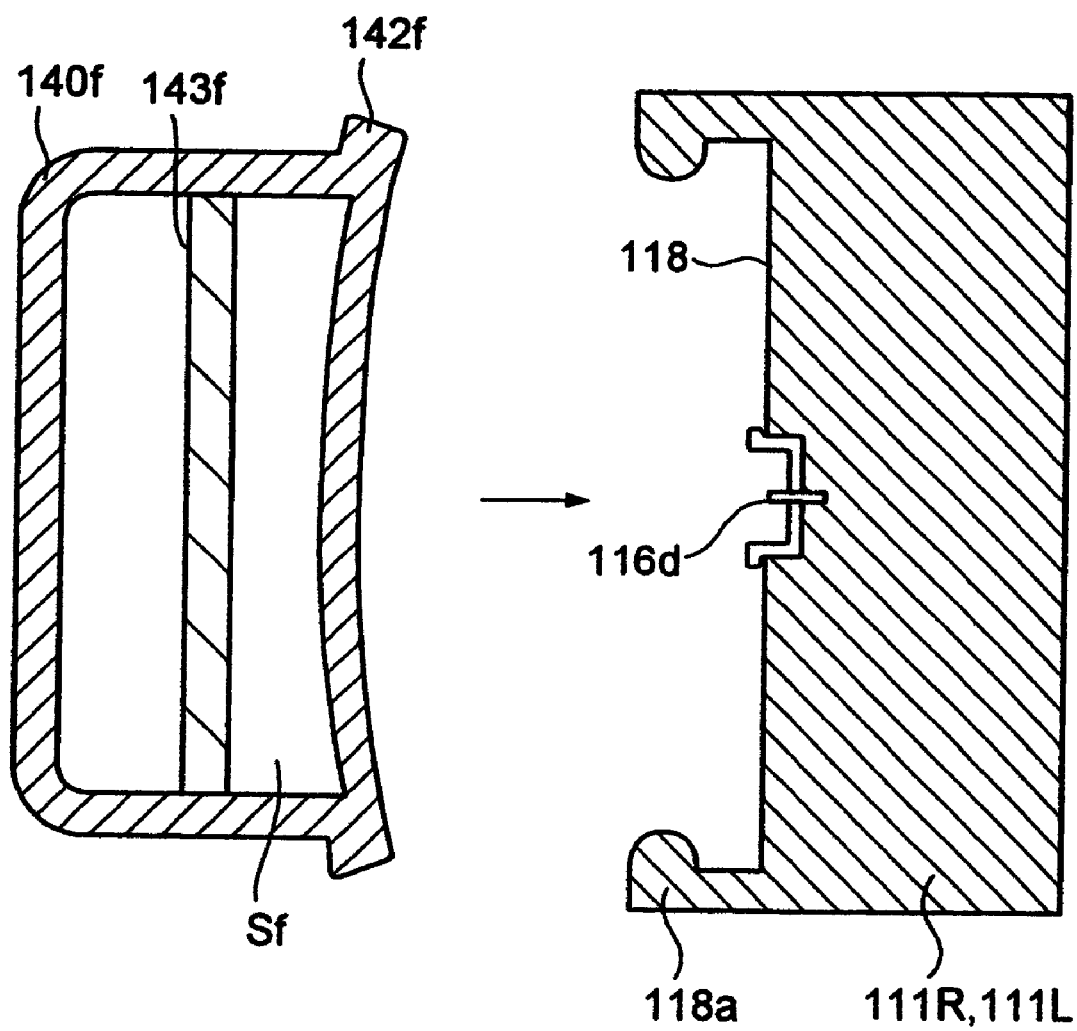
FIG. 39 is a cross section showing a speaker and an outer cap of the wearable display system of the sixth embodiment.

Next, referring to FIGS. 37-39, will be described a sixth embodiment of the wearable display system of which the image display unit can be arranged near a user's eye. FIG. 37 is a perspective view showing the wearable display system of the sixth embodiment; FIG. 38 is a cross section showing a speaker, an attachment and a displacement mechanism of the wearable display system; and FIG. 39 is a cross section showing a speaker and an outer cap of the wearable display system.

As shown in FIG. 37, the wearable display system of the present embodiment comprises headphones 110e and a wearable display unit 120e, similarly to the above-described embodiments.

The wearable display system of the present embodiment has the basically same circuit configuration, wiring of the signal lines and the like as those of the wearable display system of the fifth embodiment described referring to FIG. 36. However, as described in the following, the present embodiment is different from the above-described embodiments in that the wearable display unit 120e is coupled to a speaker 111 of the headphones 110e. As a result, positions of electric contacts for electrically connecting the headphones 110 and the wearable display unit 120e are different from ones in the fourth embodiment.

A coupling portion 118, to which the wearable display unit 120e is to be coupled, is formed in each of left and right speakers 111R and 111L of the headphones 110e on the side opposite to the side contacting with a user's head. As shown in FIG. 38, this coupling portion 118 is formed with a collar 118a projecting toward the inner side at an opening edge of a groove. This collar 118a is formed with elastic resin and can be deformed. In a portion corresponding to the bottom of the groove of each coupling portion 118, there are provided a plurality of electric contacts 116d, 116d, . . . for receiving the audio signal.

The wearable display unit 120e comprises: an image display unit 121 for displaying an image in front of a user's eye; an attachment 140e that can be coupled to the coupling portion 118 of each speaker 111R, 111L; and a holding part 130 that connects the image display unit 121 to the attachment 140e.

As shown in FIG. 38, the attachment 140e has a shape that can be inserted into the coupling portion 118 of a speaker 111. In detail, the attachment 140e comprises: an attachment main body 141e of a hollow cylinder shape; and a coupling collar 142e that enters between the bottom of a coupling portion 118 and the collar 118a of the coupling portion 118. The coupling collar 142e is provided on the outer periphery of the bottom 143e of the attachment main body 141e. To couple the attachment 140e to a speaker 111, the collar 118a of the coupling portion 118 of the speaker 111 is deformed elastically, to insert the coupling collar 142e of the attachment 140e between the bottom of the coupling portion 118 and its collar 118a. The bottom 143e of the attachment main body 140e is provided with electric contacts 145d that are to be connected to the electric contacts 116d of a speaker 111. When the attachment 140e has been coupled to the coupling portion 118 of a speaker 111, these electric contacts 145d are electrically connected to the electric contacts 116d of the coupling portion 118.

As described above, the wearable display system of the present embodiment has the basically same circuit configuration, wiring of the signal lines and the like as those of the fifth embodiment. However, the present embodiment is different from the fifth embodiment in that a part of the circuit configuration provided in the display support member housing 136 is placed inside the hollow attachment main body 141e. Further, a circuit board formed with such circuits is connected with the controller cable 161 extending from the controller 160. The above-mentioned electric contacts 145d of the attachment 140e are connected, through the circuit board 143, with the audio signal line included in the controller cable 161. Further, the control signal lines, the image signal line, the power line and the like extend from each circuit 124, 129 or the like on the circuit board 143. The control signal lines are connected to the display support member drive control part 125 and the like provided in the display support member housing 136 of the holding part 130. The image signal line is connected to the image display unit 121. And, the power line supplies electric power to the display support member drive control part 125 and the image display unit 121.

A displacement mechanism 150e for changing the directions and positions of the holding part 130 and the image display unit 121 relatively to the attachment 140e is provided between the display support member housing 136 and the attachment 140e. The displacement mechanism 150e comprises: an up-and-down movement rotation axis member 151e for moving the image display unit 121 up and down; and a left-and-right movement rotation axis member 154e for moving the image display unit 121 to the left and to the right. The up-and-down movement rotation axis member 151e comprises: an axis member 152e that is fixed to the attachment 140e on the opposite side to the electric contacts 145d; and a bracket member 153e that extends from the axis member 152e toward the holding part 130. The left-and-right movement rotation axis member 154e passes through the bracket member 153e of the up-and-down movement rotation axis member 151e and a bracket member 136e of the display support member housing 136. In the displacement mechanism 150e, frictional force larger than a certain magnitude acts between the axial parts and the socket parts, and thus a socket part does not rotate relatively to an axial part unless a force larger than a certain level is applied from the side of the display support member housing 136.

In the present embodiment, each of the right speaker 111R and the left speaker 111L is formed with a coupling portion 118. Thus, when the wearable display unit 120e is coupled to the right speaker 111R for example, the coupling portion 118 of the left speaker 111L is exposed. This is not favorable from the viewpoint of the external appearance. Thus, the present embodiment has an outer cap 140f for covering the coupling portion 118 of a speaker 111 to which the wearable display unit 120e is not coupled. As shown in FIG. 39, the outer cap 140f is similar to the attachment 140e in their external appearances, and has a collar 142f that is fit into the coupling portion 118 of each speaker 111. Further, the outer cap 140f is hollow similarly to the attachment 140e, and a division plate 143f similar to the circuit board 143 of the attachment 140e is provided inside the outer cap 140f. The division plate 143f is provided in order to form the same space Sf within the outer cap 140f as a space Se formed between the circuit board 143 and the bottom 143e of the attachment main body 141e as a result of providing the circuit board 143 in the attachment 140e. Owing to this arrangement, it is possible to obtain the same sound quality both from the left speaker 111L and the right speaker 111R.

As described above, also in the present embodiment, all the signals and the like sent from the controller 160 to the wearable display unit 120e and the headphones 110e are once sent to the wearable display unit 120e similarly to the third and fifth embodiments. As a result, the number of cables extending from the controller 160 can be reduced. Further, it is not necessary to provide the image signal line in the headphones. This reduces the weight of the headphones. Further, the outer cap 140f can consume the image signal, it is not necessary to provide a terminating resistance separately.

In the present embodiment, all the signals and the like sent from the controller 160 to the wearable display unit 120e and the headphones 110 are once sent to the wearable display unit 120e. However, similarly to the second and fifth embodiments, it is possible that all the signals and the like sent from the controller 160 to the wearable display unit 120 and the headphones 110e are once sent to the headphones 110e, and the wearable display unit 120e receives the image signal and electric power from the headphones 110.

Figure 40:
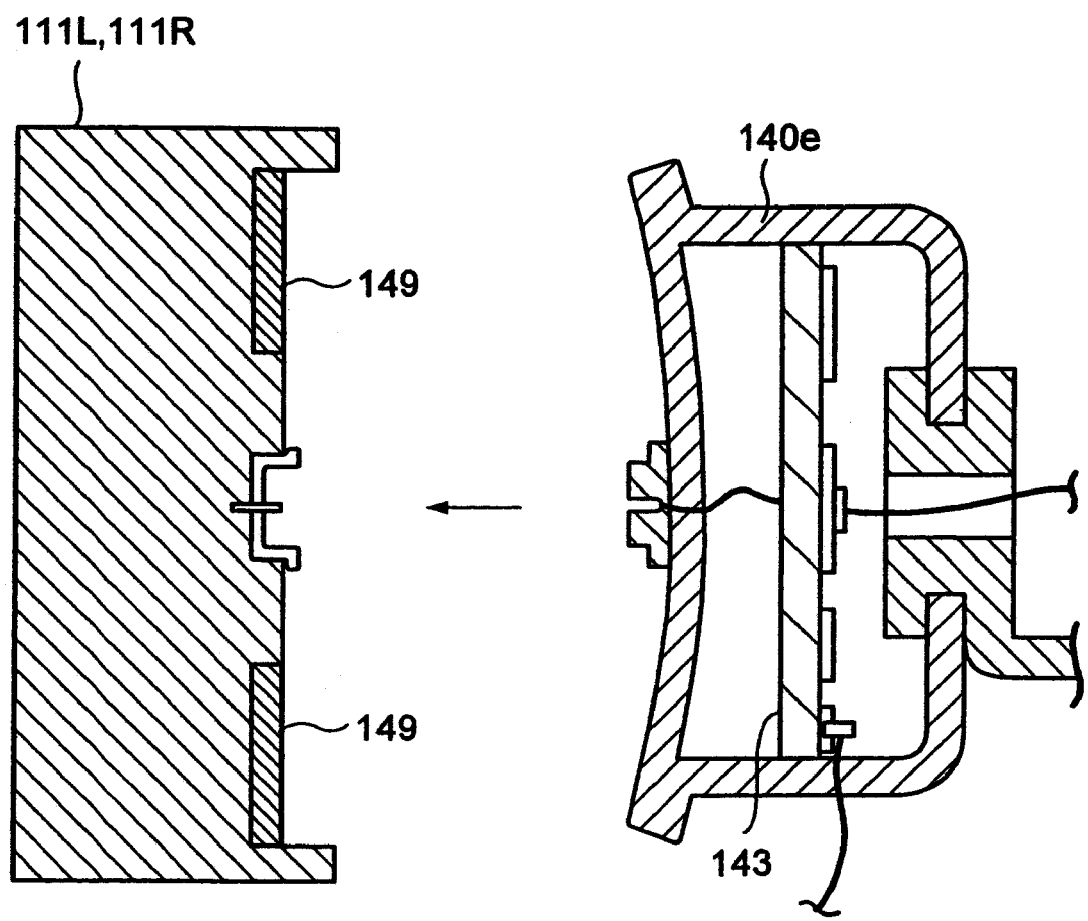
FIG. 40 is a cross section showing a speaker and an attachment of a variant of the wearable display system of the sixth embodiment.

Further, in the present embodiment, the attachment 140e is coupled to a speaker 111 by deformation of an elastic body. However, as shown in FIG. 40, for example a magnet 149 may be provided to either of the attachment 140e and a speaker 111, and a magnetic body such as iron may be provided to the other so that the attachment 140e is attached to the speaker 111.

Further, in the case where a plurality of electric contacts exist as the electric contacts 116d of the coupling portion 118 of each speaker 111, it is favorable that these contacts are arranged as described above referring to FIG. 32.

Further, into the present embodiment, may be combined various structures of the above-described embodiment and their variants such as the various constructions of the display support member and its support forms described in the first embodiment, the circuit configuration of the system described in the second embodiment or the like, and the constructions of the auxiliary holding parts that will be described in the seventh embodiment.

[Seventh Embodiment]

Referring to FIGS. 41-44, will be described a seventh embodiment of the wearable display system of which the image display unit can be arranged near a user's eye.

Figure 41:
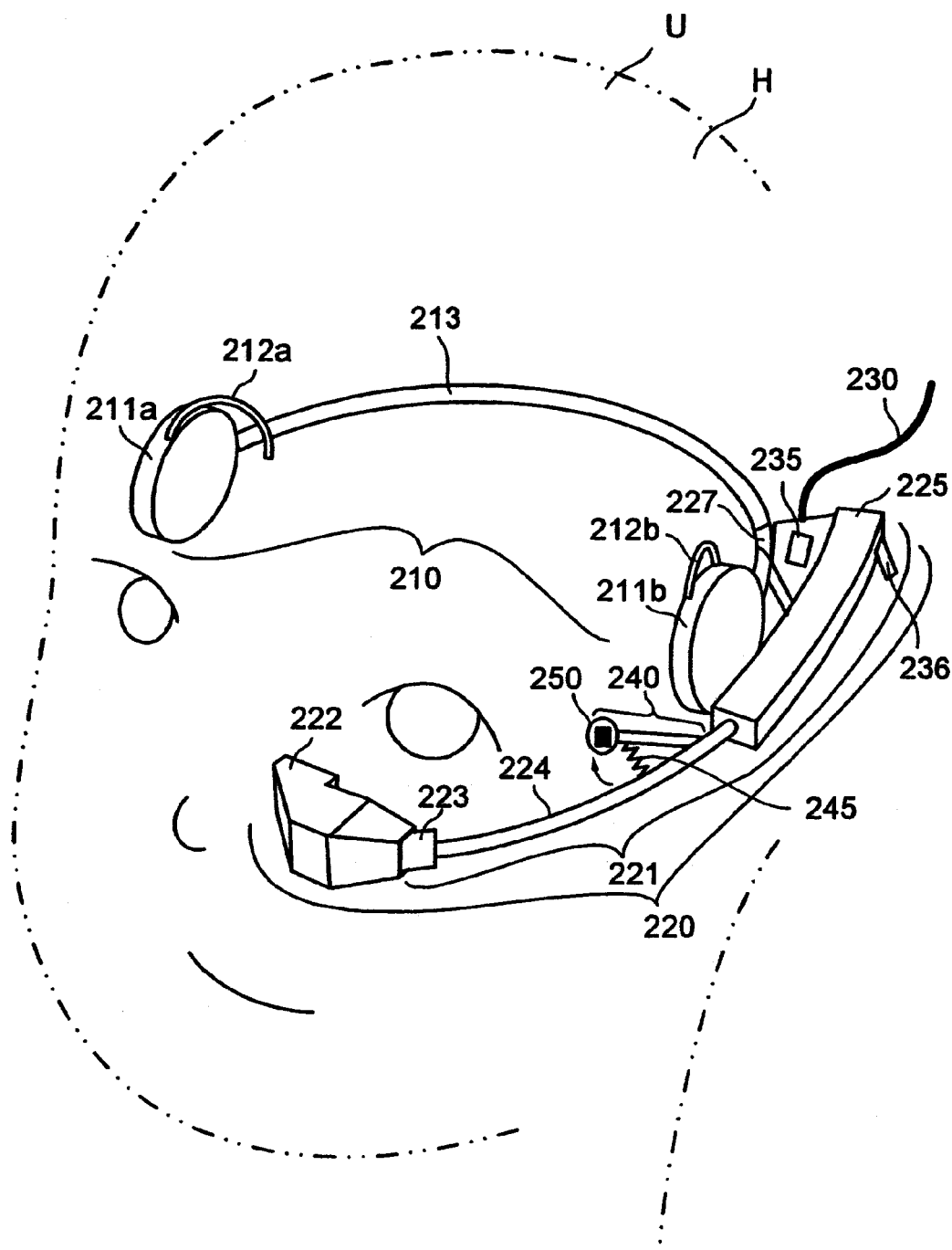
FIG. 41 is a perspective view showing a wearable display system having an image display unit of a seventh embodiment, the image display unit of which can be arranged near a user's eye.

FIG. 41 is a perspective view showing an external appearance of the wearable display system in the case where the wearable display system is mounted on a head H of a user U. In the present embodiment, the head H includes the neck of the user U who uses the wearable display system, and thus refers to the neck and a part above the neck.

The wearable display system of the present embodiment comprises: headphones 210 that is to be mounted on a head H and has functions of generating sound such as voice, music, sound effects and the like; and a wearable display unit 220 that has a function of displaying an image for a user U. Further, the wearable display unit 220 is connected with a cable 230. The cable 230 supplies electric power and sound/image signals from a power supply unit (not shown) and a sound/image signal generation unit (not shown) to the wearable display system.

The headphones 210 comprise: a right speaker 211a; a left speaker 211b; a right earpiece 212a; a left earpiece 212b; and a headphone arm 213 that connects the right and left speakers 211a and 211b.

The right speaker 211a and the left speaker 211b have a sound output function, and a sound signal from the cable 230 is supplied to these speakers 211a and 211b.

The right earpiece 212a is connected to the right speaker 211a and assists the right speaker 211a to be mounted on and in close contact with the head H. Further, the left earpiece 212b is connected to the left speaker 211b and assists the left speaker 211b to be mounted on and in close contact with the head H.

The headphone arm 213 holds the head H of the user U inside the headphone arm 213 by its elastic force and connects the right speaker 211a and the left speaker 211b with each other.

The wearable display unit 220 comprises: a image display unit 222; a holding part 221 that can hold the image display unit 222 in front of an eye of the user U; an attachment 227 that connects the holding part 221 and the headphone arm 213; an auxiliary holding part 240 provided to the holding part 221; a head pressing detection sensor 250 provided in the auxiliary holding part 240.

The auxiliary holding part 240 is provided to the holding part 221 at a position where the auxiliary holding part 240 does not enter the field of vision of the user U in a state that the center of the field of vision of the user U coincides with the center of an image on the image display unit 222.

The image display unit 222 reproduces and displays the image signal sent through the cable 230. The known techniques can be used for reproduction and display of the image signal.

The holding part 221 comprises: a connection part 223; a display support member 224; and a display support member housing part 225.

The connection part 223 connects the image display unit 222 and the display support member 224. The connection part 223 may use a ball joint so that the direction of displaying an image on the image display unit 222 can be changed continuously centering on the connection part 223.

Figure 42:
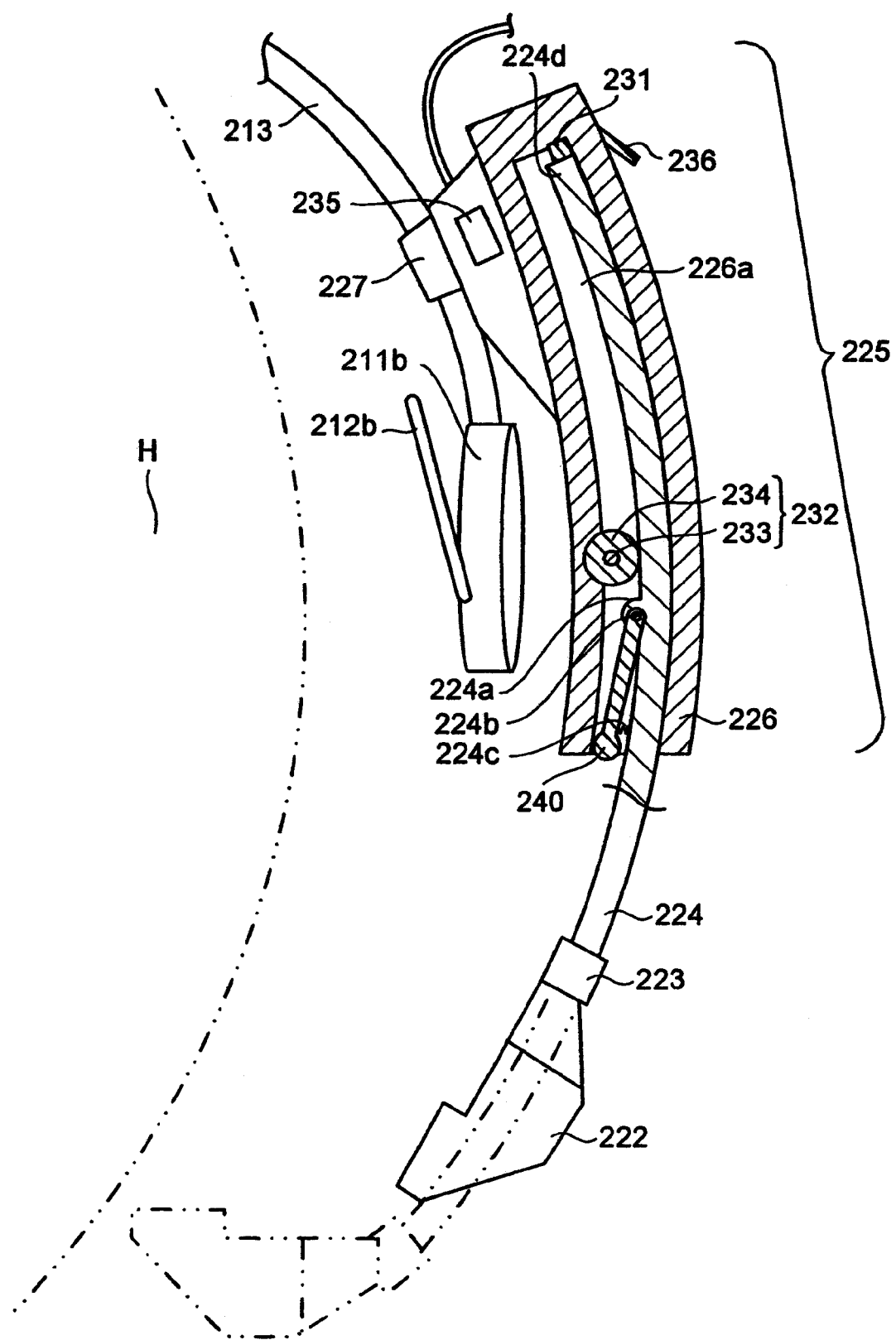
FIG. 42 is a cutaway plan view showing main parts of the wearable display system of the seventh embodiment.

One end of the display support member 224 is connected to the image display unit 222 through the connection part 223. The other end of the display support member 224 is slidably held by the display support member housing part 225. Further, as shown in FIG. 42, the display support member 224 is provided with a holding member 224a, a pin 224b and a spring fixing member 224c in the surface that faces the head H. FIG. 42 is a cross section showing main parts of the wearable display system.

The display support member 224 is a pipe-shaped arm and draws a curve running along a curve extending from the temporal part of the head H to the face part. The display support member 224 has strength that bears the weight of the image display unit 222 and the connection part 223.

The display support member housing part 225 houses at least a part of the display support member 224 as well as at least a part of the auxiliary holding part 240 in its inside.

In the present embodiment, when the image display unit 222 is retracted from the front of an eye of the user U and at least a part of the display support member is housed in the display support member housing part 225 as shown in FIG. 42, it is said that the display support member 224 is in a housed position. Further, when the display support member 224 supports the image display unit 222 in front of a user's eye (FIG. 41), it is said that the display support member 224 is in a projecting position.

The display support member housing part 225 comprises: a display support member housing 226; a display support member position detection sensor 231; a holding part driving unit 232; a control unit 235; and a mode selection switch 236.

A housing space 226a inside the display support member housing 226 has sufficient size for housing the display support member 224 and the auxiliary holding part 240 positioned along the display support member 224. Further, the housing space 226a has depth for housing at least a part of the display support member 224.

The display support member position detection sensor 231 is a pressure sensor. Instead of this sensor 231, the sensors of the first embodiment may be used. A fixing location of the display support member position detection sensor 231 is the innermost portion of the housing space 226a. In the present embodiment, when the display support member 224 is positioned at the housed position, one end 224d of the display support member 224 at which the image display unit 222 is not fixed presses the innermost portion of the housing space 226. As a result, the display support member position detection sensor 231 detects the pressure from the display support member 224, and thus detects that the display support member 224 is at the housed position.

The holding part driving unit 232 comprises: a display support member driving motor (not shown); a power line (not shown) and a control line (not shown) connected to the display support member driving motor; a motor shaft 233; and a driving roller 234 fixed to the motor shaft 233. An outer periphery of the driving roller 234 is in contact with an inner side surface of the curved display support member 224. The driving roller 234 can move the display support member 224 slidingly by the turning force given from the electric motor to the motor shaft 233.

As shown in FIG. 42, the mode selection switch 236 is partly projecting outside the display support member housing 226, and thus it is possible to operate the mode selection switch 236 while using the display support member housing 226. The mode selection switch 236 switches between three modes, i.e. a manual mode in which sliding operation of the display support member 224 is carried out manually, an electric operation mode in which the holding part driving unit 232 is activated electrically, and an off mode in which the switch is turned off. In the cases of the electric operation mode and the manual mode, a stopper for stopping rotation of the driving roller 234 is released.

Figure 43:
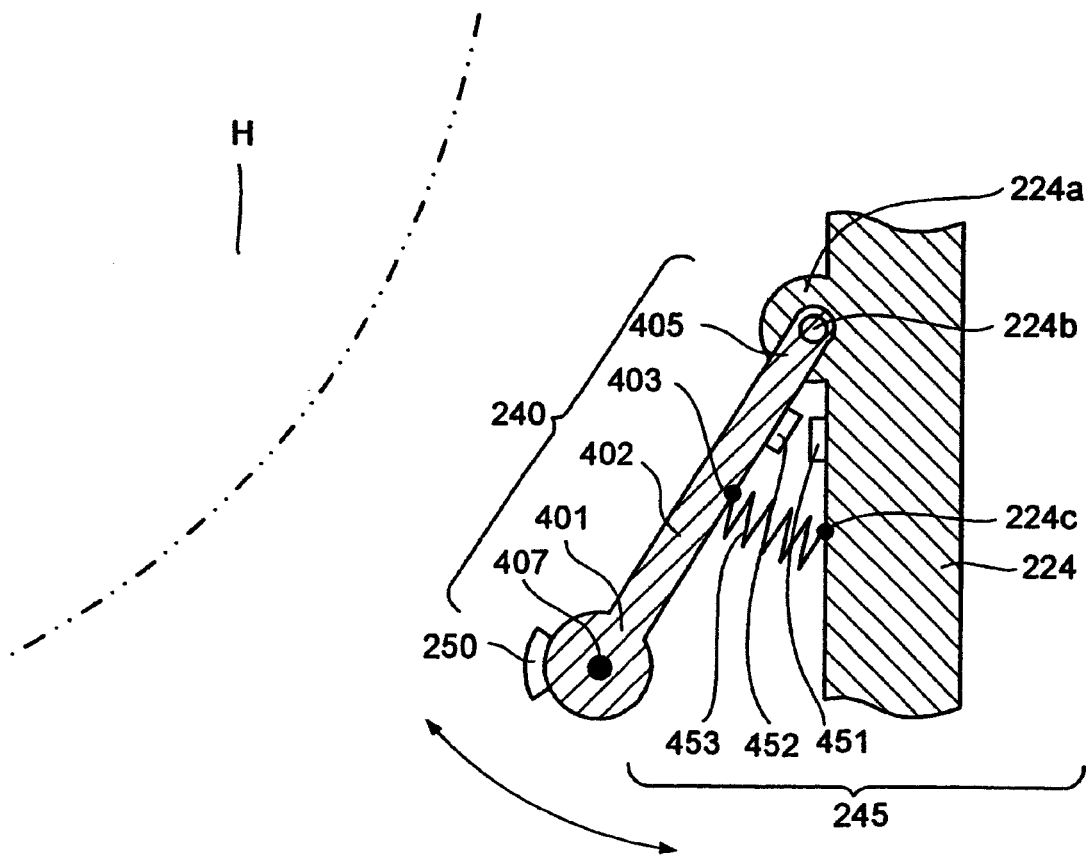
FIG. 43 is an explanatory view for explaining a driving mechanism of an auxiliary holding part of the wearable display system of the seventh embodiment.

FIG. 43 is a cross section showing a part of the display support member 224, the auxiliary holding part 240 and the head pressing detection sensor 250.

The auxiliary holding part 240 comprises: a pressing member 401 that presses the head H at a pressure larger than a certain value; a shaft member 402; a spring fixing member 403; and a mounting member 405 for mounting the shaft member 402 to the display support member 224. The pressing member 401 is provided with the head pressing detection sensor 250. Further, a movement sensor 407 for detecting a change in movement of the head H is provided within the pressing member 401.

The pressing member 401 has a spherical shape and is connected to the shaft member 402. Further, the pressing member 401 presses the head H.

The shaft member 402 is swingably mounted to the display support member 224 by means of the holding member 224a and the pin 224b through the mounting member 405.

A pressing force generation unit 245 generates a pressing force of the auxiliary holding part 240, and comprises electromagnets 451 and 452 and a spring 453. The electromagnet 452 is fixed to the shaft member 402, and the electromagnet 451 is fixed to the display support member 224 to face the electromagnet 452. The electromagnets 451 and 452 are supplied with electric power from the display support member housing part 225 through power lines not shown. Further, directions and strengths of electric currents to the electromagnets 451 and 452 can be controlled by the control unit 235 (FIG. 44: described below) in the display support member housing part 225. Thus, it is possible to control electromagnetic forces such that the electromagnets 451 and 452 attract or repel each other.

One end of the spring 453 is fixed to the spring fixing member 224c on the display support member 224. The other end of the spring 453 is fixed to the spring fixing member 403 on the shaft member 402. When the pressing member 401 swings in the direction of moving toward the display support member 224 (i.e. the direction of the arrow B) around the pin 224b as the rotation axis, the spring 453 exercise its elastic force in the direction of canceling the swinging (i.e. the direction of the arrow A).

The movement sensor 407 provided within the pressing member 401 comprises a gyro sensor. The movement sensor 407 detects a change in movement of the head H in a state that the pressing member 401 presses against the head H.

The head pressing detection sensor 250 is mounted on the surface of the pressing member 401 at a portion that presses against the head H.

Figure 44:
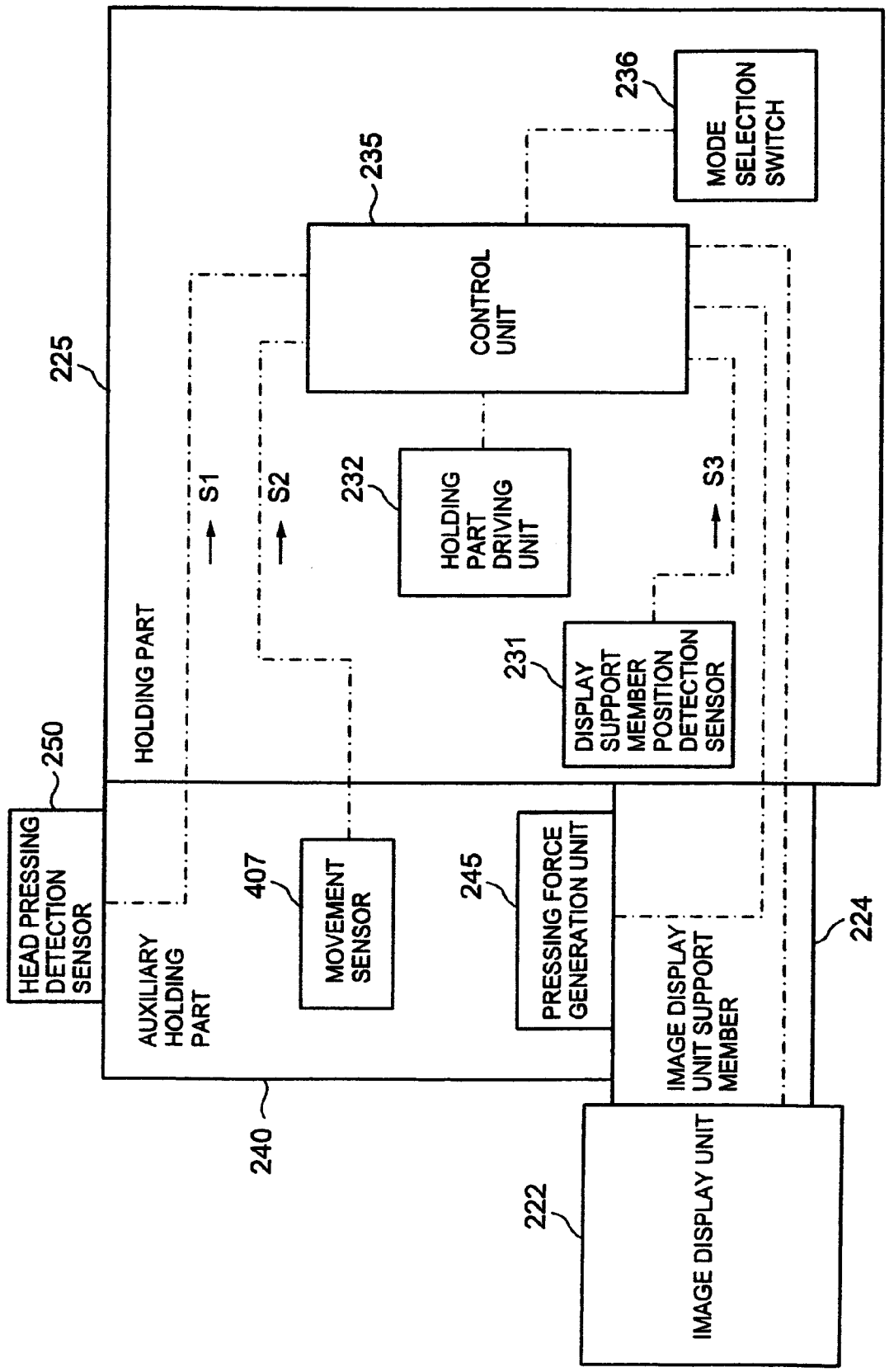
FIG. 44 is a circuit block diagram of the wearable display system having an image display unit of the seventh embodiment, the image display unit of which can be arranged near a user's eye.

Output of the movement sensor 407 and output of the head pressing detection sensor 250 are sent to the control unit 235 provided in the display support member housing part 225 through respective signal lines (FIG. 44).

In the present embodiment, when the pressing member 401 of the auxiliary holding part 240 is at a position where the pressing member 401 can press against the head H, that position is referred to as a pressing position of the auxiliary holding part 240. Further, when the pressing member 401 of the auxiliary holding part 240 is at a position where the pressing member 401 can not press against the head H, that position is referred to as a retracted position of the auxiliary holding part 240. The auxiliary holding part 240 is provided in such a manner that the auxiliary holding part 240 can swing between the pressing position and the retracted position.

FIG. 44 is a circuit block diagram relating to driving/control of the wearable display system.

The control unit 235 is connected with the display support member position detection sensor 231, the holding part driving unit 232 and the mode selection switch 236 provided in the display support member housing part 225, the movement sensor 407 and the pressing force generation unit 245 placed in the auxiliary holding part 240, the head pressing detection sensor 250, and the image display unit 222, through respective signal lines. The control unit 235 sends and receives signals through those signal lines. Further, based on the output S1 of the head pressing detection sensor 250, the control unit 235 controls the pressing force generation unit 245 such that the pressing level stays within a predetermined range. Further, based on the output S3 of the display support member position detection sensor 231, the control unit 235 controls the display support member driving motor of the holding part driving unit 232 such that the display support member 224 is positioned at the projecting position or the housed position.

Control and operation from the start of using the wearable display system and to the end of using will be described in order. In the following description, control signals between blocks will not be mentioned and only data from each sensor will be mentioned.

(1) The user U mounts the wearable display system of the present embodiment on his head H.

(2) The user U selects either the electric operation mode or the manual mode, using the mode selection switch 236.

When the electric operation mode is selected, (3) the control unit 235 controls the holding part driving unit 232 to drive the display support member 224 from the housed position to the projecting position. As a result, the image display unit 222 is held in front of an eye.

When the manual mode is selected, (4) the control unit 235 releases the stopper for the display support member 224. Here, the stopper is provided in the holding part driving unit 232. (5) Then, the user manually pulls the display support member 224 from the housed position to the projecting position.

Parallel with the above step (3) or the steps (4) and (5), the following steps (6)-(7) are performed (6) The display support member position detection sensor 231 detects that the end 224d of the display support member 224 leaves the innermost portion of the display support member housing part 225, and sends a display support member position detection signal S3 to the control unit 235. (7) The control unit 235 receives the display support member position detection signal S3 and controls the pressing force generation unit 245 to displace the auxiliary holding part 240 from the retracted position to the pressing position.

Further, the following control/operation is performed.

(8) The control unit 235 activates the head pressing detection sensor 250. (9) The control unit 235 activates the movement sensor 407. (10) The pressing member 401 of the auxiliary holding part 240 presses against the temporal part of the head H. (11) The head pressing detection sensor 250 detects the pressing level, and sends a head pressing detection signal S1 to the control unit 235. (12) The control unit 235 receives the head pressing detection signal S1. When the pressing level is in the predetermined range, the control unit 235 makes the image display unit 222 display an image. (13) Further, the control unit 235 controls the pressing force generation unit 245 such that the level of the pressing force is maintained within the predetermined range. In detail, the control unit 235 controls electric currents to the pressing force generation unit 245 to adjust the electromagnetic forces of the electromagnets 451 and 452.

When the user intends to end viewing of the image, operation/control of the wearable display system becomes as follows.

(14) When the user U returns the mode selection switch to the position of the off mode, the control unit 235 makes the image display unit 222 stop displaying the image. (15) The control unit 235 drives the pressing force generation unit 245 so that the auxiliary holding part 240 moves from the pressing position to the retracted position. (16) In the case where the user U has used the electric operation mode, the control unit 235 drives the holding part driving unit 232 so that the display support member 224 moves from the projecting position to the housed position. In the case where the user U has used the manual mode, the user U manually moves the display support member 224 into the display support member housing part 225. At that time, also the auxiliary holding part 240 is housed in the display support member housing part 240.

It is possible to consider that the control unit 235 uses a movement detection signal S2 of the movement sensor 407 to control the pressing force generation unit 245. For example, based on the movement detection signal S2 from the movement sensor 407, the control unit 235 calculates a change in movement of the head H. Then, according to the calculated change, the control unit 235 may control the pressing force generation unit 245 such that the pressing level of the pressing member 402 remains within the predetermined range. Further, switching between the retracted position and the pressing position of the auxiliary holding part 240 may be carried out manually. In that case, the manual operation is carried out in a state that the mode selection switch 236 is at the manual mode. Further, in the pressing force generation unit 245, one of the electromagnets 451 and 452 may be a magnetic body such as iron. To put the auxiliary holding part 240 at the pressing position, the electromagnetic force may be turned off and only the elastic force of the spring 453 may be used. To put the auxiliary holding part 240 at the retracted position, it is sufficient to control the electromagnetic forces of the electromagnet such that the electromagnetic force larger than the elastic force attracts the magnetic body. Further, a lock mechanism may be provided for keeping the retracted position.

As shown in FIG. 41, in the wearable display unit 220 of the present embodiment, the auxiliary holding part 240 is provided to the display support member 224 on the side of the display support member housing part 225 at the position where the auxiliary holding part 240 exists outside the field of vision of the user U when the user U views the image on the image display unit 222. Thus, the auxiliary holding part 240 rarely interrupts the field of vision of the user U to an uncomfortable degree. Thus, the wearable display system of the present embodiment does not spoil visibility of surroundings.

The auxiliary holding part 240, the pressing force generation unit 245 and structure of members required for operations and the like of these components of the present embodiment may be employed in the first through sixth and eighth through eleventh embodiments.

[Eighth Embodiment]

Figure 45:
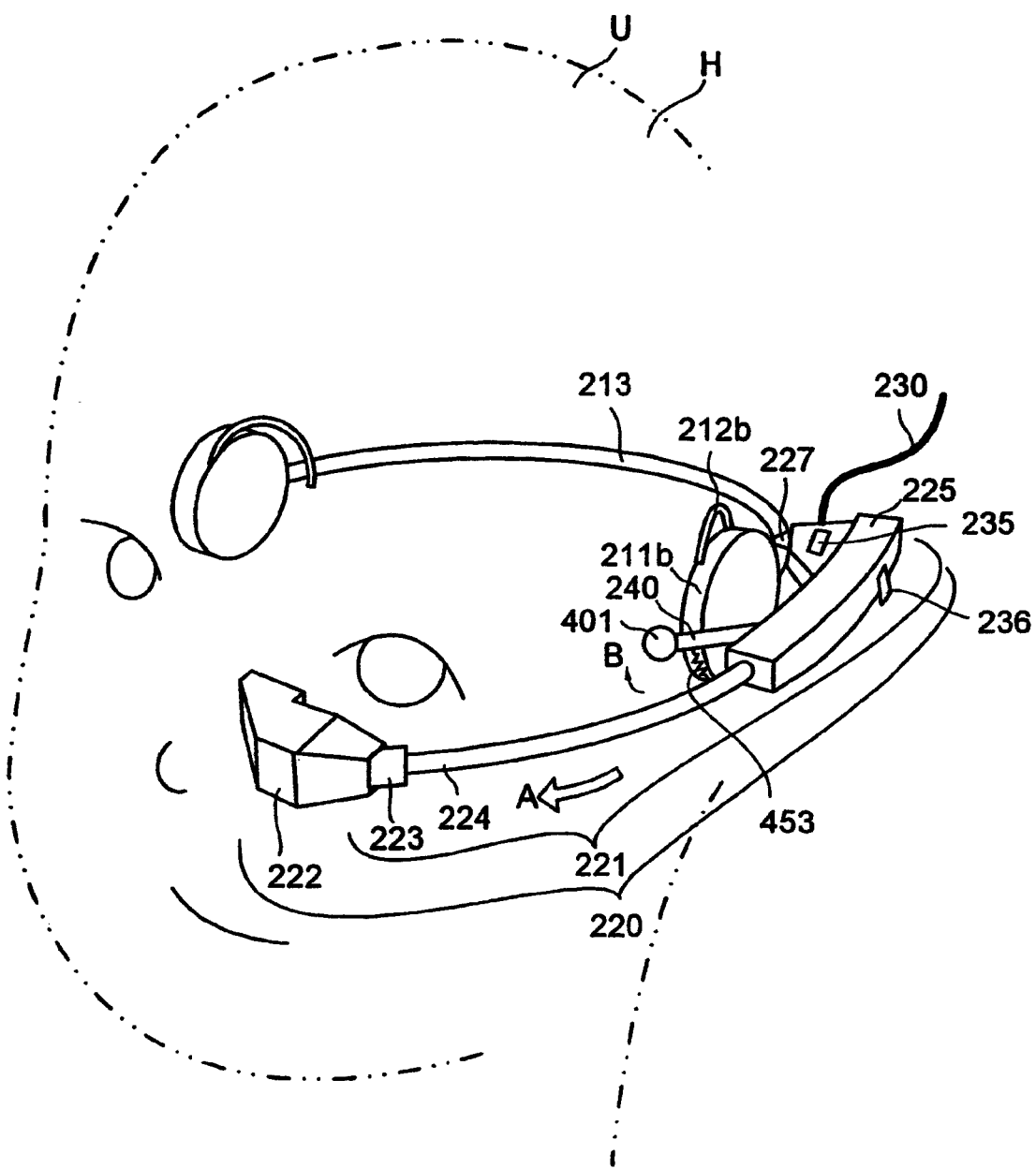
FIG. 45 is a perspective view showing a wearable display system having an image display unit (in a state of a projecting position) of an eighth embodiment, the image display unit of which can be arranged near a user's eye.
Figure 46:
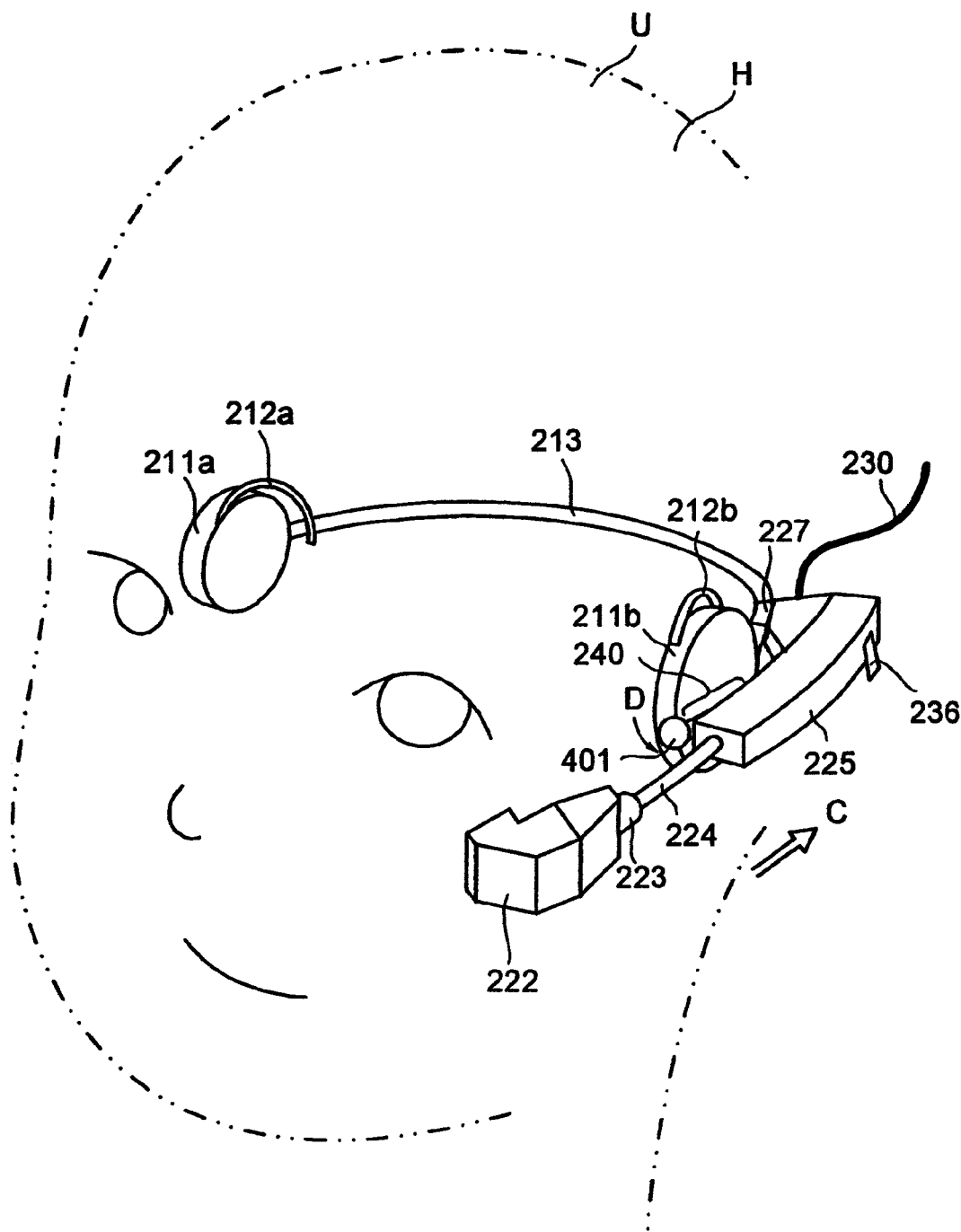
FIG. 46 is a perspective view showing the wearable display system (in a state of a housed position) of the eighth embodiment.

Referring to FIGS. 45 and 46, will be described a wearable display system of which the image display unit can be arranged near a user's eye according to the eighth embodiment.

As shown in FIG. 45, in the present embodiment, an auxiliary holding part 240 similar to the one of the seventh embodiment is provided not on the display support member 224 but on the display support member housing part 225. Accordingly, the holding member 224a, the pint 224b and the spring fixing member 224c are provided not on the display support member 224 but on the display support member housing part 225. Further, the electromagnet 451 of the pressing force generation unit 245 is placed on the display support member housing part 225. Also, one end of the spring 453 is fixed to the display support member housing part 225. The other structures are common to the seventh embodiment. Thus, the same reference numbers are given to the common components. Further, repeated description with respect to the common components and their operation and control will be omitted. FIG. 45 shows a state that the display support member 224 is in the projecting position and the auxiliary holding part 240 provided swingably on the display support member housing part 225 is in the pressing position where the auxiliary holding part 240 presses against the temporal part.

To mount the wearable display system, the following operation will be carried out. (1) Depending on the mode selected by the user U using the mode selection switch 236, the display support member 224 is driven to the projecting position manually or by the holding part driving unit 232 (the arrow A). (2) In that process, the pressing force generation unit 245 operates according to control similar to the control in the seventh embodiment. (3) The auxiliary holding part 240 is positioned at the pressing position where the pressing member 401 presses against the temporal part of the head H (the arrow B).

FIG. 46 is a perspective view showing the external appearance of the wearable display system of the present embodiment in a state that the display support member 224 is at the housed position. The auxiliary holding part 240 provided on the display support member housing part 225 is at the retracted position.

To dismount the wearable display system, the following operation will be carried out. (1) Depending on the mode selected by the user U using the mode selection switch 236, the display support member 224 is housed to the housed position manually or by the holding part driving unit 232 (the arrow C). (2) In the process of housing the display support member 224, the pressing force generation unit 245 operates according to control similar to the control in the seventh embodiment. (3) The auxiliary holding part 240 is positioned at the retracted position (the arrow D).

In the present embodiment, the auxiliary holding part 240 presses against the temporal part of the head H. However, it may be arrange such that the auxiliary holding part 240 presses against the left speaker 211*b*. Further, similarly to the first embodiment, a change in movement of the head H may be detected by the movement sensor 407. Then, pressing by the auxiliary holding part 240 may be controlled depending on the change in movement of the head H. Further, similarly to the seventh embodiment, switching between the retracted position and the pressing position of the auxiliary holding part 240 may be carried out manually. In that case, this operation may be carried out under the manual mode selected by the mode selection switch 236.

According to the eighth embodiment, the auxiliary holding part 240 provided on the display support member housing part 225 presses against the temporal part of the head. As a result, the auxiliary holding part 240 is positioned outside the field of vision of the user U, and the auxiliary holding part 240 scarcely enters the field of vision of the user U viewing the image. Thus, the wearable display unit 220 of the present embodiment can suppress movement of the image display unit 222 and improves visibility of surroundings.

[Ninth Embodiment]

A wearable display system, the image display unit of which can be arranged near a user's eye, of a ninth embodiment will be described referring to FIGS. 47 and 48.

Figure 47:
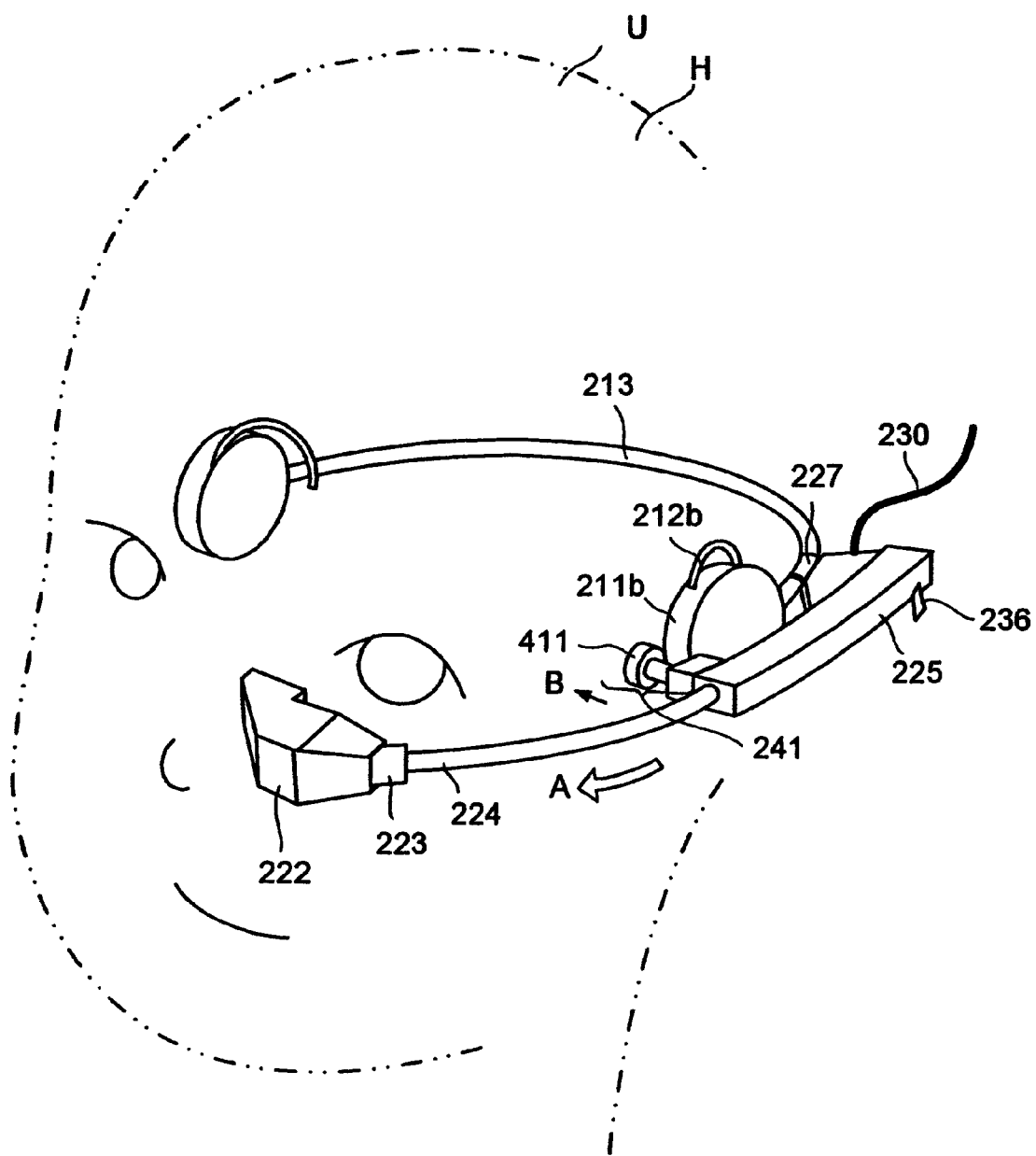
FIG. 47 is a perspective view showing a wearable display system having an image display unit (in a state of a projecting position) of a ninth embodiment, the image display unit of which can be arranged near a user's eye.

As shown in FIG. 47, in the present embodiment, an auxiliary holding part 241 having a new mechanism is provided on the display support member housing part 225. Further, the auxiliary holding part 241 is in a pressing position where the auxiliary holding part 241 can press, before mounting the wearable display system on the head. The other features of the present embodiment are common to the second embodiment. Accordingly, the same reference numbers are given to the common components. Further, repeated description with respect to the common components and their operation will be omitted. FIG. 47 shows a state that the display support member 224 is at the projecting position and the auxiliary holding part 241 provided on the display support member housing part 225 is at the pressing position.

Figure 48:
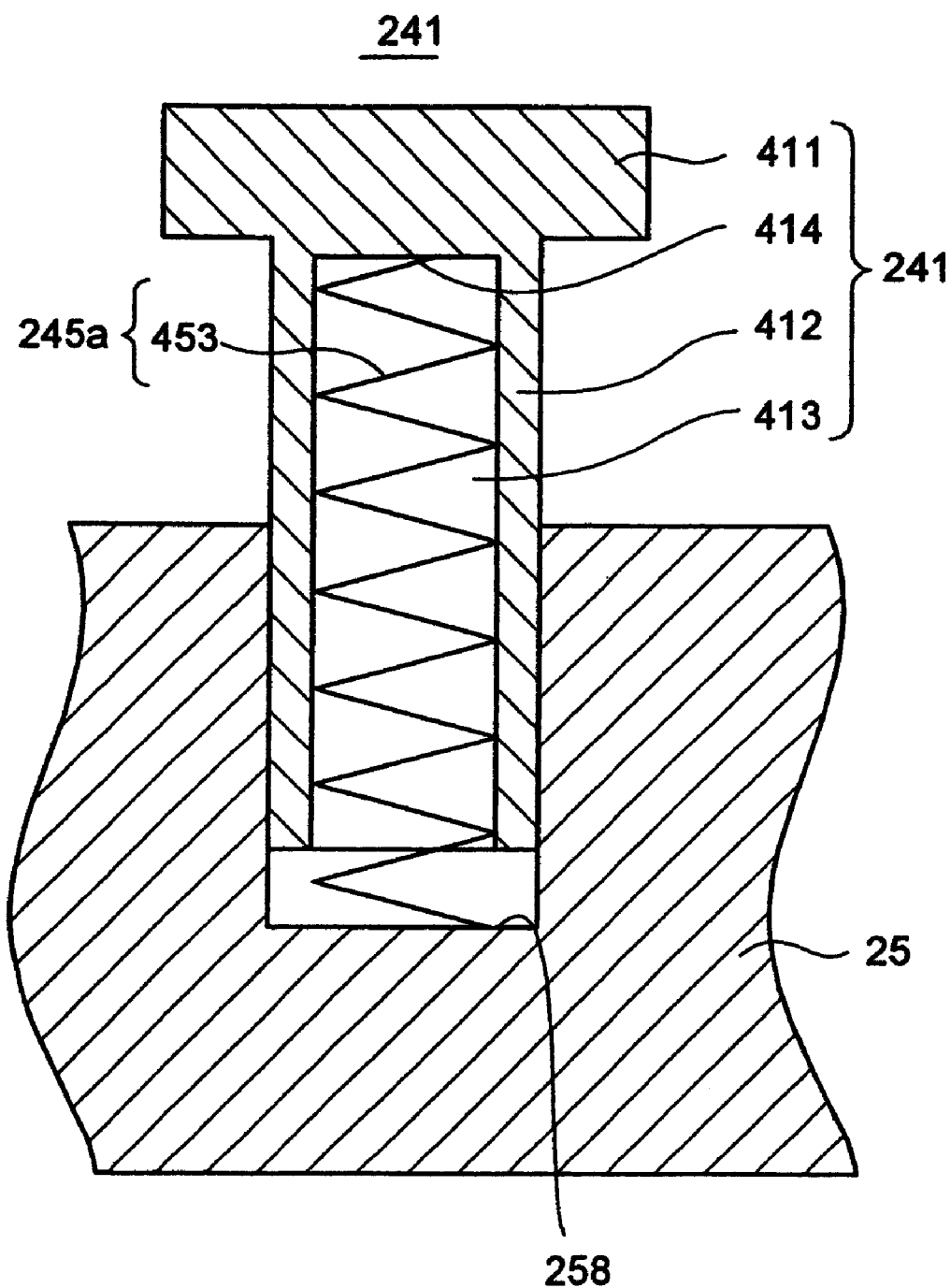
FIG. 48 is a perspective view showing an auxiliary holding part of the wearable display system of the ninth embodiment.

FIG. 48 is a cross section showing the auxiliary holding part 241 at the pressing position and a part of the display support member housing part 225.

The auxiliary holding part 241 comprises: a disk-shaped pressing member 411; and a cylinder 412 that is connected to the pressing member 411 at one end and has a cylinder-shaped hollow portion 413. Further, an open end of the cylinder 412 is slidably inserted into a hole that is provided in the display support member housing part 225 and has a diameter nearly same as the diameter of the cylinder 412. Further, the auxiliary holding part 241 has a pressing force generation unit 245*a*.

The pressing force generation unit 245*a* has a spring 453. The spring 453 has a diameter nearly same as the diameter of the hollow portion 413. One end of the spring 453 is fixed to the spring fixing portion 414 of the auxiliary holding part 241. The other end of the spring 453 is fixed to a spring fixing portion 258 provided in the bottom of the hole of the display support member housing part 225.

Elastic force of the spring 453 applied to the spring fixing portion 414 of the auxiliary holding part 241 is adjusted such that the auxiliary holding part 241 can keep the pressing position irrespective of a posture of the wearable display system.

Operation/control of the wearable display system (FIG. 47) are almost similar to those of the eighth embodiment except that the auxiliary holding part 241 is at the pressing position already before mounting the wearable display system on the head. Namely, the user U mounts the wearable display system on his head H while his head H is pressing back the auxiliary holding part 241 positioned at the pressing position. Mounting operation after that is similar to the operation in the eighth embodiment except that the auxiliary holding part 241 is always at the pressing position where the auxiliary holding part 241 can press.

Here, it is possible to consider such an arrangement that an electromagnet is provided on the bottom of the hole (FIG. 48) in the display support member housing part 225 and a magnetic body such as iron is provided at a part of the pressing member 411. In this arrangement, to place the auxiliary holding part 241 at the retracted position, the electromagnetic force attracts the pressing member 411 to the electromagnet in the bottom of the hole against the elastic force of the spring 453. Further, at least a part of the auxiliary holding part 241 may be housed in the hole in the display support member housing part 225. Further, to place the auxiliary holding part 241 at the pressing position, it is sufficient to turn off the electromagnetic force of the electromagnet so that only the elastic force of the spring 453 makes the auxiliary holding part 241 project.

In the ninth embodiment, similarly to the eighth embodiment, the auxiliary holding part 241 provided on the display support member housing part 225 presses against the temporal part of the head. As a result, the auxiliary holding part 241 is positioned outside the field of vision of the user U, and the auxiliary holding part 241 scarcely enters the field of vision of the user U viewing the image. Thus, according to the wearable display unit of the present embodiment, it is possible to suppress movement of the image display unit 222 and to improve visibility of surroundings.

Figure 49:
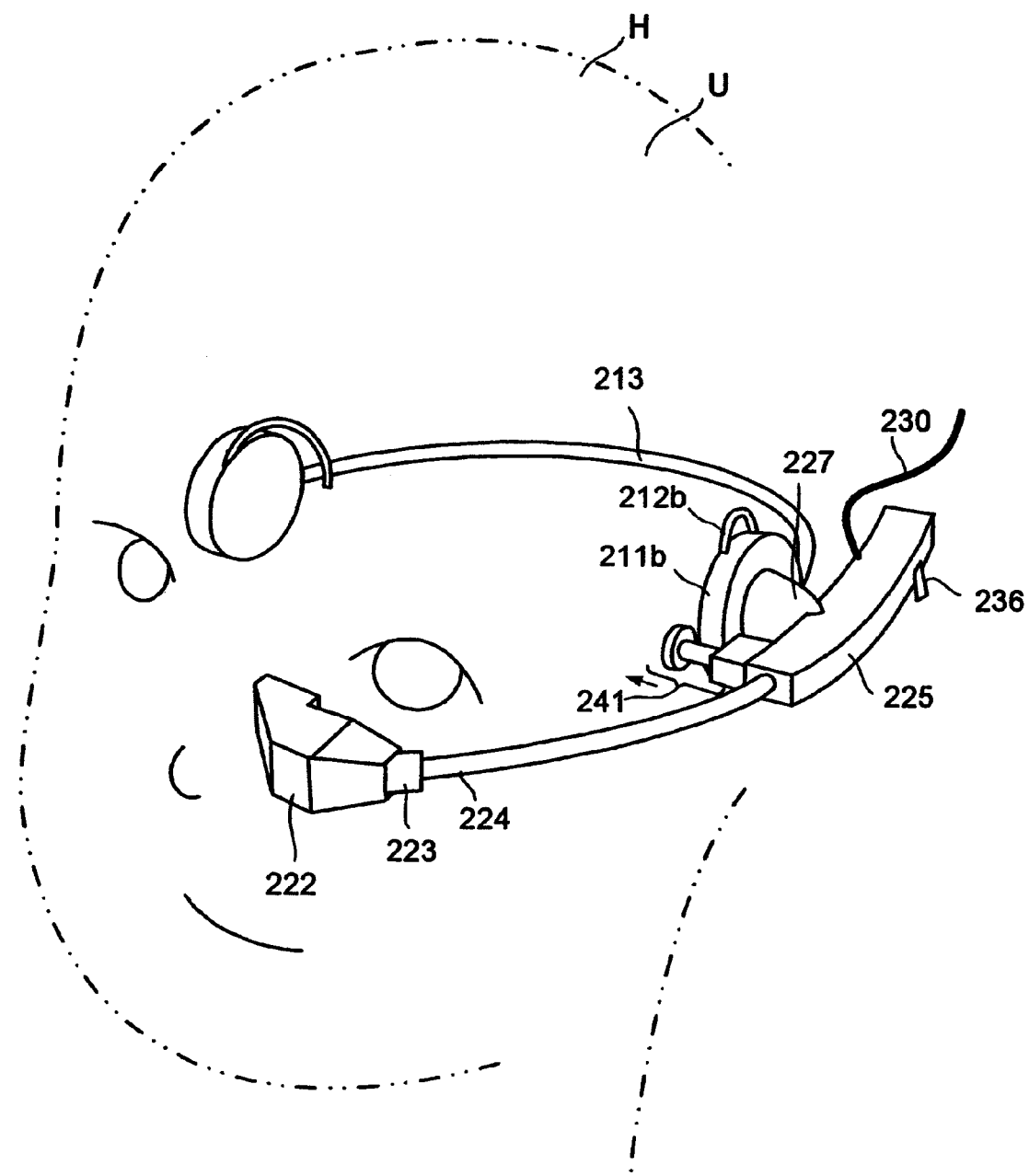
FIG. 49 is a perspective view showing a first variant of the wearable display system of the ninth embodiment.

FIG. 49 shows a first variant of the ninth embodiment. In this first variant, an attachment 227 connects the display support member housing part 225 not to the headphone arm 213 but to the left speaker 211*b*. The other components and their operations are similar to the ones in the ninth embodiment. Fixing structure of this attachment 227 to the speaker 211*b* may be the above-described structure shown in FIG. 39.

According to the first variant, the display support member housing part 225 is connected to the left speaker 211*b*, and thus the auxiliary holding part 241 scarcely enters the field of vision of the user U viewing the image. Thus, according to the wearable display unit of the present variant, it is possible to suppress movement of the image display unit 222 and to improve visibility of surroundings.

Figure 50:
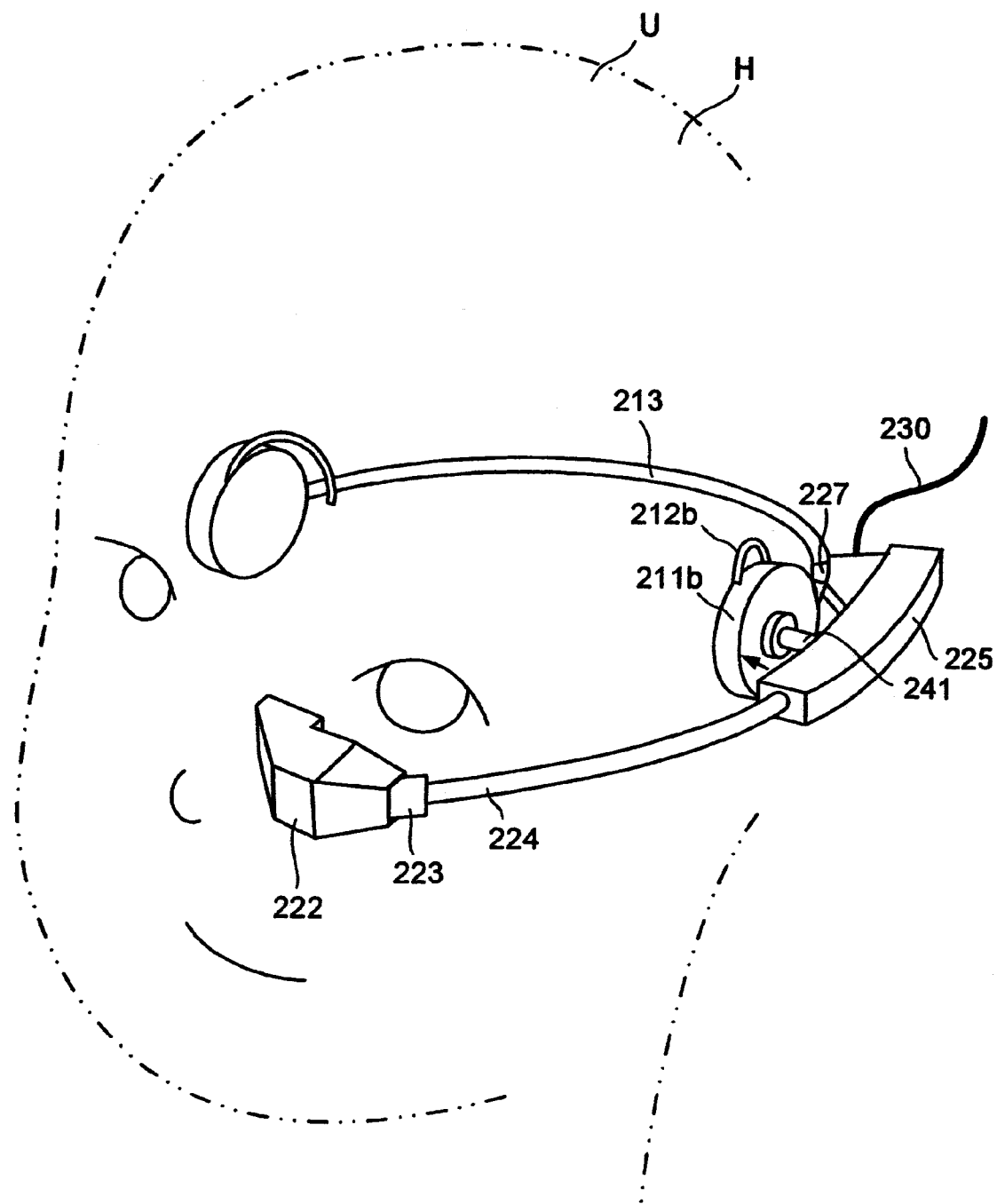
FIG. 50 is a perspective view showing a second variant of the wearable display system of the ninth embodiment.

FIG. 50 shows a second variant of the ninth embodiment. In this second variant, the auxiliary holding part 241 presses against not the head H but the left speaker 211*b*. The other components and their operations are similar to the one in the ninth embodiment.

According to the second variant, the auxiliary holding part 241 presses against the head H through the left speaker 211*b*. As a result, the auxiliary holding part 241 scarcely enters the field of vision of the user U viewing the image. Thus, according to the wearable display unit of the present variant, it is possible to movement of the image display unit 222 and to improve visibility of surroundings.

[Tenth Embodiment]

Figure 51:
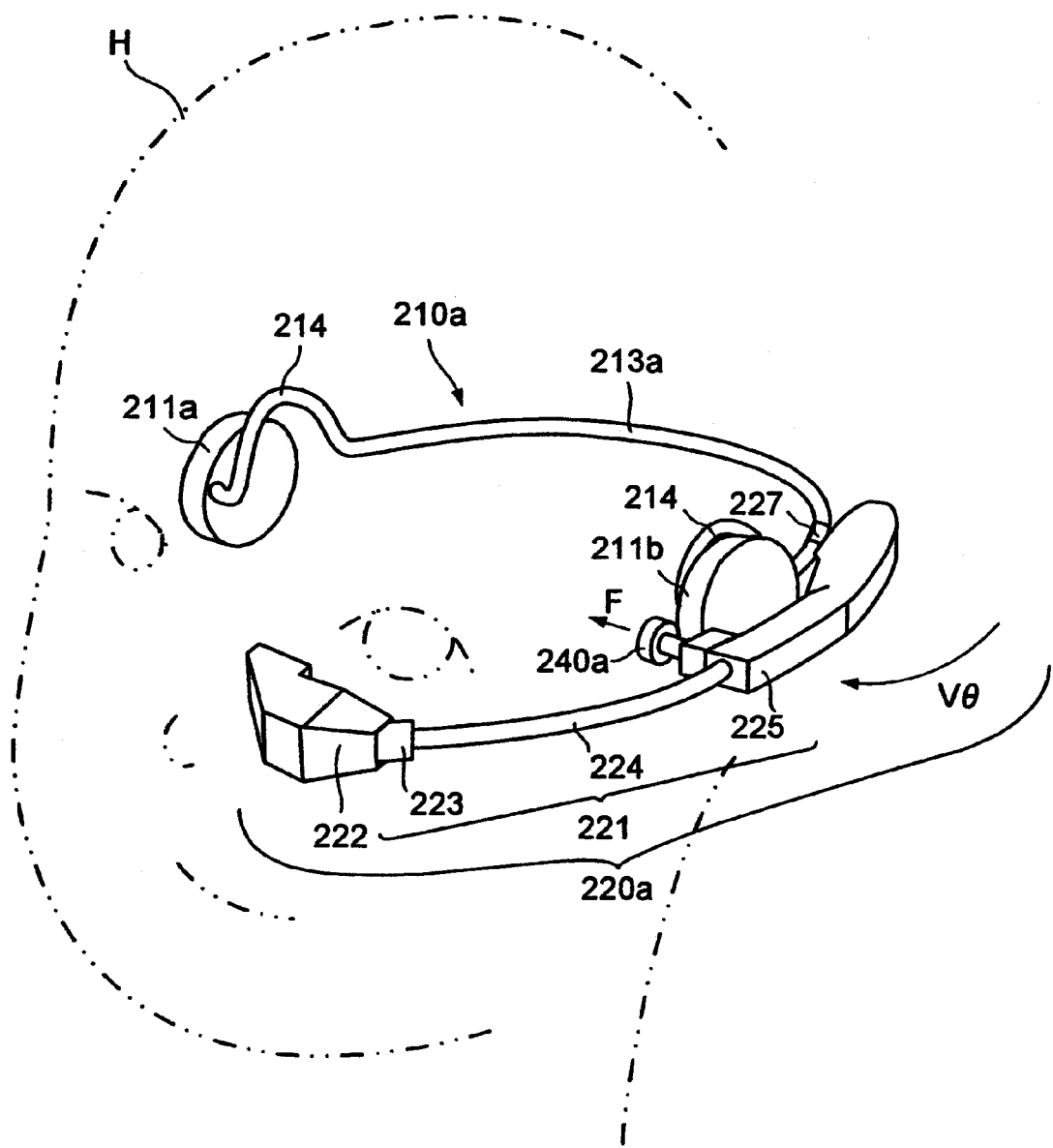
FIG. 51 is a perspective view showing a wearable display system having an image display unit of a tenth embodiment, the image display unit of which can be arranged near a user's eye.
Figure 52:
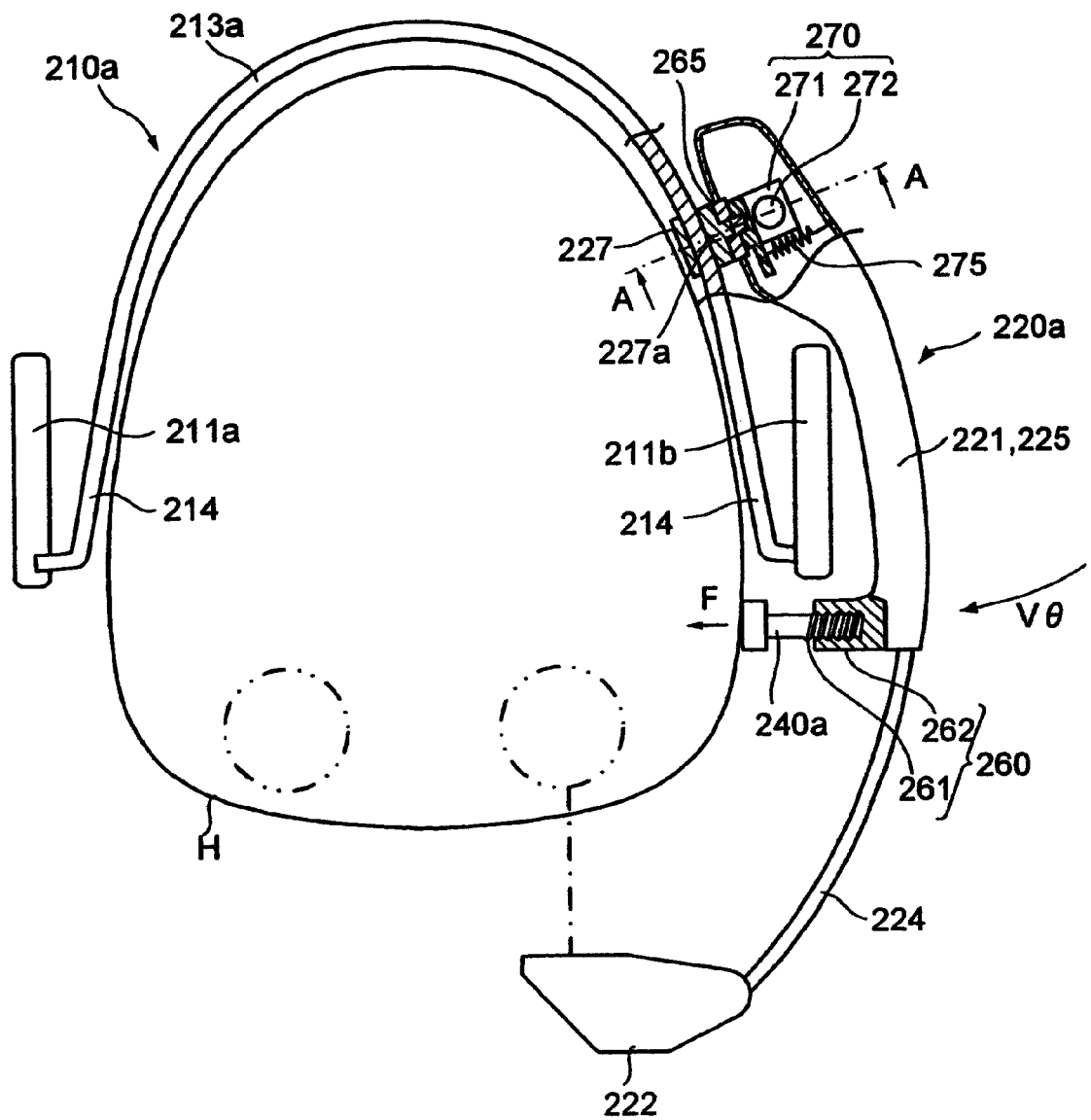
FIG. 52 is a cutaway plan view showing main parts of the wearable display system of the tenth embodiment.
Figure 53:
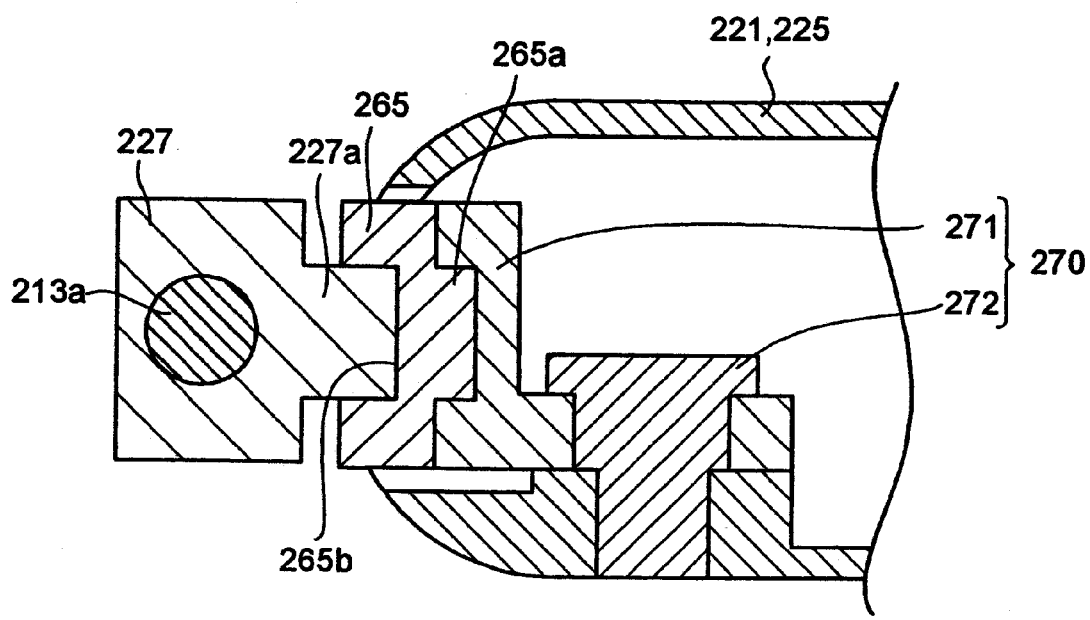
FIG. 53 is a cross section taken along the A-A line in FIG. 12.

A tenth embodiment of a wearable display system of which the image display unit can be arranged near a user's eye will be described referring to FIGS. 51-54. FIG. 51 is a perspective view showing the wearable display system of the present embodiment; FIG. 52 is a cutaway plan view showing main parts of the wearable display system; FIG. 53 is a cross section taken along the A-A line in FIG. 52.

As shown in FIG. 51, also the wearable display system of the present embodiment comprises: headphones 210a and a wearable display unit 220a similarly to the above-described embodiments.

The headphones 210a comprises: a right speaker 211a; a left speaker 211b; and a headphone arm 213a that connects the right speaker 211a and the left speaker 211b with each other. Differently from the above-described embodiments, the headphone arm 213a is curved in the respective neighborhoods of the speakers 211a and 211b, and these curved portions form earpieces 214.

Further, similarly to the above-described embodiments, the wearable display unit 220a comprises: an image display unit 222; a holding part 221; an attachment 227; and an auxiliary holding part 240a. As shown in FIG. 52, the wearable display unit 220a of the present embodiment further comprises: a projection length adjustment part 260 for adjusting the projection length of the auxiliary holding part 240a; a distance adjustment part 265 for adjusting the distance from the attachment 227 to the holding part 221; a joint 270 for fixing the holding part 221 swingably to the attachment 227; and a spring coil 275 as a pressing force generation means that generates a pressing force F at the auxiliary holding part 240a.

On the side of the image display unit 222 of the display support member housing part 225 of the holding part 221, is provided a fixing part for fixing the auxiliary holding part 240a. A shaft portion of the auxiliary holding part 240a of the present embodiment is formed with a male screw 261. The fixing part of the display support member housing part 225 is formed with a female screw 262 into which the male screw 261 of the auxiliary holding part 240a is screwed and coupled. The projection length adjustment part 260 comprises the male screw 261 formed in the shaft portion of the auxiliary holding part 240a and the female screw 262 formed in the fixing part of the display support member housing part 225. Thus, the auxiliary holding part 240a can change its projection length in relation to the display support member housing part 225 by rotating its shaft portion.

Figure 54:
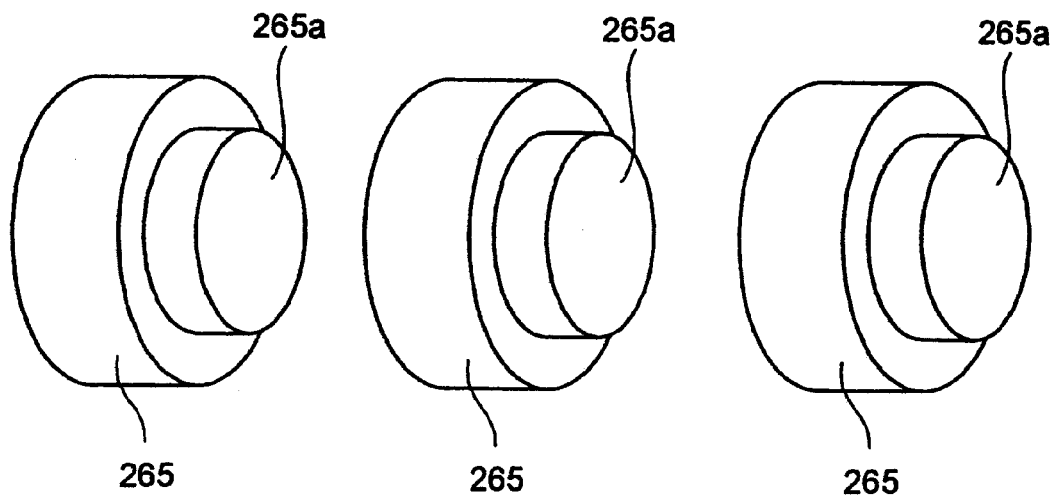
FIG. 54 is a perspective view showing a distance adjusting member of the wearable display system of the tenth embodiment.

As shown in FIGS. 52 and 53, the attachment 227 is formed with a projection 227a that projects toward the holding part 221. The distance adjustment part 265 comprises: a coupling recess 265b that is coupled with the projection 227a of the attachment 227; and a projection 265a that is similar in shape to the projection 227a of the attachment 227. As shown in FIG. 54, by determining whether the distance adjustment part 265 is used or not, or one or more distance adjustment parts 265 should be used, or in other words, by changing the number of the distance adjustment part 265 used in layers, it is possible to adjust the distance from the attachment 227 to the holding part 221 at a connection part connecting the attachment 227 and the holding part 221.

As shown in FIGS. 52 and 53, the joint 270 comprises: a bearing member 271 that is coupled with the projection 227a of the attachment or the projection 265a of the distance adjustment part 265; and a shaft member 272 that can be rotated in relation to the bearing member 271. One end of the shaft member 272 is rotatably received in the bearing member 271, and the other end is fixed to the display support member housing part 225. Further, the shaft member 272 is arranged to become almost parallel with the vertical direction when the wearable display system of the present embodiment is mounted on the head H. As a result, owing to this joint 270, the holding part 221 can swing in the direction of Vθ with respect to the attachment 227 within a horizontal plane in a state where the wearable display system of the present embodiment is mounted on the head H, or in other words within a plane that includes the attachment 227 and the direction of action of the pressing force F of the auxiliary holding part 240a.

As shown in FIG. 52, the spring coil 275 is placed on the side of the image display unit, in relation to the shaft member 272 of the joint 270. One end of the spring coil 275 is fixed to the bearing member 271 of the joint 270, and the other end is fixed to the inside wall surface on the outer side of the display support member housing part 225. The coil spring 275 is arranged in a stretched state, and thus biases the holding part 221 as well as the auxiliary holding part 240a provided on the holding part 221 toward the head H. As a result, owing to the spring 275, the auxiliary holding part 240a maintains the pressing force F of certain strength against the head H.

As described above, according to the present embodiment, it is possible to incline the holding part 221 within the plane that includes the direction of action of the pressing force F of the auxiliary holding part 240a, i.e. a horizontal plane at the time of using the wearable display unit, by changing the number of the distance adjustment parts 265 and/or by rotating the auxiliary holding part 240a. Thus, it is possible to adjust the position of the image display unit 222 in the horizontal direction in relation to the head H. In particular, by providing the projection length adjustment part 260, it is possible to make fine adjustment of the horizontal position of the image display unit 222 in relation to the head H, even when the wearable display unit is mounted on the head H and the pressing force F of the auxiliary holding part 240a is acting.

The present embodiment is provided with both the distance adjustment part 265 and the projection length adjustment part 260 in order to incline the holding part 221 within the plane including the direction of action of the pressing force F of the auxiliary holding part 240a. However, only one of these parts 265 and 260 may be used. Here, it is necessary to prepare the distance adjustment part(s) 265 in advance before using the wearable display unit. On the other hand, the projection length adjustment part 260 can change the inclination of the holding part 221 both before and in course of using the wearable display unit. Thus, in the case where one of these parts 265 and 260 is employed, it is favorable in the present embodiment to provide only the projection length adjustment part 260, i.e. one that can change the inclination of the holding part 221 even when the wearable display unit is in use.

Further, the projection length adjustment part 260 of the present embodiment employs the screw mechanism to adjust the projection length of the auxiliary holding part 240a. However, for example a cam mechanism or a mechanism using an electromagnet may be employed as far as the projection length of the auxiliary holding part 240 can be adjusted. Further, the present embodiment employs the coil spring 275 as a pressing force generation means. Of course, instead of the coil spring 275, another elastic member, an electromagnet, or the like may be used. Further, the present embodiment employs the distance adjustment part 265 as a distance adjustment means. Instead, a screw mechanism may be employed similarly to the case of the projection length adjustment part.

As described above, according to the seventh through tenth embodiments, it is possible to provide a wearable display unit that has improved visibility of surroundings. In particular, by providing the auxiliary holding part on the holding part, it is possible to improve the wearable display unit in its visibility of surroundings, since the auxiliary holding part scarcely enters the field of vision of the user.

In the seventh through tenth embodiments, the wearable display unit is fixed to the left side of the headphones. However, the wearable display unit may be fixed either left or right side of the head, and it may be arranged that the control unit can suitably switch the display image.

Further, it is not necessary to provide the power source in the outside. For example, a battery may be provided in the display support member housing part. Further, it may be arranged that sound/picture signals are received wirelessly.

[Eleventh Embodiment]

An eleventh embodiment of a wearable display system of which the image display unit can be arranged near a user's eye will be described referring to FIGS. 55-58.

Figure 55:
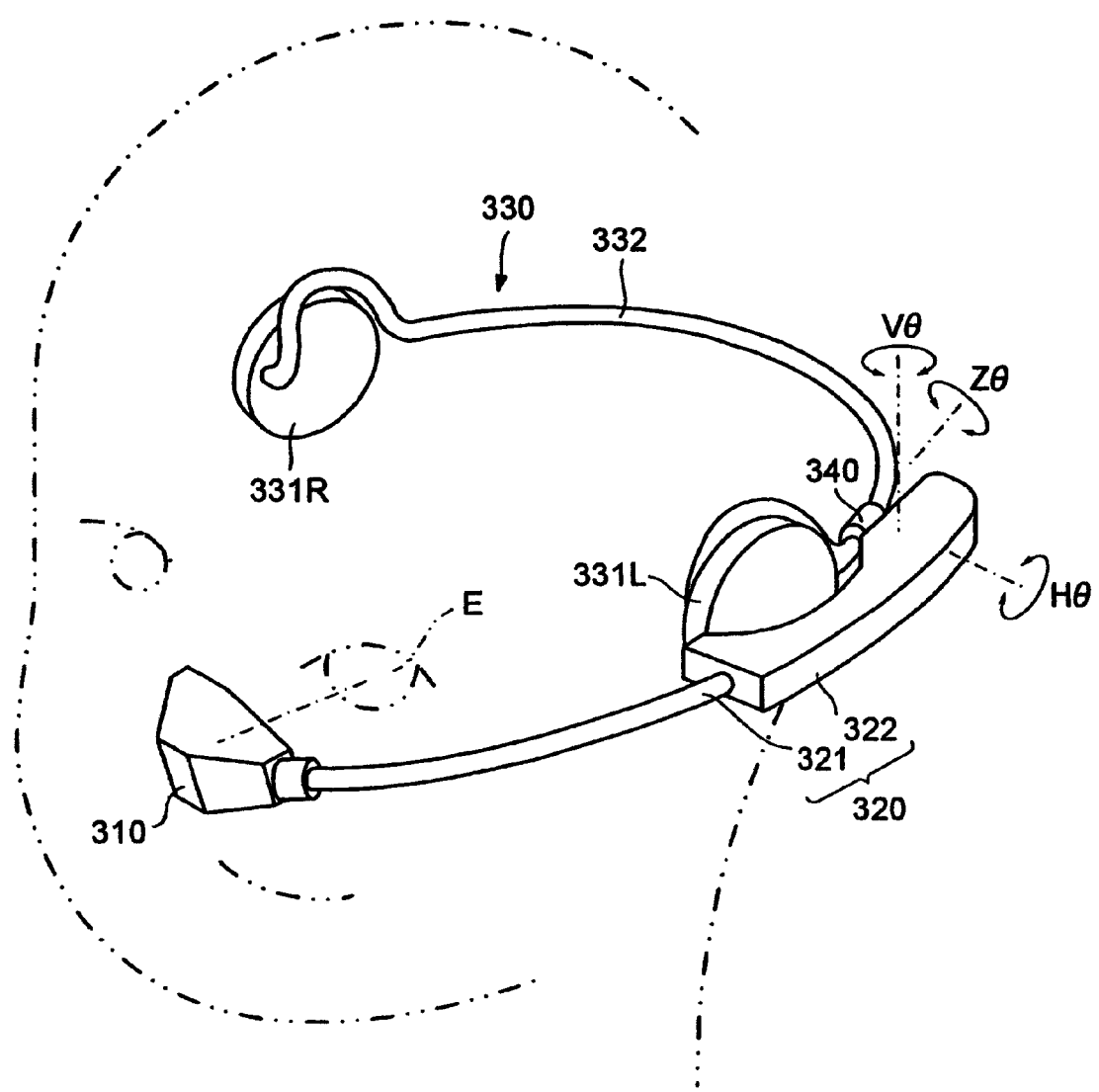
FIG. 55 is a perspective view showing a wearable display unit having an image display unit of an eleventh embodiment, the image display unit of which can be arranged near a user's eye.
Figure 56:
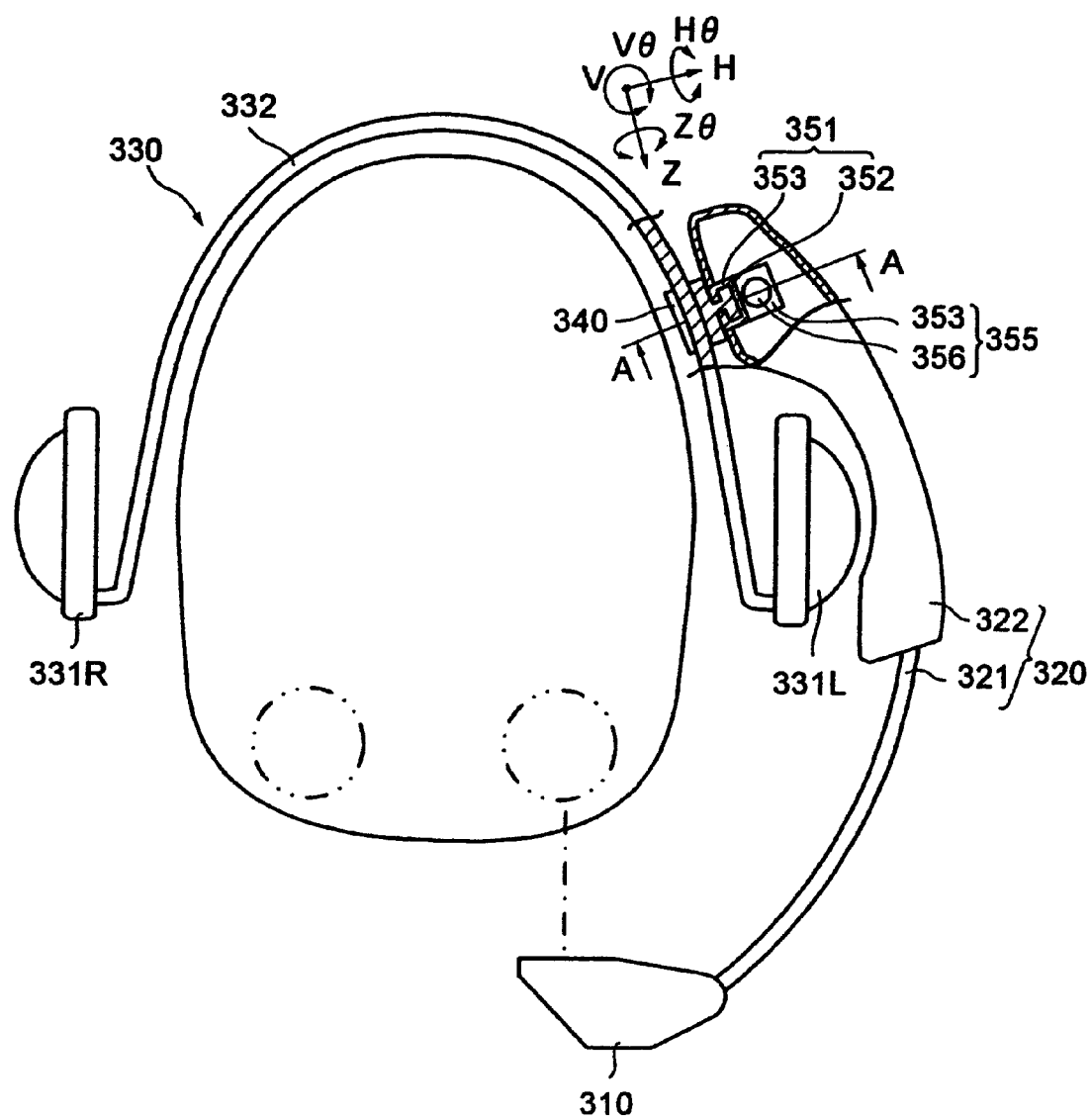
FIG. 56 is a cutaway plan view showing main parts of the wearable display unit of the eleventh embodiment.

FIG. 55 is a perspective view showing a state that the wearable display unit of the present embodiment is mounted on the head; and FIG. 56 is a cutaway plan view showing main parts of the wearable display unit in the mounted state.

The wearable display unit of the present embodiment comprises: an image display unit 310 for displaying an image in front of a user's eye; a head mounting belt 330 that is mounted on a head of a user; an attachment 340 fixed to the head mounting belt 330; a holding part 320 whose one end is fixed to the image display unit 310 while the other end extends up to a position opposed to the attachment 340; and joint parts 351 and 355 for fixing the holding part 320 swingably to the attachment 340.

In the present embodiment, the head mounting belt 330 is headphones, and comprises: a pair of left and right speakers 331R and 331L; and a headphone arm 332 that connects the left and right speakers 331R and 331L with each other. Further, the holding part 320 comprises: a display support member 321 whose one end is fixed to the image display unit 310; and a display support member housing part 322 for housing the display support member 321. The display support member housing part 322 holds the display support member 321 such that the display support member 321 can be displaced between a housed state in which the display support member 321 is almost housed and a using state in which the image display unit 310 fixed at the end of the display support member 321 can be positioned in front of a user's eye.

Figure 57:
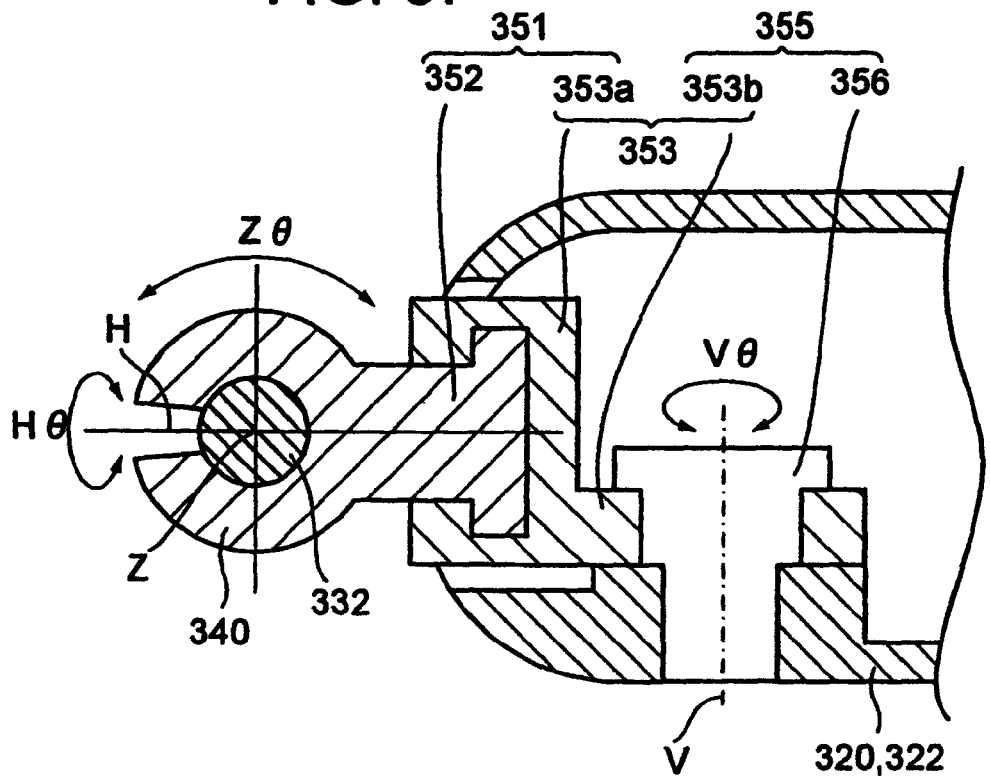
FIG. 57 is a cross section taken along the A-A line in FIG. 56.

FIG. 57 is a cross section taken along the A-A line in FIG. 56.

Similarly to the first embodiment, the attachment 340 is made of elastic material such as resin and is formed to have a C-shaped cross section to grasp the headphone arm 332.

Here, for the sake of convenience of description in the following, an axis in which the headphone arm 332 extends at the position where the attachment 340 is mounted is referred to as the Z-axis; an axis perpendicular to the Z-axis, extending in the direction from the attachment 340 toward the side where the display support member housing part 322 is provided, is referred to as the H-axis; and an axis perpendicular both to the Z-axis and H-axis is referred to as the V-axis. Further, the direction around the Z-axis is referred to as Zθ, the direction around the H-axis as Hθ, and the direction around the V-axis as Vθ.

As shown in FIGS. 56 and 57, the attachment 340 comprises: a first joint part 351 that indirectly supports the holding part 320 such that the holding part 320 can swing in relation to the attachment 340 in the Hθ direction; and a second joint part 355 that indirectly supports the holding part 320 such that the holding part 320 can swing in relation to the attachment 340 in the Vθ direction.

The first joint part 351 comprises: a shaft member 352 that extends from the attachment 340 in the direction parallel with the H-axis; a bearing member 353a that support the shaft member 352 in a relatively rotatable manner around the H-axis. Further, the second joint part 355 comprises: a shaft member 356 that extends in the direction parallel with the V-axis within the display support member housing part 322 of the holding part 320; and a bearing member 353b that supports the shaft member 356 in a relatively rotatable manner around the V-axis. The bearing member 353a of the first joint part 351 and the bearing member 353b of the second joint part 355 are the same bearing member 353. The torque required for the bearing member 353a to rotate around the H-axis relatively to the shaft member 352 of the first joint part 351 is larger than the torque required for the bearing member 353b to rotate around the V-axis relatively to the shaft member 356 of the second joint part 353. Namely, as shown in FIG. 55, the torque required for the image display unit 310 to swing around the H-axis in the direction including vertical direction is larger than the torque required for the image display unit 310 to swing around the V-axis in the direction including horizontal direction. Thus, the torque around the H-axis is determined such that the image display unit 310 does not easily move down by rotating around the H-axis owing to its own weight or owing to vertical movement of the head. On the other hand, the swinging torque required for the image display unit 310 to swing around the V-axis in the direction including the horizontal direction is determined such that the image display unit 310 does not easily rotate around the V-axis only owing to swing of the head in the horizontal direction. In the present embodiment, to differentiate the torque in the joint part 351 and the torque in the joint part 355, materials of the sliding parts of each joint part are selected such that the coefficient of friction between the shaft member 352 and the bearing member 353a of the first joint part 351 is different from the coefficient of friction between the shaft member 356 and the bearing member 353b of the second joint part.

As described above, in the present embodiment, the torque required for swinging the holding part 320 around the H-axis is relatively large. As a result, after the vertical position of the image display unit 310 fixed to the holding part 320 is once adjusted, the image display unit 310 does not happen to move relatively to the head owing to the weight of the image display unit 310 itself or owing to swinging of the head. Further, the torque required for swinging the holding part 320 around the V-axis is relatively small, and thus the horizontal position of the image display unit 310 fixed to the holding part 320 can be easily adjusted. Further, in the present embodiment, the attachment 340 can be rotated in relation to the headphone arm 332 around the Z-axis, it is possible to adjust the position of the image display unit 310 around the Z-axis, i.e. to adjust the inclination of the screen of the image display unit 310.

Further, in the present embodiment, multiple joint parts are gathered at the end portion of the holding part 320. Thus, simple operation can move the image display unit 310 in various directions. For example, if a first joint part for moving the image display unit 310 vertically were provided between the holding part 320 and the attachment 340 and a second joint part for moving the image display unit 310 horizontally were provided in the mid portion of the holding part 320, then one joint part might be fixed not to move in the course of operating the other joint part. On the other hand, in the present embodiment, operation of fixing one of a plurality of joint parts is not necessary when the image display unit 310 is moved, similarly to a joint part having a spherical seat that enables movement in various directions as shown in the technique described in Patent Document 3 mentioned as the background technique above.

Figure 58:
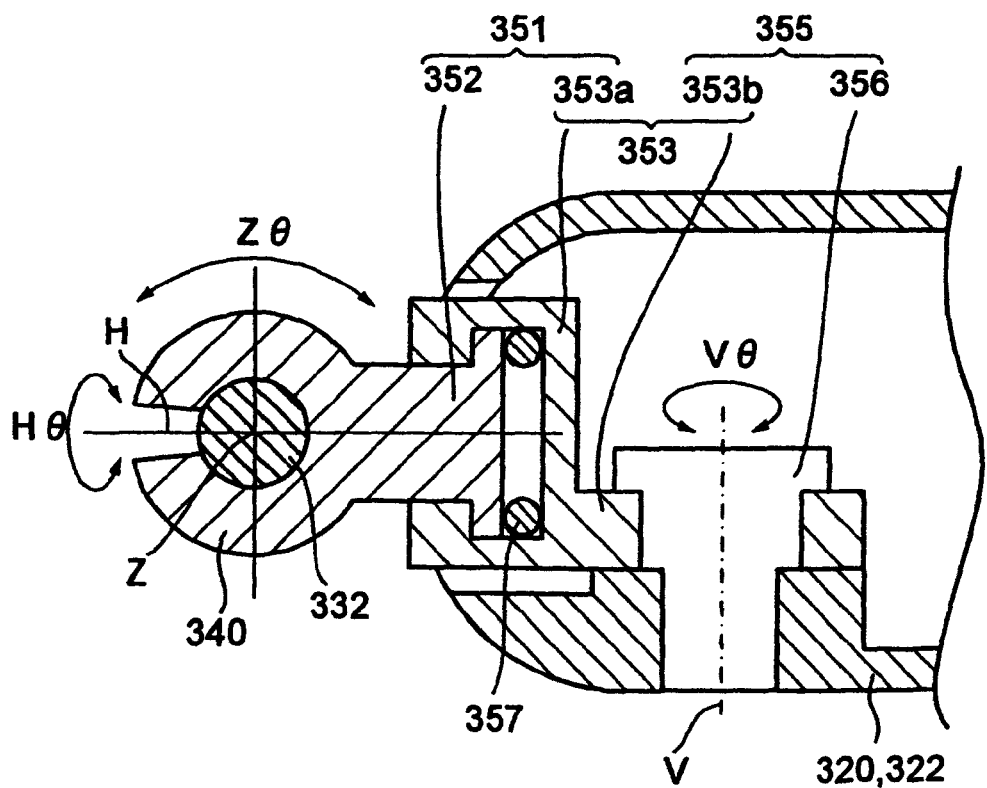
FIG. 58 is a cross section showing a variant of a joint part of the wearable display unit of the eleventh embodiment.

As in the above embodiment, as a method of making the torque of one joint part 351 larger than the torque of the other joint part 355 among a plurality of joint parts 351, 355, there is a method of selecting materials of shaft members 351, 356 and bearing members 353. As another method, may be mentioned a method of interposing a torque adjustment member 357 such as an O-ring as shown in FIG. 58, or a method of forming a plurality of notches in one of a shaft member 51 and a bearing member 53 to change the coefficient of friction.

Further, in the above embodiment, as the first joint part 351, a shaft member 352 is formed in the attachment 340. However, the attachment 340 may be formed with a bearing member. Further, as the second joint part 355, the shaft member 356 is fixed to the display support member holding part 322 of the holding part 320. However, a bearing member may be provided in the display support member holding part 322. In that case, a member common to the first and second joint parts becomes a shaft member that couples both into the bearing member of the first joint part and into the bearing member of the second joint part.

Further, in the above embodiment, the attachment can be coupled to and removed from the headphone arm 322 of the head mounting belt 330. However, an attachment that can not be removed from the headphone arm 332 may be used.

Further, of course, the displacement mechanism having a plurality of joint parts 351, 355, which is described in the present embodiment, may be applied to the first through tenth embodiments and the variants of those embodiments, giving the similar effects.

The invention claimed is:

1. A wearable display system for displaying an image in front of an eye of a user, comprising:
a head-mounting member configured to be mounted on the head of the user, the head-mounting member comprising a speaker and a headphone arm connected to the speaker; and
a wearable display unit, comprising
(i) an image-display unit having a screen configured to display the image,
(ii) a holder connected to the image-display unit,
(iii) an attachment that affixes the holder to the head-mounting member mounted to the head of the user, and
(iv) a joint that affixes the holder to the attachment, the joint comprising first and second joint portions, the first joint portion comprising a first shaft member and a first bearing member, and the second joint portion comprising a second shaft member and a second bearing member, the first bearing member supporting the first shaft member such that the first shaft member is rotatable about a first virtual rotation axis, and the second bearing member supporting the second shaft member such that the second shaft member is rotatable about a second virtual rotation axis different from the first virtual rotation axis, the joint being thus swingable in multiple directions relative to the attachment, each of the directions being a respective direction of swing around a respective one of a plurality of virtual rotation axes that are different from one another,
wherein, the joint is configured so that a torque for swinging the holder around at least the first virtual rotation axis is different from a torque for swinging the holder around at least of the second virtual rotation axis,
wherein, the joint is situated so that the at least first virtual rotation axis is an axis about which the image-display unit, fixed to the holder, swings in a plane including a vertical direction, and
wherein the torque required for swinging the image-display unit around the first virtual rotation axes is greater than the torque required for swinging the image-display unit around another of the virtual rotation axes.

2. The wearable display system of claim 1, wherein the first joint portion configured to hold the holder on the attachment such that the holder can swing relative to the attachment around the first virtual rotation axis among the plurality of virtual rotation axes; and
the second joint portion configured to hold the holder on the attachment such that the holder can swing relative to the attachment around the second virtual rotation axis that is perpendicular to the first virtual rotation axis.

3. The wearable display system of claim 1, wherein: the first joint portion comprises a respective base-side member configured to be fixed to or formed integrally with the attachment and a respective swing-side member that is held to the base-side member such that the swing-side member can rotate relative to the base-side member around the first virtual rotation axis; and the second joint portion comprises a respective swing-side member configured to be fixed to or formed integrally with the holder, and a respective base-side member that is held to the swing-side member such that the base-side member can rotate relative to the swing-side member around the second virtual rotation axis, the second joint portion being fixed to the swing member of the first joint portion.

4. The wearable display system of claim 1, wherein with the head-mounting member mounted to the head of the user and the attachment coupled to the head-mounting member, the image-display unit connected to the holder swings in a plane including a direction perpendicular to a longitudinal direction in the first virtual rotation axis being parallel with a first shaft axis, and the second virtual rotation axis, vertical to the first virtual rotation axis, is parallel with the direction of a second shaft axis, and in a combination of the first shaft member and the first bearing member and another combination of the second shaft member and the second bearing member, the coefficient of friction between the first shaft member and the first bearing member is larger than the coefficient of friction between the second shaft member and the second bearing member.

5. The wearable display system of claim 1, wherein with the head-mounting member mounted to the head of the user and the attachment coupled to the head-mounting member, the image-display unit connected to the holder swings in a plane including a direction perpendicular to a longitudinal direction in the first virtual rotation axis being parallel with a first shaft axis, and the first bearing member supports the first shaft member swingable around the first virtual rotation axis; the second virtual axis vertical to the first virtual rotation axis is parallel with the direction of a second shaft axis; and the joint comprises an adjustment holder between the first shaft member and the first bearing member or between the second shaft member and the second bearing member, so that the coefficient of friction between the first shaft member and the first bearing member is larger than the coefficient friction between the second shaft member and the second bearing member.

* * * * *

UNITED STATES PATENT AND TRADEMARK OFFICE
CERTIFICATE OF CORRECTION

Page 1 of 1

PATENT NO. : 8,362,974 B2
APPLICATION NO. : 12/753797
DATED : January 29, 2013
INVENTOR(S) : Miyake et al.

It is certified that error appears in the above-identified patent and that said Letters Patent is hereby corrected as shown below:

In the Claims:

Column 47, line 57, "least of the" should read --least the--

Column 47, line 63, "axes" should read --axis--

Column 48, line 4, "portion configured" should read --portion is configured--

Column 48, line 9, "portion configured" should read --portion is configured--

Column 48, line 58, "coefficient friction" should read --coefficient of friction--

Signed and Sealed this
Seventh Day of October, 2014

Michelle K. Lee
*Deputy Director of the United States Patent and Trademark Office*